United States Patent
Singh et al.

(10) Patent No.: US 11,750,466 B2
(45) Date of Patent: Sep. 5, 2023

(54) RIC AND RIC FRAMEWORK COMMUNICATION

(71) Applicant: VMware, Inc., Palo Alto, CA (US)

(72) Inventors: Amit Singh, Woodside, CA (US);
Aditya Gudipati, Sunnyvale, CA (US);
Rakesh Misra, Santa Clara, CA (US);
Giridhar Subramani Jayavelu, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 141 days.

(21) Appl. No.: 17/384,784

(22) Filed: Jul. 25, 2021

(65) Prior Publication Data

US 2022/0286536 A1 Sep. 8, 2022

Related U.S. Application Data

(60) Provisional application No. 63/180,627, filed on Apr. 27, 2021, provisional application No. 63/176,859, (Continued)

(51) Int. Cl.
*G06F 9/455* (2018.01)
*G06F 30/331* (2020.01)
(Continued)

(52) U.S. Cl.
CPC ......... *G06F 9/45558* (2013.01); *G06F 8/60* (2013.01); *G06F 9/3877* (2013.01);
(Continued)

(58) Field of Classification Search
None
See application file for complete search history.

(56) References Cited

U.S. PATENT DOCUMENTS 6,504,818 B1  1/2003  Levine
7,417,947 B1  8/2008  Marques et al.
(Continued)

FOREIGN PATENT DOCUMENTS

CN    114449459    * 10/2020
JP    2017516424 A   6/2017
(Continued)

OTHER PUBLICATIONS

B. Balasubramanian et al., "RIC: A RAN Intelligent Controller Platform for AI-Enabled Cellular Networks," in IEEE Internet Computing, vol. 25, No. 2, pp. 7-17, 1 Mar.-Apr. 2021, doi: 10.1109/MIC.2021.3062487. (Year: 2021).*
(Continued)

*Primary Examiner* — Jenkey Van
(74) *Attorney, Agent, or Firm* — ADELI LLP

(57) ABSTRACT

To provide a low latency near RT RIC, some embodiments separate the RIC's functions into several different components that operate on different machines (e.g., execute on VMs or Pods) operating on the same host computer or different host computers. Some embodiments also provide high speed interfaces between these machines. Some or all of these interfaces operate in non-blocking, lockless manner in order to ensure that critical near RT RIC operations (e.g., datapath processes) are not delayed due to multiple requests causing one or more components to stall. In addition, each of these RIC components also has an internal architecture that is designed to operate in a non-blocking manner so that no one process of a component can block the operation of another process of the component. All of these low latency features allow the near RT RIC to serve as a high speed IO between the E2 nodes and the xApps.

20 Claims, 27 Drawing Sheets

Related U.S. Application Data filed on Apr. 19, 2021, provisional application No. 63/157,351, filed on Mar. 5, 2021, provisional application No. 63/157,600, filed on Mar. 5, 2021.

(51) Int. Cl.

| | | |
|---|---|---|
| *G06F 9/38* | (2018.01) | |
| *G06F 9/48* | (2006.01) | |
| *G06F 9/54* | (2006.01) | |
| *G06F 9/4401* | (2018.01) | |
| *H04W 40/24* | (2009.01) | |
| *H04L 69/324* | (2022.01) | |
| *G06F 8/60* | (2018.01) | |
| *H04W 24/02* | (2009.01) | |
| *H04L 41/122* | (2022.01) | |
| *H04L 41/40* | (2022.01) | |
| *G06F 11/34* | (2006.01) | |
| *H04W 28/16* | (2009.01) | |
| *H04W 28/086* | (2023.01) | |
| *H04L 43/10* | (2022.01) | |
| *H04W 8/18* | (2009.01) | |
| *H04W 8/20* | (2009.01) | |
| *H04W 48/14* | (2009.01) | |
| *H04W 12/037* | (2021.01) | |
| *H04W 12/08* | (2021.01) | |
| *H04W 72/0453* | (2023.01) | |
| *G06N 20/00* | (2019.01) | |
| *H04B 7/0452* | (2017.01) | |
| *H04W 72/044* | (2023.01) | |
| *H04W 72/20* | (2023.01) | |
| *H04W 72/29* | (2023.01) | |
| *H04W 72/51* | (2023.01) | |
| *H04W 72/52* | (2023.01) | |
| *H04W 36/10* | (2009.01) | |
| *H04W 84/04* | (2009.01) | |

(52) U.S. Cl.
CPC ........ *G06F 9/4411* (2013.01); *G06F 9/45533* (2013.01); *G06F 9/45545* (2013.01); *G06F 9/4881* (2013.01); *G06F 9/541* (2013.01); *G06F 9/544* (2013.01); *G06F 9/546* (2013.01); *G06F 11/3409* (2013.01); *G06F 30/331* (2020.01); *G06N 20/00* (2019.01); *H04B 7/0452* (2013.01); *H04L 41/122* (2022.05); *H04L 41/40* (2022.05); *H04L 43/10* (2013.01); *H04L 69/324* (2013.01); *H04W 8/18* (2013.01); *H04W 8/186* (2013.01); *H04W 8/20* (2013.01); *H04W 12/037* (2021.01); *H04W 12/08* (2013.01); *H04W 24/02* (2013.01); *H04W 28/0819* (2020.05); *H04W 28/16* (2013.01); *H04W 40/246* (2013.01); *H04W 48/14* (2013.01); *H04W 72/046* (2013.01); *H04W 72/0453* (2013.01); *H04W 72/20* (2023.01); *H04W 72/29* (2023.01); *H04W 72/51* (2023.01); *H04W 72/52* (2023.01); *G06F 2009/4557* (2013.01); *G06F 2009/45579* (2013.01); *G06F 2009/45583* (2013.01); *G06F 2009/45595* (2013.01); *H04L 2212/00* (2013.01); *H04W 36/10* (2013.01); *H04W 84/042* (2013.01)

(56) References Cited

U.S. PATENT DOCUMENTS

| | | |
|---|---|---|
| 9,124,538 B2 | 9/2015 | Koponen et al. |
| 9,438,491 B1 | 9/2016 | Kwok et al. |
| 10,111,163 B2 | 10/2018 | Vrzic et al. |
| 10,243,835 B2 | 3/2019 | Wang et al. |
| 10,447,597 B1 | 10/2019 | Kim et al. |
| 10,461,421 B1 | 10/2019 | Tran et al. |
| 10,555,134 B2 | 2/2020 | Shaw et al. |
| 10,609,530 B1 | 3/2020 | Patil et al. |
| 10,708,143 B2 | 7/2020 | Zhang et al. |
| 10,708,189 B1 | 7/2020 | Agrawal et al. |
| 10,735,331 B1 | 8/2020 | Li et al. |
| 10,834,669 B2 | 11/2020 | Bordeleau et al. |
| 10,856,217 B1 | 12/2020 | Young et al. |
| 10,939,369 B2 | 3/2021 | Bordeleau et al. |
| 11,009,372 B2 | 5/2021 | Klimenko |
| 11,012,288 B2 | 5/2021 | Kommula et al. |
| 11,024,144 B2 | 6/2021 | Bordeleau et al. |
| 11,108,643 B2 | 8/2021 | Kommula et al. |
| 11,146,964 B2 | 10/2021 | Bordeleau et al. |
| 11,178,016 B2 | 11/2021 | Kommula et al. |
| 11,240,113 B2 | 2/2022 | Kommula et al. |
| 11,246,087 B2 | 2/2022 | Bordeleau et al. |
| 11,483,762 B2 | 10/2022 | Bordeleau et al. |
| 11,522,764 B2 | 12/2022 | Kommula et al. |
| 11,540,287 B2 | 12/2022 | Singh et al. |
| 2003/0026205 A1 | 2/2003 | Mullendore et al. |
| 2006/0146712 A1 | 7/2006 | Conner et al. |
| 2007/0100981 A1 | 5/2007 | Adamczyk et al. |
| 2008/0162637 A1 | 7/2008 | Adamczyk et al. |
| 2010/0322255 A1 | 12/2010 | Hao et al. |
| 2013/0125230 A1 | 5/2013 | Koponen et al. |
| 2013/0279504 A1 | 10/2013 | Gulati et al. |
| 2014/0233385 A1 | 8/2014 | Beliveau et al. |
| 2014/0342712 A1 | 11/2014 | Madhavan et al. |
| 2015/0074264 A1 | 3/2015 | Izhak-Ratzin et al. |
| 2015/0163117 A1 | 6/2015 | Lambeth et al. |
| 2015/0381486 A1 | 12/2015 | Xiao et al. |
| 2015/0381493 A1 | 12/2015 | Bansal et al. |
| 2016/0335107 A1 | 11/2016 | Behera et al. |
| 2016/0344565 A1 | 11/2016 | Batz et al. |
| 2016/0353465 A1 | 12/2016 | Vrzic et al. |
| 2016/0360408 A1 | 12/2016 | Senarath et al. |
| 2017/0054595 A1 | 2/2017 | Zhang et al. |
| 2017/0085628 A1 | 3/2017 | Mahindra et al. |
| 2017/0093633 A1 | 3/2017 | Chang et al. |
| 2017/0111187 A1 | 4/2017 | Zanier et al. |
| 2017/0142591 A1 | 5/2017 | Vrzic |
| 2017/0250893 A1 | 8/2017 | Duda |
| 2017/0250906 A1 | 8/2017 | MeLampy et al. |
| 2017/0264483 A1 | 9/2017 | Lambeth et al. |
| 2017/0289791 A1 | 10/2017 | Yoo et al. |
| 2017/0332212 A1 | 11/2017 | Gage |
| 2017/0332421 A1 | 11/2017 | Sternberg et al. |
| 2018/0088972 A1 | 3/2018 | Kubota et al. |
| 2018/0183866 A1 | 6/2018 | Gunda et al. |
| 2018/0219762 A1 | 8/2018 | Wang et al. |
| 2018/0220276 A1 | 8/2018 | Senarath et al. |
| 2018/0220277 A1 | 8/2018 | Senarath et al. |
| 2018/0248770 A1 | 8/2018 | Regmi et al. |
| 2018/0270713 A1 | 9/2018 | Park et al. |
| 2018/0270743 A1 | 9/2018 | Callard et al. |
| 2018/0295036 A1 | 10/2018 | Krishnamurthy et al. |
| 2018/0332441 A1 | 11/2018 | Shaw et al. |
| 2018/0368060 A1 | 12/2018 | Kedalagudde et al. |
| 2019/0044755 A1 | 2/2019 | Takajo et al. |
| 2019/0053104 A1 | 2/2019 | Qiao et al. |
| 2019/0058508 A1 | 2/2019 | Yiu |
| 2019/0075082 A1 | 3/2019 | Adam et al. |
| 2019/0104458 A1 | 4/2019 | Svennebring et al. |
| 2019/0123963 A1 | 4/2019 | Tang et al. |
| 2019/0124704 A1 | 4/2019 | Sun et al. |
| 2019/0150080 A1 | 5/2019 | Davies et al. |
| 2019/0158364 A1 | 5/2019 | Zhang et al. |
| 2019/0159117 A1 | 5/2019 | Kuge et al. |
| 2019/0174573 A1 | 6/2019 | Velev et al. |
| 2019/0187999 A1 | 6/2019 | Lu et al. |
| 2019/0191309 A1 | 6/2019 | Kweon et al. |
| 2019/0200286 A1 | 6/2019 | Usui et al. |
| 2019/0268633 A1 | 8/2019 | Jayawardene et al. |
| 2019/0268973 A1 | 8/2019 | Bull et al. |
| 2019/0280976 A1 | 9/2019 | Wang |

(56) References Cited

U.S. PATENT DOCUMENTS

| | | |
|---|---|---|
| 2019/0287146 A1 | 9/2019 | Maitland et al. |
| 2019/0289470 A1 | 9/2019 | Vaidya et al. |
| 2019/0320494 A1 | 10/2019 | Jayawardene et al. |
| 2019/0370376 A1 | 12/2019 | Demmon et al. |
| 2019/0373520 A1 | 12/2019 | Sillanpää |
| 2020/0007445 A1 | 1/2020 | Anwer et al. |
| 2020/0053531 A1 | 2/2020 | Myhre et al. |
| 2020/0053545 A1 | 2/2020 | Wong et al. |
| 2020/0067831 A1 | 2/2020 | Spraggins et al. |
| 2020/0077327 A1 | 3/2020 | Duan et al. |
| 2020/0106536 A1 | 4/2020 | Bedekar |
| 2020/0120721 A1 | 4/2020 | Lau et al. |
| 2020/0120724 A1 | 4/2020 | Vaidya et al. |
| 2020/0137621 A1 | 4/2020 | Yang et al. |
| 2020/0213360 A1 | 7/2020 | Ojha et al. |
| 2020/0235990 A1 | 7/2020 | Janakiraman et al. |
| 2020/0252142 A1 | 8/2020 | Bedekar |
| 2020/0273314 A1 | 8/2020 | Bordeleau et al. |
| 2020/0275281 A1 | 8/2020 | Bordeleau et al. |
| 2020/0275357 A1 | 8/2020 | Bordeleau et al. |
| 2020/0275358 A1 | 8/2020 | Bordeleau et al. |
| 2020/0275359 A1 | 8/2020 | Bordeleau et al. |
| 2020/0275360 A1 | 8/2020 | Bordeleau et al. |
| 2020/0280615 A1 | 9/2020 | Andersson et al. |
| 2020/0314029 A1 | 10/2020 | Gopinath et al. |
| 2020/0314622 A1 | 10/2020 | Tofighbakhsh et al. |
| 2021/0014912 A1 | 1/2021 | Song et al. |
| 2021/0029580 A1 | 1/2021 | Gupta et al. |
| 2021/0037390 A1 | 2/2021 | Tofighbakhsh et al. |
| 2021/0051490 A1 | 2/2021 | Yanover et al. |
| 2021/0064407 A1 | 3/2021 | Kommula et al. |
| 2021/0064451 A1 | 3/2021 | Kommula et al. |
| 2021/0067416 A1 | 3/2021 | Kommula et al. |
| 2021/0067439 A1 | 3/2021 | Kommula et al. |
| 2021/0224145 A1 | 7/2021 | Warmack |
| 2021/0234803 A1 | 7/2021 | Parekh et al. |
| 2021/0297347 A1 | 9/2021 | Xu et al. |
| 2022/0038902 A1 | 2/2022 | Mueck |
| 2022/0167236 A1 | 5/2022 | Melodia et al. |
| 2022/0210706 A1 | 6/2022 | Parekh et al. |
| 2022/0210708 A1 | 6/2022 | Parekh et al. |
| 2022/0225264 A1 * | 7/2022 | Song .................. H04W 92/12 |
| 2022/0237049 A1 | 7/2022 | Wiggers et al. |
| 2022/0279535 A1 | 9/2022 | Tsui |
| 2022/0283832 A1 | 9/2022 | Singh et al. |
| 2022/0283839 A1 | 9/2022 | Srinivasan et al. |
| 2022/0283840 A1 | 9/2022 | Jayavelu et al. |
| 2022/0283841 A1 | 9/2022 | Jayavelu et al. |
| 2022/0283842 A1 | 9/2022 | Singh et al. |
| 2022/0283843 A1 | 9/2022 | Singh |
| 2022/0283882 A1 | 9/2022 | Singh et al. |
| 2022/0286837 A1 | 9/2022 | Yang et al. |
| 2022/0286840 A1 | 9/2022 | Singh |
| 2022/0286914 A1 | 9/2022 | Gudipati et al. |
| 2022/0286915 A1 | 9/2022 | Gudipati et al. |
| 2022/0286916 A1 | 9/2022 | Yang et al. |
| 2022/0286939 A1 | 9/2022 | Gudipati et al. |
| 2022/0287038 A1 | 9/2022 | Singh et al. |
| 2022/0303831 A1 | 9/2022 | Song et al. |
| 2022/0342732 A1 | 10/2022 | Subramani Jayavelu et al. |
| 2022/0407664 A1 | 12/2022 | Wang et al. |
| 2023/0041056 A1 | 2/2023 | Bordeleau et al. |
| 2023/0054483 A1 | 2/2023 | Lee et al. |

FOREIGN PATENT DOCUMENTS

| | | |
|---|---|---|
| JP | 2018518927 A | 7/2018 |
| JP | 2018125837 A | 8/2018 |
| WO | 2016159192 A1 | 10/2016 |
| WO | 2016206742 A1 | 12/2016 |
| WO | 2017150642 A1 | 9/2017 |
| WO | 2019129374 A1 | 7/2019 |
| WO | 2019229492 A1 | 12/2019 |
| WO | 2020171957 A1 | 8/2020 |
| WO | 2020242987 A1 | 12/2020 |
| WO | 2021040935 A1 | 3/2021 |
| WO | WO-2022011862 A1 * | 1/2022 ............ H04L 69/18 |
| WO | 2022156887 A1 | 7/2022 |
| WO | 2022177333 A1 | 8/2022 |
| WO | 2022186883 A1 | 9/2022 |
| WO | 2022186912 A1 | 9/2022 |
| WO | WO-2022194359 A1 * | 9/2022 |

OTHER PUBLICATIONS

Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3.

Czichy, Thoralf, 5G RAN Optimization Using the O-RAN Software Community's RIC (RAN Intelligent Controller), Open Networking Summit Europe, Sep. 23, 2019, 23 pages, The Linux Foundation, Antwerp, Belgium.

PCT International Search Report and Written Opinion of Commonly Owned International Patent Application PCT/US2022/013427, dated May 11, 2022, 14 pages, International Searching Authority (EPO).

Author Unknown, "5G RIC—RAN Intelligent Controller," Jun. 26, 2020, 4 pages, retrieved from http://www.techplayon.com/5g-ric-ran-intelligent-controller/.

Non-Published Commonly Owned U.S. Appl. No. 17/971,590, filed Oct. 22, 2022, 104 pages, VMware, Inc.

Non-Published Commonly Owned U.S. Appl. No. 17/976,788, filed Oct. 29, 2022, 62 pages, VMware, Inc.

Author Unknown, "Open RAN 101—Role of RAN Intelligent Controller: Why, what, when, how?," Jul. 30, 2020, 8 pages.

Author Unknown, "O-RAN Operations and Maintenance Architecture," O-RAN WG1 OAM-Architecture-v04.00, Month Unknown 2021, 55 pages, O-RAN Alliance.

Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.

Non-Published Commonly Owned U.S. Appl. No. 17/376,758, filed Jul. 15, 2021, 50 pages, VMware, Inc.

Non-Published Commonly Owned U.S. Appl. No. 17/376,766, filed Jul. 15, 2021, 50 pages, VMware, Inc.

Non-Published Commonly Owned U.S. Appl. No. 17/376,785, filed Jul. 15, 2021, 50 pages, VMware, Inc.

Non-Published Commonly Owned U.S. Appl. No. 17/376,801, filed Jul. 15, 2021, 36 pages, VMware, Inc.

Non-Published Commonly Owned U.S. Appl. No. 17/376,817, filed Jul. 15, 2021, 36 pages, VMware, Inc.

Non-Published Commonly Owned U.S. Appl. No. 17/376,835, filed Jul. 15, 2021, 36 pages, VMware, Inc.

Non-Published Commonly Owned U.S. Appl. No. 17/384,475, filed Jul. 23, 2021, 55 pages, VMware, Inc.

Non-Published Commonly Owned U.S. Appl. No. 17/384,476, filed Jul. 23, 2021, 56 pages, VMware, Inc.

Non-Published Commonly Owned Related U.S. Appl. No. 17/384,777 with similar specification, filed Jul. 25, 2021, 87 pages, VMware, Inc.

Non-Published Commonly Owned Related U.S. Appl. No. 17/384,778 with similar specification, filed Jul. 25, 2021, 87 pages, VMware, Inc.

Non-Published Commonly Owned Related U.S. Appl. No. 17/384,779 with similar specification, filed Jul. 25, 2021, 87 pages, VMware, Inc.

Non-Published Commonly Owned Related U.S. Appl. No. 17/384,780 with similar specification, filed Jul. 25, 2021, 87 pages, VMware, Inc.

Non-Published Commonly Owned Related U.S. Appl. No. 17/384,781 with similar specification, filed Jul. 25, 2021, 87 pages, VMware, Inc.

Non-Published Commonly Owned Related U.S. Appl. No. 17/384,782 with similar specification, filed Jul. 25, 2021, 87 pages, VMware, Inc.

Non-Published Commonly Owned Related International Patent Application PCT/US2022/013427 with similar specification, filed Jan. 21, 2022, 88 pages, VMware, Inc.

(56) References Cited

OTHER PUBLICATIONS

Schmidt, Robert, "RAN Engine: Service-Oriented RAN Through Containerized Micro-Services," IEEE Transactions on Network and Service Management, Mar. 2021, 14 pages, vol. 18, No. 1, IEEE.

* cited by examiner

RIC AND RIC FRAMEWORK COMMUNICATION

CLAIM OF BENEFIT TO PRIOR APPLICATIONS

This application claims the benefit of U.S. Provisional Patent Application 63/157,351, filed Mar. 5, 2021; U.S. Provisional Patent Application 63/157,600, filed Mar. 5, 2021; U.S. Provisional Patent Application 63/176,859, filed Apr. 19, 2021; and U.S. Provisional Patent Application 63/180,627, filed Apr. 27, 2021. U.S. Provisional Patent Applications 63/157,351, 63/157,600, 63/176,859, and 63/180,627 are incorporated herein by reference.

BACKGROUND

In telecommunications networks, the Radio Access Network (RAN) performs more and more functions with each iteration of the telecommunications standards. That is, in order to enable the advantages of 5G over previous standards, the 5G RAN performs various additional functions. These RAN functions are situated between user devices and the core network, and are thus often performed at the base stations (e.g., cell towers) where computing power can be limited.

BRIEF SUMMARY

Some embodiments provide novel RAN intelligent controllers (RICs) for a telecommunication network. For instance, to provide a low latency near RT RIC, some embodiments separate the RIC functions into several different components that operate on different machines (e.g., execute on VMs or Pods) operating on the same host computer or different host computers. Some embodiments also provide high speed interfaces between these machines. Some or all of these interfaces operate in non-blocking, lockless manner in order to ensure that critical near RT RIC operations (e.g., datapath processes) are not delayed due to multiple requests causing one or more components to stall. In addition, each of these RIC components also has an internal architecture that is designed to operate in a non-blocking manner so that no one process of a component can block the operation of another process of the component. All of these low latency features allow the near RT RIC to serve as a high speed IO between the base station nodes (i.e., E2 nodes) and the control plane applications (e.g., xApps).

In some embodiments, the near RT RIC includes a datapath Pod, a service Pod, and an SDL (shared data layer) Pod. Part of the RIC's low latency architecture is attributable to using different Pods to implement the data TO, service and SDL operations, so that different resource allocations and management operations can be provided to each of these Pods based on its respective needs of the operations that they perform. Also, in some embodiments, the RIC provides low-latency messaging between its various Pods.

The service Pod performs application (e.g., xApp) onboarding, registration, FCAPS (fault, configure, accounting, performance, security), and other services in some embodiments. It also provides services (such as metric collection, policy provisioning and configuration) to other RIC components. The SDL Pod implements the shared data layer of the near RT RIC. The SDL Pod in some embodiments also executes one or more service containers to execute one or more preprocessing or post-processing services on the data stored in the SDL.

The datapath Pod performs the data message forwarding between the base station components of the telecommunication network and control and edge applications of this network. In some embodiments, some or all of the datapath services of the datapath Pod are embedded in a datapath thread and a control thread of the datapath Pod. In other embodiments, the datapath services are embedded in a data IO thread, multiple data processing threads (DPTs) and a control thread.

The control thread in some embodiments is the interface with the service Pod and SDL Pod for the datapath threads, while in other embodiments it is the interface to just the service Pod for the datapath threads (as the datapath threads can communicate directly with the SDL Pod). The control thread in either of these approaches performs the slower, control related operations of the datapath, while the one or more datapath threads perform the faster IO operations of the datapath. The control thread in some embodiments interfaces with the service Pod to receive configuration data for configuring its own operations as well as the operations of the datapath thread.

The embodiments that separate the datapath thread into a data IO thread and multiple data processing threads further optimize the data IO by pushing the more computationally intensive operations of the datapath thread into multiple datapath processing threads, which then allows the less computationally intensive operations to run in the data IO thread. Both of these optimizations are meant to ensure a fast datapath IO (one that does not experience unwanted latencies) so that the near RT RIC can serve as a high speed interface between base station nodes and the control and edge applications.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
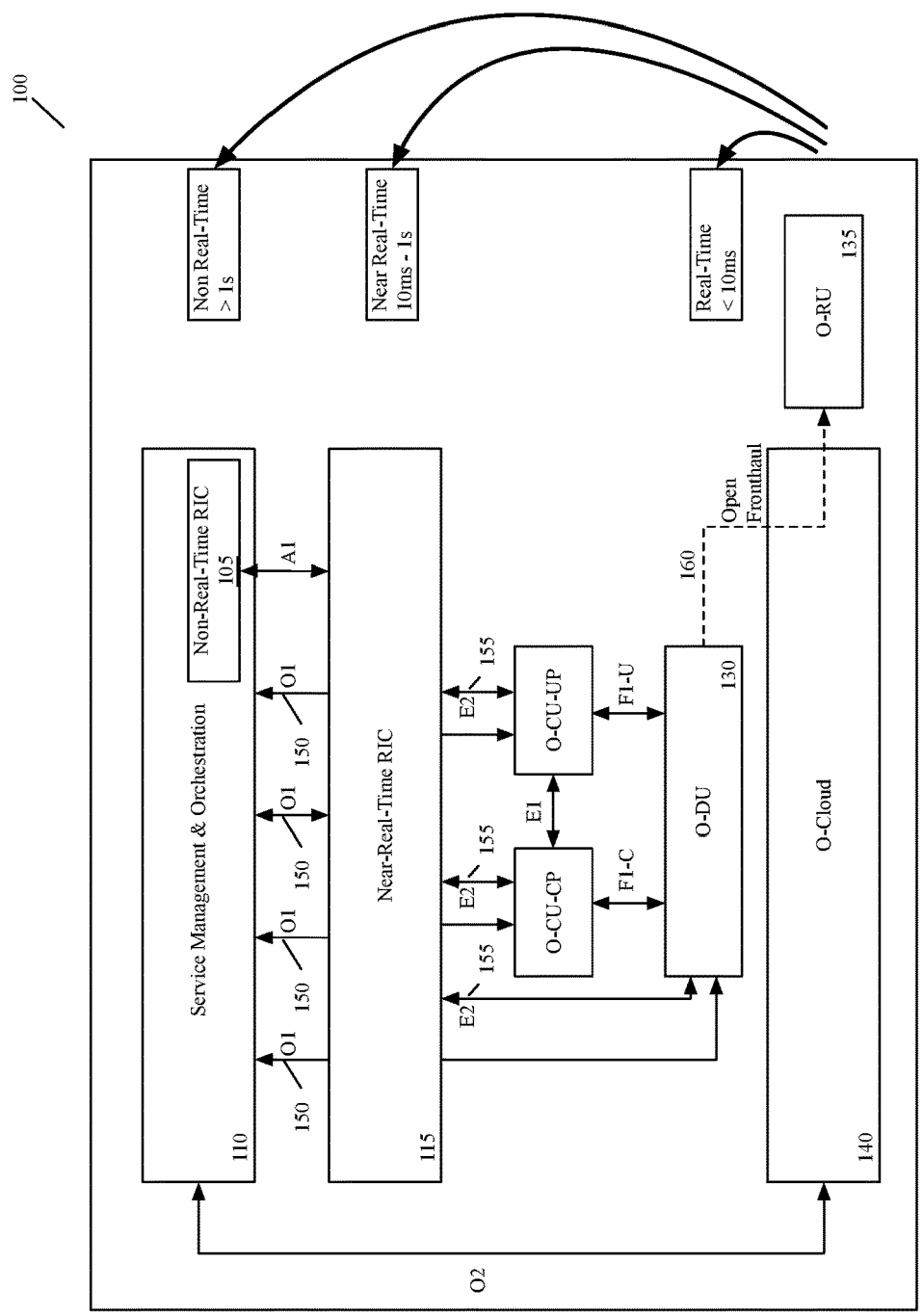
FIG. 1 illustrates an example of O-RAN architecture according to some embodiments.
Figure 1:
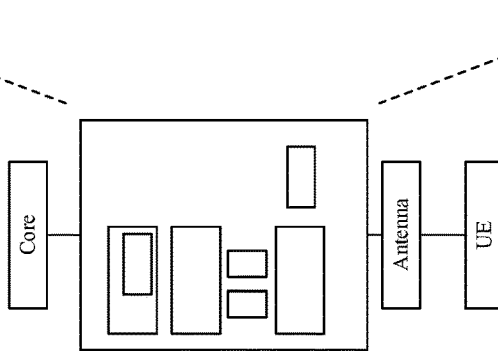

Today, there is a push to have the Radio Access Network (RAN) of a telecommunication network (e.g., a cellular network) implemented as O-RAN, a standard for allowing interoperability for RAN elements and interfaces. FIG. 1 illustrates an example of O-RAN architecture 100, according to some embodiments. The O-RAN architecture 100 includes a service management and orchestration framework (SMO) 110 with a non-real-time RIC 105, a near real-time RAN intelligent controller (RIC) 115, open control plane central unit (O-CU-CP) 120, open user plane central unit (O-CU-UP) 125, open distributed unit (O-DU) 130, open radio unit (O-RU) 135, and the O-Cloud 140. The O-CU-CP 120, the O-CU-UP 125, and the O-DU 130 may be collectively referred to as the managed functions 120-130 below.

As defined in the standard, the SMO 110 in some embodiments includes an integration fabric that allows the SMO to connect to and manage the RIC 115, the managed functions 120-130, and the O-Cloud 140 via the open interfaces 150. Unlike these elements, the O-RU 135 is not managed by the SMO 110, and is instead managed by the O-DU 130, as indicated by the dashed line 160, in some embodiments. In some embodiments, the O-RU 135 processes and sends radio frequencies to the O-DU 130.

In some embodiments, the managed functions 120-130 are logical nodes that each host a set of protocols. According to the O-RAN standard, for example, the O-CU-CP 120, in some embodiments, include protocols such as radio resource control (RRC) and the control plane portion of packet data convergence protocol (PDCP), while the O-CU-UP 125 includes protocols such as service data adaptation protocol (SDAP), and the user plane portion of packet data convergence protocol (PDCP).

The two RICs are each adapted to specific control loop and latency requirements. The near real-time MC 115 provides programmatic control of open centralized units (O-CUs) and open distributed units (O-DUs) on time cycles of 10 ms to 1 second. The non-real-time MC (non-RT MC) 105, on the other hand, provides higher layer policies that can be implemented in the RAN either via the near-RT MC or via a direct connection to RAN nodes. The non-RT MC is used for control loops of more than 1 second. Each RIC 105 or 115 serves as a platform on which RAN control applications execute. These applications can be developed by third-party suppliers that are different from the RIC vendors. These applications are referred to as "xApps" (for the near-RT RIC 115) and "rApps" (for the non-RT RIC).

The near real-time RIC 115, in some embodiments, is a logical aggregation of several functions that use data collection and communications over the interfaces 155 in order to control the managed functions 120-130. In some embodiments, the non-real-time RIC 105 uses machine learning and model training in order to manage and optimize the managed functions 120-130. The near RT RIC in some of these embodiments also uses machine learning.

In some embodiments, the O-Cloud 140 is responsible for creating and hosting virtual network functions (VNFs) for use by the RIC 115 and the managed functions 120-130. In some embodiments, the DU is in charge of per-slot decisions of user scheduling and includes RAN scheduler that performs MAC control assistance and user-level tracing. In order to increase computing power available in the cloud (i.e., compared to base stations that typically execute the RAN functions), the RIC is implemented in one or more public and/or private cloud datacenters and implements an improved cloudified RAN scheduler in the cloud, thereby offloading these MAC control assistance and user-level tracing functions from the DU to the RIC. The interfaces 155 in some embodiments enable the RAN to provide inputs to the functions at the RIC, and, at least in some embodiments, receive outputs that have been computed by these functions at the RIC.

Figure 2:
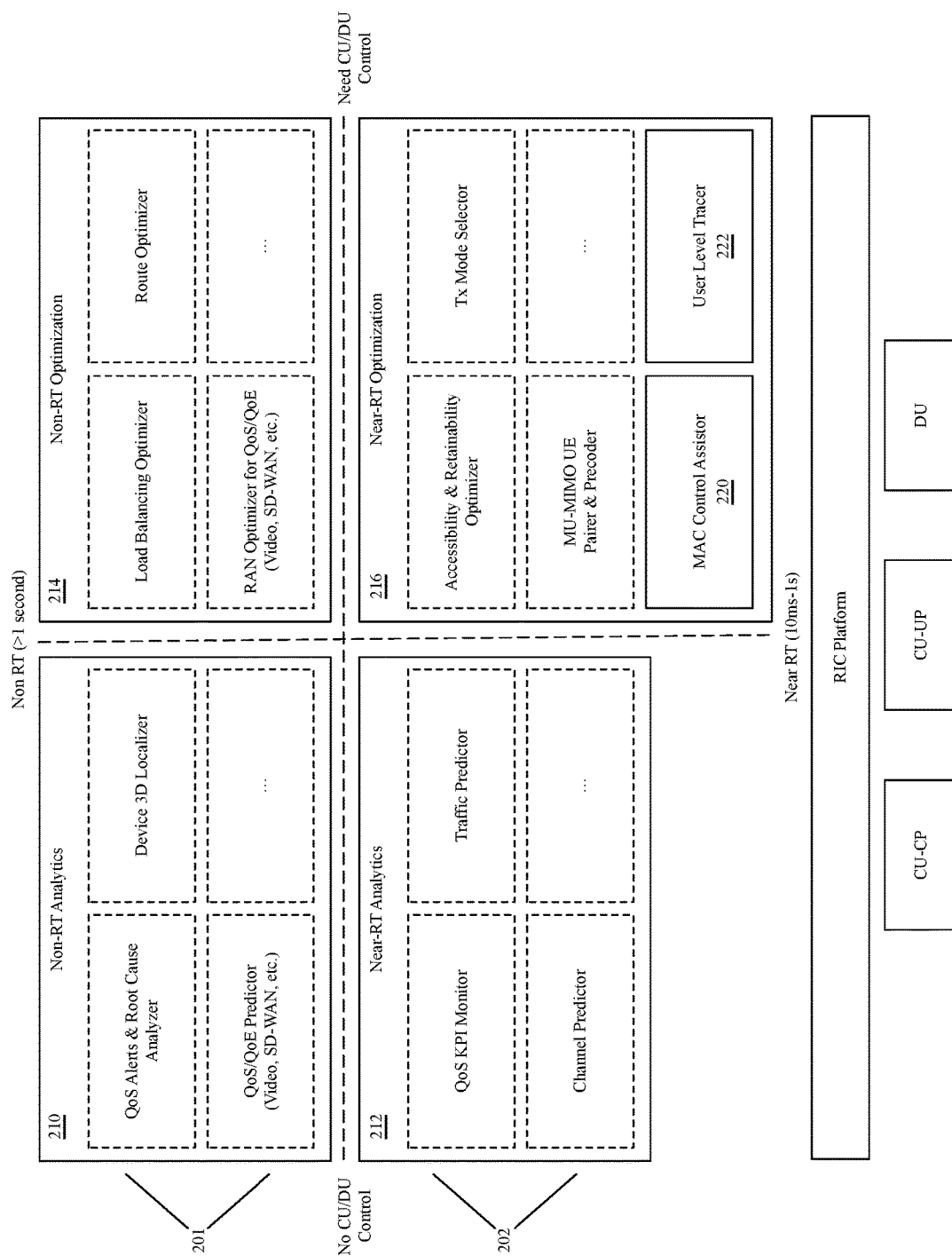
FIG. 2 illustrates an in-depth view of the components of both a non-real-time RIC and a near real-time RIC according to some embodiments.

FIG. 2 illustrates an in-depth view of the components of both a non-real-time RIC 201 and a near real-time RIC 202. Each of the RICs 201 and 202 includes a respective set of analytics functions 210 and 212, and a respective set of optimization functions 214 and 216, which are each illustrated with dashed lines to indicate they are existing components. In addition to these existing components, the near real-time optimization functions 216 includes two new components, the MAC control assistor 220 and user-level tracer 222, illustrated with solid lines to visually differentiate them from the existing components. In some embodiments, these components are part of a larger MIMO component (e.g., along with the MU-MIMO UE pairer and precoder).

In some embodiments, the MAC control assistor 220 can include various functions such as (1) User Equipment (UE)—specific beamforming weight calculation based on UL SRS channel signal reception, (2) UE Radio Frequency (RF) condition prediction, and (3) Multi-User, Multiple Input, Multiple Output (MU-MIMO) pairing suggestion for the MAC scheduler based on the UE-specific beams. For each of these functions, some embodiments expose a report interface (that provides input data for the function to the RIC from the DU) and a control interface (that provides output data for the function to the DU from the RIC).

The user-level tracer 222, in some embodiments, produces L1/L2/L3 level information related to user configuration and traffic performance. This tracing data can be used as inputs to various control algorithms, including the MAC scheduler, parameter setting, etc. The user-level tracer 222 can include tracing operations that can (i) track user behavior in a cell, (ii) track user RF condition, (iii) track user data traffic performance in different layers (MAC, Radio Link Control (RLC), Packet Data Convergence Protocol (PDCP)), and (iv) track user RF resource consumption.

Figure 3:
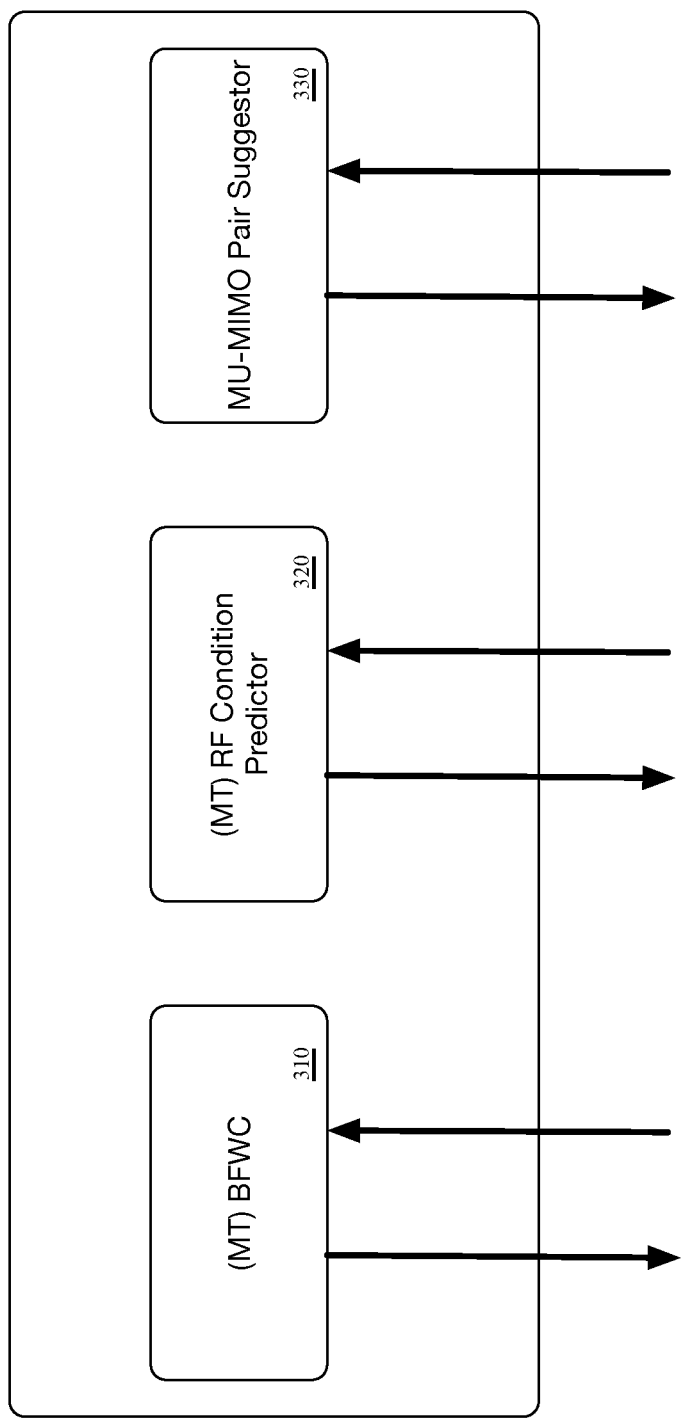
FIG. 3 illustrates a more in-depth view of a MAC control assistor of some embodiments.

FIG. 3 illustrates a more in-depth view of a MAC control assistor 300 of some embodiments. As illustrated, the MAC control assistor 300 includes a UE-specific beamforming weight calculator (BFWC) 310, a UE RF condition predictor 320, and a MU-MIMO pairing suggestor 330. The UE-specific BFWC 310 in some embodiments is based on UL SRS channel signal reception. In some embodiments, the MU-MIMO pairing suggestor 330 is for the MAC scheduler based on the UE-specific beams.

Each of the components 310-330 of the MAC control assistor 300 includes an uplink and a downlink, as shown. For the UE-specific BWC function, some embodiments expose a report interface for an uplink Sounding Reference Signal (UL SRS) channel response matrix that is an input to the weight calculation function and a control interface for a UE-specific beamforming weight matrix. For the UE RF condition predictor function, some embodiments expose a report interface for a downlink (DL) channel condition report that is an input to the RF condition prediction and a control interface for a predicted DL channel condition (e.g., including DL SINR, PMI, and rank) for the next scheduling window. For the MU-MIMO pairing suggestion function, some embodiments expose a report interface for UE-specific beamforming weight matrix that is an input to the pairing suggestion function and a control interface for UE pairing suggestion and SINR impact assessment.

Figure 4:
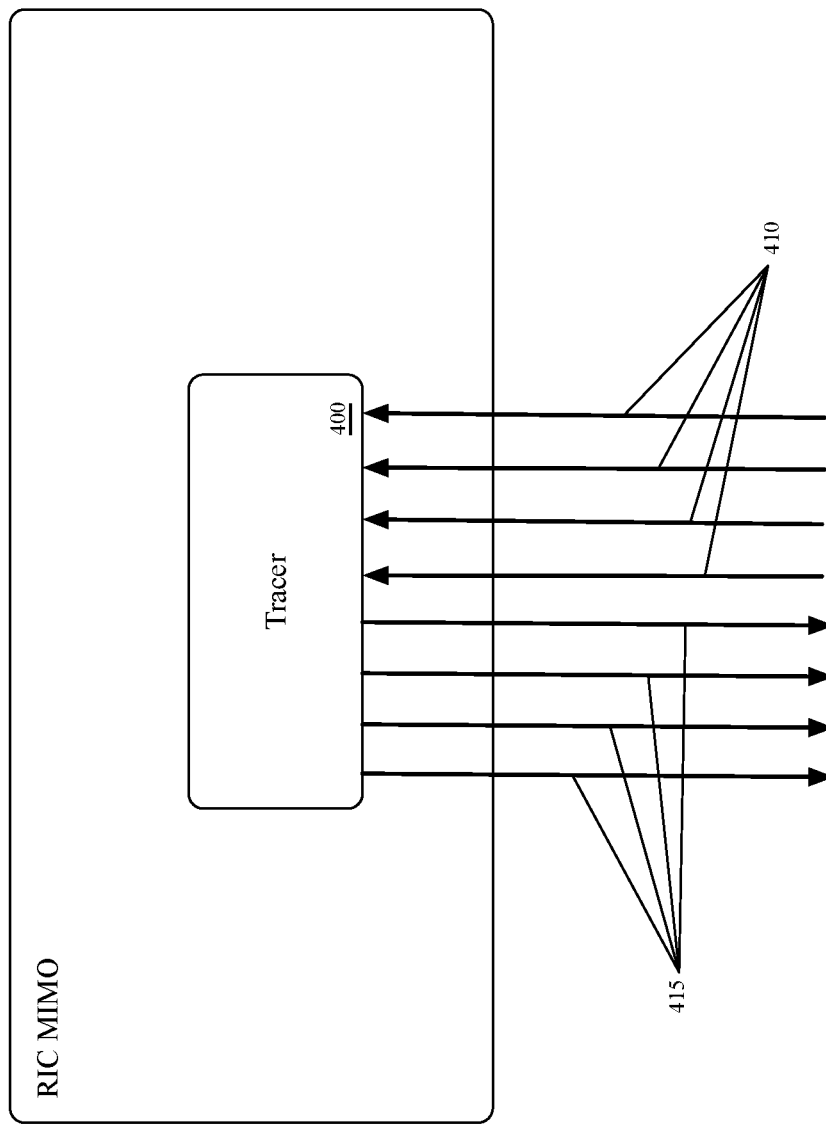
FIG. 4 illustrates a more in-depth view of a user-level tracer of some embodiments.

FIG. 4 illustrates a more in-depth view of a user-level tracer 400 of some embodiments. The tracer 400 includes multiple uplinks 410 and multiple downlinks 415 for performing tracing operations, in some embodiments. These operations produce L1/L2/L3 level information related to user configuration and traffic performance. This tracing data can be used as inputs to various control algorithms, including the MAC scheduler, parameter setting, etc. These tracing operations can (1) track user behavior in a cell, (2) track user RF condition, (3) track user data traffic performance in different layers (MAC, RLC, PDCP), and (4) track user RF resource consumption.

For these tracing operations, some embodiments expose report interfaces for the DU and/or the CU to provide various metrics to the user level tracing operations. These metrics can include selected RRC messages, MAC/RLC/PDCP traffic volume and performance, RF condition, and RF resource consumption. In some embodiments, messages over these interfaces to the RIC are triggered based on user behavior and/or periodic reporting (e.g., for traffic performance and RF condition/resource consumption).

The tracing operations track the various user data indicated above, and can provide this information either back to the RAN or to other control algorithms (e.g., other algorithms operating at the RIC). For instance, these algorithms might perform analysis on the user data performance from the user level tracing operations, determine that certain performance is inadequate, and modify how the RAN is treating the user traffic. Examples of control algorithms that can benefit from user-level tracing in some embodiments include (1) traffic steering, (2) quality of service (QoS) scheduling optimization, (3) user configuration adjustment, and (4) user behavior anomaly detection.

For all of the operations described in FIGS. 3-4 (i.e., the MAC scheduler functions and the user-level tracing operations), the increased computing power available to the RIC in the cloud enables more complex computations without excessive latency. For instance, some or all of these operations can be performed at the RIC using machine learning (e.g., using machine-trained networks, etc.).

Figure 5:
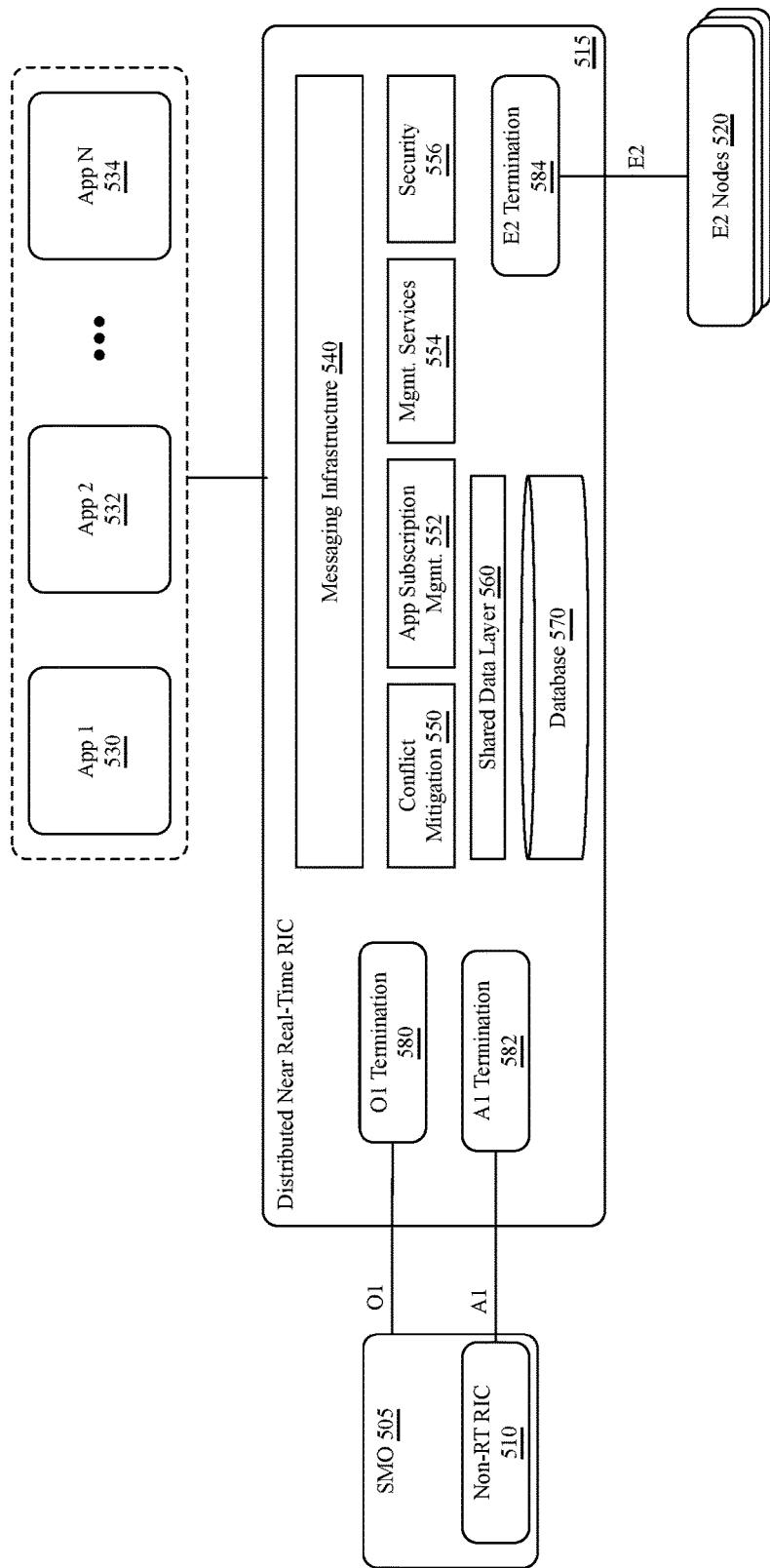
FIG. 5 illustrates another view of the O-RAN architecture of some embodiments, with a more in-depth view of the near real-time RIC.

FIG. 5 illustrates another view of the O-RAN architecture of some embodiments, with a more in-depth view of the near real-time MC. The architecture 500 includes an SMO 505 with a non-real-time MC 510, a distributed near real-time MC 515, and E2 nodes 520 (e.g., O-DU and/or O-CU nodes). The distributed near real-time MC 515 includes messaging infrastructure 540, a set of services (e.g., 550, 552, 554, and 556), a shared data layer 560, a database 570, and a set of termination interfaces (e.g., 580, 582, and 584). As shown, a set of embedded apps (e.g., 530, 532, and 534) uses this distributed near RT RIC. As further described below, the distributed near RT RIC 515 is implemented by multiple RICs executing on multiple host computers in some embodiments.

As shown, the set of services include conflict mitigation services 550, app subscription management services 552, management services 554, and security services 556. Additionally, the set of termination interfaces include O1 termination interface 580 connecting the SMO to the near real-time RIC, A1 termination interface 582 connecting the non-real-time RIC to the near real-time RIC, and E2 termination interface 584 connecting the E2 nodes to the near real-time RIC. Each of the apps, in some embodiments, is representative of the various functions of the RIC that use data sent from the E2 nodes 520. For example, app 530 may correspond to the UE-specific BFWC 310 of the MAC control assistor 300, app 532 may correspond to the UE RF condition predictor 320 of the MAC control assistor 300, etc.

In some embodiments, the objective of the framework 500 is to offload near real-time functions that are computation-intensive, and provide results back to the O-DU (e.g., via the E2 interface with E2 nodes 520). The results, in some embodiments, can be used to assist or enhance the real-time decision in the MAC layer. Three example use-cases for the MAC control assistance framework, each example specific to a different component of the MAC control assistor (e.g., the UE-specific BFWC, the UE RF condition predictor, and the MU-MIMO pairing suggestor), and one use-case example for the user-level tracer, will be described below.

The first example use-case is specific to the UE-specific beamforming weight calculation based on UL SRS signal reception component of the MAC control assistance framework (e.g., component 310 of the MAC control assistor 300). In some embodiments of this use-case, the input metrics can include multiple options based on UL SRS, such as raw SRS received data, and an SRS channel responses matrix from a channel estimate.

The algorithm for producing output metrics, in some embodiments, evaluates the optimal beam-forming weights to reach the user. Some embodiments use traditional signal processing algorithms that are based on channel models. Alternatively, or conjunctively, machine-learning based algorithms that utilize raw data inputs are used, which require feedback from the DU in the E2 nodes 520.

In some embodiments, the output metrics resulting from the algorithm include a beam-form weight (BFW) matrix for the user. In some embodiments, the BFW could also be mapped to a beam index from a pre-designed beam set. The DU in some embodiments uses the matrix to control the MIMO antenna array gain/phasing in the RU (e.g., the O-RU 135 in the architecture 100) for user data transmission and reception.

The second use-case example is specific to the UE RF condition predictor component of the MAC control assistance framework (e.g., component 320 of the MAC control assistor 300). For this second use-case, the input metrics include at least a channel report from the UE, such as Wideband or Subband CQI/PMI/RI for DL, or SRS for UL, according to some embodiments. The input metrics of some embodiments can also opt to include supportive information such as UE distance, UE positioning, etc.

In some embodiments, the app algorithm for this second use-case is meant to predict the UE's RF condition based on the observation. Some embodiments utilize traditional signal processing algorithms based on channel and mobility models. Alternatively, or conjunctively, some embodiments also use machine learning based algorithms using data inputs and potentially other factors, such as site layout (which requires feedback from the DU).

The output metrics for this use-case, in some embodiments, include the predicted channel condition of the user for the next scheduling window, as well as predicted downlink and uplink SINR, a precoding matrix (e.g., if applicable), and SU-MIMO layers. In some embodiments, these output metrics are used by the DU for the user link adaptation on PDCCH/PDSCH/PUSCH transmissions.

The third use-case example is specific to the MU-MIMO pairing suggestor to MAC scheduler component (e.g., component 330 of the MAC control assistor 300). The input metrics for this example use case, in some embodiments, include at least the UE-specific BFW matrix and the UE RF condition estimate. Some embodiments may also include supportive metrics such as user data demand, etc., as input metrics in addition to the UE-specific BFW matrix and the UE RF condition estimate.

The app algorithm for this use-case, in some embodiments, is meant to identify users that can be paired for MU-MIMO operations. For example, some embodiments of the third use-case use traditional signal processing algorithms based on information theory and cross-channel covariance evaluation. Alternatively, or conjunctively, some embodiments use machine learning based algorithms using the data inputs, which again requires feedback from the DU.

In some embodiments, the output metrics of this third use-case can include UE pairing suggestions and an impact assessment on SINR and SU-MIMO layers. Additionally, the DU in some embodiments uses the output metrics to select users for RF scheduling, and to determine the transmission efficiencies.

An example use-case for the user-level tracer can include QoS scheduling optimization with the goal of adjusting a user's scheduling priority for an RF resource to optimize the service quality. The input for some embodiments of this use-case can include a service quality target from a user subscription. In some embodiments, the user-level tracing includes (1) tracking the user RF condition, (2) tracking the user data traffic performance in different layers (e.g., MAC/RLC/PDCP), and (3) tracking the user RF resource consumption.

In some embodiments, the app algorithm is based on the QoS target and observed user traffic performance, and can be used to determine that a user's resource allocation is insufficient. The algorithm format, in some embodiments, can be logic-based or machine learning-based. In some embodiments, the output can include a recommendation issued to the MAC scheduler to adjust the traffic priority or link adaptation in order to improve performance.

On each machine (e.g., each VM or Pod) that executes a control plane application, some embodiments configure a RIC SDK to serve as an interface between the control plane application on the machine and a set of one or more elements of the RAN. In some embodiments, the RIC SDK provides a set of connectivity APIs (e.g., a framework) through which applications can communicate with the distributed near real-time (RT) RIC implemented by two or more near real-time RICs. Examples of such applications include xApps, and other control plane and edge applications in some embodiments. In O-RAN, xApps perform control plane, monitoring and data processing operations. The discussion below regarding FIGS. 6 and 8-20 refers to control plane applications (e.g., 615, 815, 820, 915, 920, etc.). These control plane applications are xApps in an O-RAN system in some embodiments.

Figure 6:
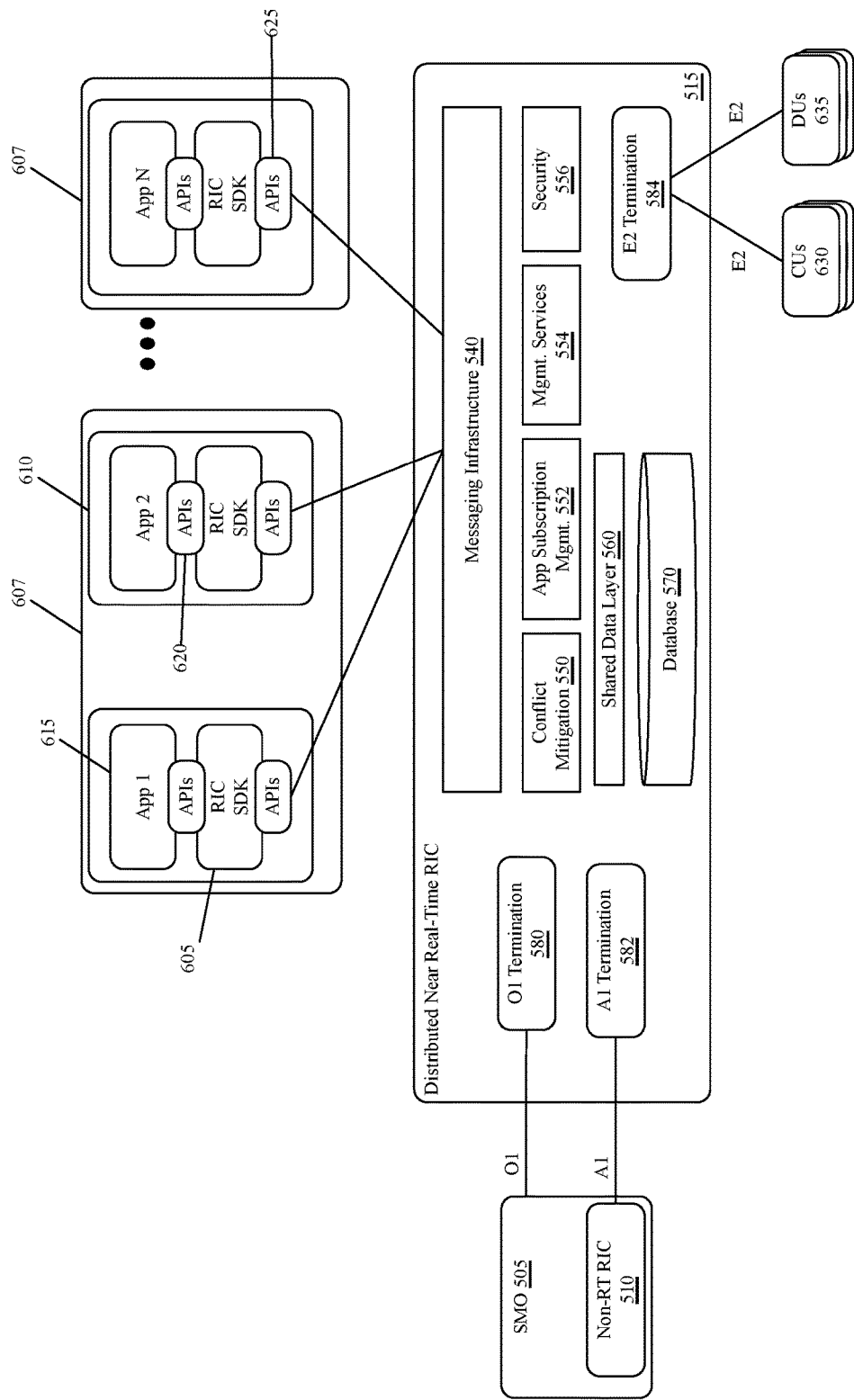
FIG. 6 illustrates deployment of RIC SDKs on machines that execute control plane applications in some embodiments.

FIG. 6 illustrates deployment of RIC SDKs 605 on machines 610 that execute control plane applications 615 in some embodiments. As shown, one or more machines 610 execute on each of several host computers 607 in one or more datacenters. In some embodiments, the MC SDK 605 on each machine 610 includes a set of network connectivity processes that establish network connections to the set of RAN elements (e.g., E2 nodes 520, shared data layer 560, management services 554, SMO 505, etc.) for the control plane application. The MC SDK processes allow the control plane application on their machine to forego performing network connectivity operations. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level APIs 620 that the RIC SDK converts into low-level APIs 625. In some embodiments, at least a subset of the low-level API calls 625 are specified by a standard specifying body. Also, in some embodiments, the high-level APIs 620 are made in a high-level programming language (e.g., C++), while the low-level API calls comprise low-level calls that establish and maintain network connections and pass data packets through these connections.

The set of RAN elements that the RIC SDK connects with the control plane application on its machine in some embodiments include RAN elements that are produced and/or developed by different RAN vendors and/or developers. These RAN elements include CUs 630 and DUs 635 of the RAN in some embodiments. Also, this SDK communicates with the CUs and DUs through the low-level, standard-specified E2 interface, while the control plane application on the machine uses high-level API calls to communicate with the CUs and DUs through the RIC SDK. In some embodiments, the high-level API calls specifying E2 interface operations at a high-level application layer that do not include low-level transport or network operations.

Figure 7:
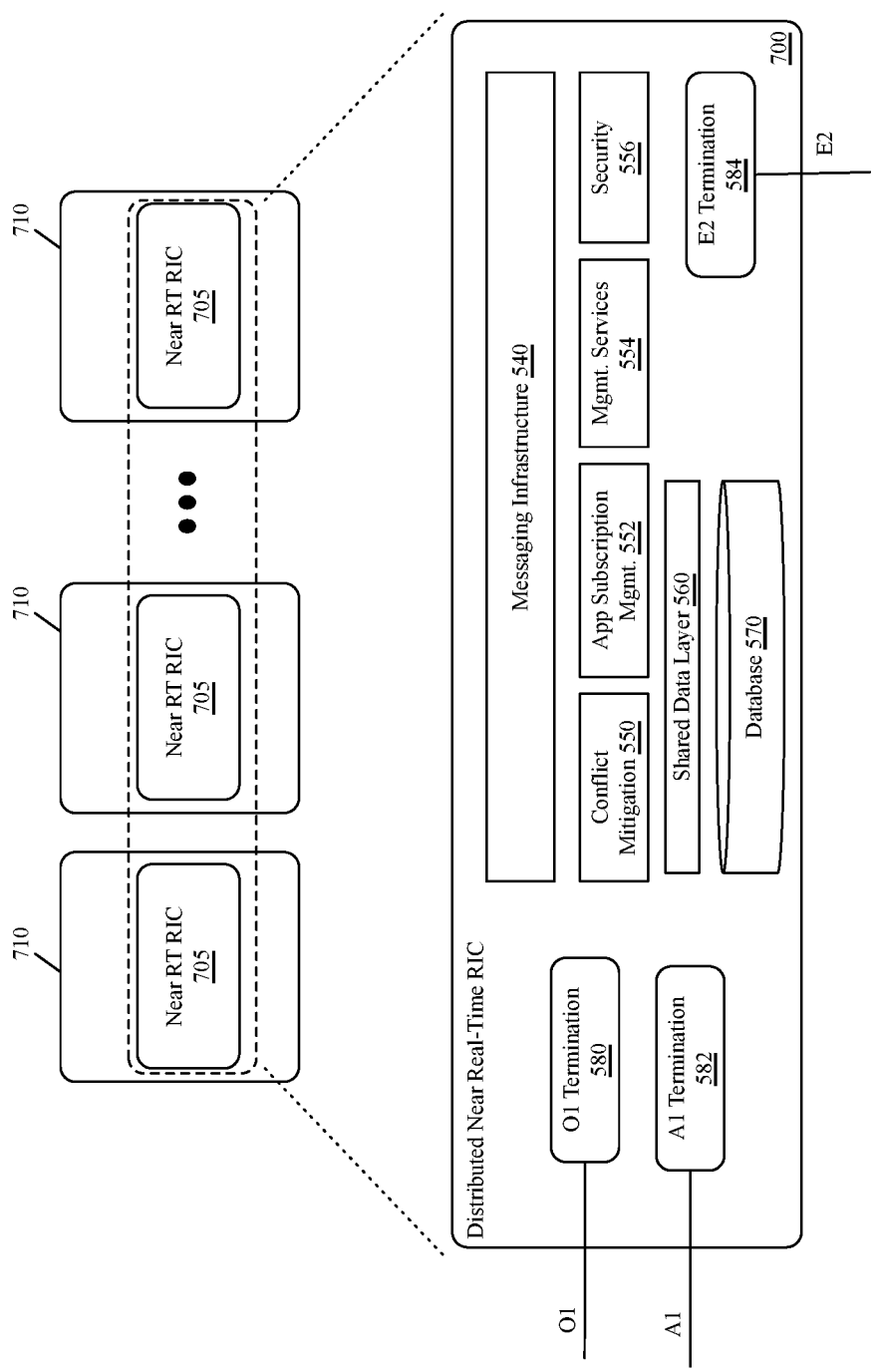
FIG. 7 illustrates that some embodiments deploy several RICs to execute on several host computers to implement a distributed near RT RIC that includes the RIC components illustrated in FIGS. 5 and 6.

Conjunctively, or alternatively, the set of RAN elements that the RIC SDK connects with the control plane application 615 on its machine 610 include network elements of the RIC. Again, these network elements in some embodiments include RAN elements that are produced and/or developed by different RAN vendors and/or developers. These RIC elements in some embodiments include shared data layer (SDL) 560, datapath input/output (I/O) elements, and application and management services 552 and 554 in some embodiments. FIG. 7 illustrates that some embodiments deploy several near RT RICs 705 to execute on several host computers to implement a distributed near RT RIC 700 that includes the RIC components illustrated in FIGS. 5 and 6. In some embodiments, one RIC 705 executes on each host computer that also executes a control plane application 615. In other embodiments, a control plane application 615 can execute on a host computer that does not execute a MC. For instance, in some embodiments, one or more control plane applications execute on one or more host computers that have graphics processing units (GPUs), while RICs do not execute on such host computers as they do not need the processing power of the GPUs.

Through the distributed near RT RIC, the RIC SDK also connects its control plane application to other control plane applications executing on other machines. In other words, the RIC SDK and the distributed near RT RIC in some embodiments serve as communication interface between the control plane applications. In some embodiments, the different control plane applications are developed by different application developers that use the common set of RIC APIs to communicate with each other through the distributed near RT RIC. In some of these embodiments, the distributed near RT RIC adds one or more parameters to the API calls as it forwards the API calls from one control application to the other control application.

Figure 8:
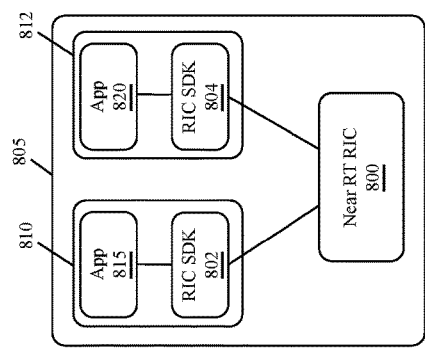
FIG. 8 illustrates a RIC that executes on one host computer along with two machines on which two control plane applications execute.

FIGS. 8-11 illustrate several examples of RIC architectures in which the RIC SDK and the distributed near RT RIC establish the communication interface between control plane applications. These architectures are mutually exclusive in some embodiments, while in other embodiments two or more of these architectures are used conjunctively. FIG. 8 illustrates a RIC 800 that executes on one host computer 805 along with two machines 810 and 812 on which two control plane applications 815 and 820 execute. Through the MC SDKs 802 and 804 executing on the machines 810 and 812, the MC 800 receives API calls from the CP application 815 and forwards the API calls to the CP application 820, and passes responses to these API calls from the second CP application 820 to the first CP application 815. It also passes API calls from the second CP application 820 to the first CP application 815, and responses from the first CP application 815 to the second CP application 820.

Figure 9:
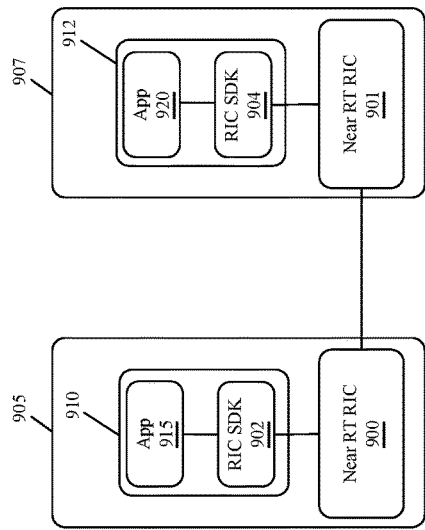
FIG. 9 illustrates two RICs that execute on two host computer along with two machines on which two control plane applications and two RIC SDKs execute.

FIG. 9 illustrates two RICs 900 and 901 that execute on two host computer 905 and 907 along with two machines 910 and 912 on which two control plane applications 915 and 920 and two MC SDKs 902 and 904 execute. As shown, API calls from the first CP application 915 to the second CP application 920 are forwarded through the first MC SDK 902, the first MC 900, the second MC 901 and the second MC SDK 904. The second CP application's responses to these API calls to the first CP application 915 traverse the reverse path, from the second MC SDK 904, the second MC 901, the first MC 900, and the first MC SDK 902.

The API calls from second CP application 920 to the first CP application 915 are forwarded through the second MC SDK 904, the second MC 901, the first MC 900, and the first MC SDK 902, while responses to these API calls from the first CP application 915 to the second CP application 920 are forwarded through the first MC SDK 902, the first MC 900, the second MC 901 and the second MC SDK 904.

Figure 10:
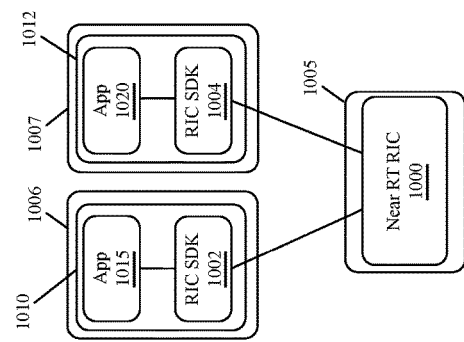
FIG. 10 illustrates a RIC that executes on a first host computer to connect two control plane applications that execute on two machines operating on two other host computers.

FIG. 10 illustrates a RIC 1000 that executes on first host computer 1005 to connect two control plane applications 1015 and 1020 that execute on two machines 1010 and 1012 operating on two other host computers 1006 and 1007. Through the RIC SDKs 1002 and 1004 executing on the machines 1010 and 1012, the MC 1000 receives API calls from the CP application 1015 and forwards the API calls to the CP application 1020, and passes responses to these API calls from the second CP application 1020 to the first CP application 1015. It also passes API calls from the second CP application 1020 to the first CP application 1015, and responses from the first CP application 1015 to the second CP application 1020.

Figure 11:
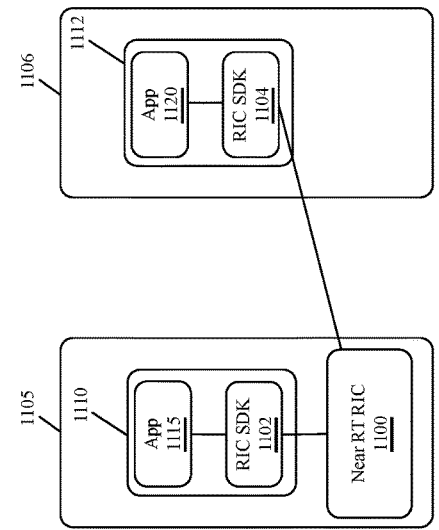
FIG. 11 illustrates a RIC that executes on a first host computer to connect two control plane applications that execute on two machines, one of which operates on the first host computer while the other operates on another host computer.

FIG. 11 illustrates a MC 1100 that executes on first host computer 1105 to connect two control plane applications 1115 and 1120 that execute on two machines 1110 and 1112 one of which operates on host computer 1105 while the other operates on host computer 1106. Through the MC SDKs 1102 and 1104 executing on the machines 1110 and 1112, the MC 1100 receives API calls from the CP application 1115 and forwards the API calls to the CP application 1120, and passes responses to these API calls from the second CP application 1120 to the first CP application 1115. Through these SDKs 1102 and 1104, the MC 1100 also passes API calls from the second CP application 1120 to the first CP application 1115, and responses from the first CP application 1115 to the second CP application 1120.

Figure 12:
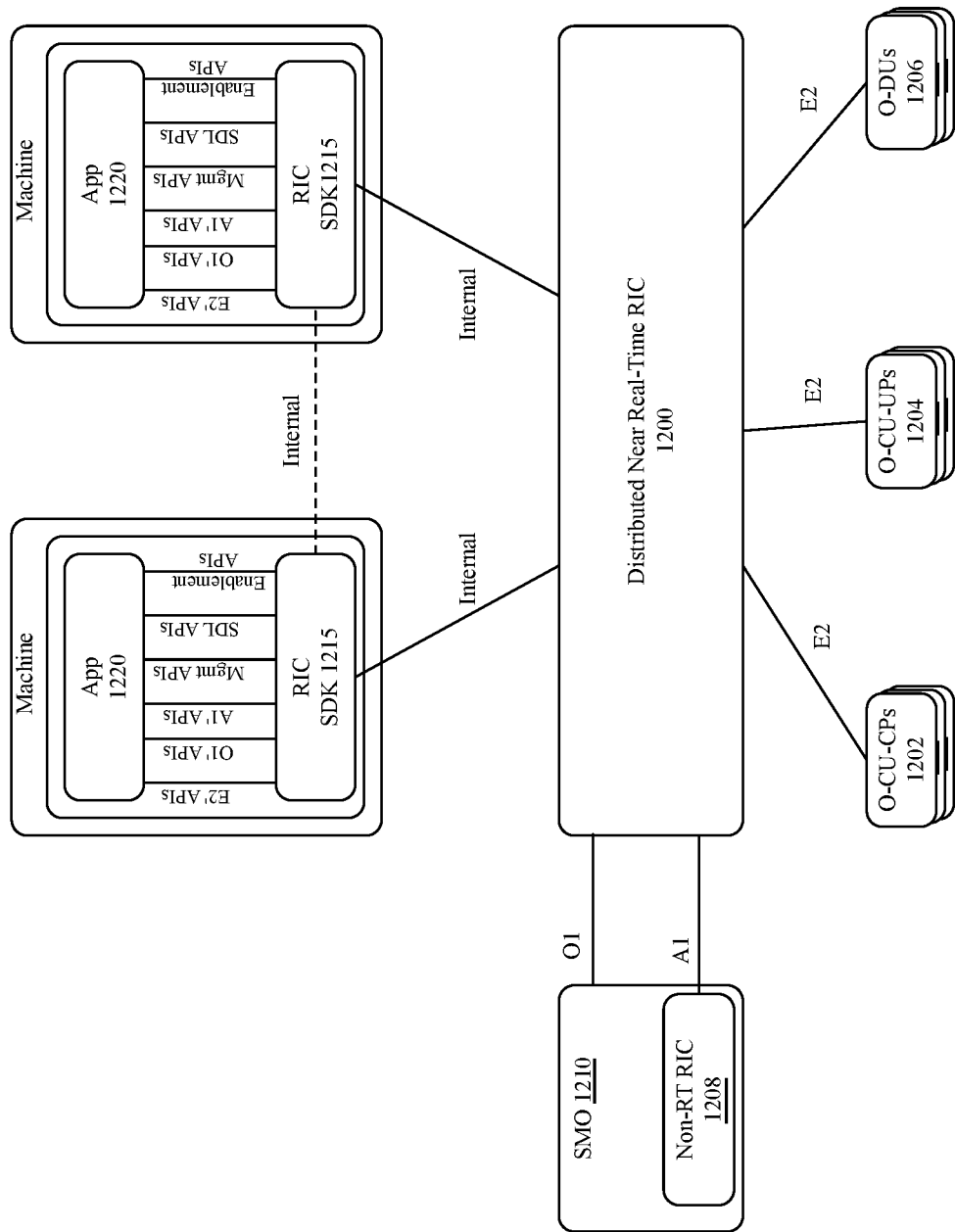
FIG. 12 illustrates examples of the different standard specified APIs that the distributed near RT MC platform of some embodiments supports.

FIG. 12 illustrates examples of the different standard specified APIs that the distributed near RT MC platform of some embodiments supports. As shown, the distributed near RT MC platform 1200 in some embodiments uses the E2, O1, and A1 interfaces specified by the O-RAN standard specifying body. It uses the E2 APIs to communicate with the E2 O-RAN nodes, such as the O-CU-CPs 1202, O-CU-UPs 1204, and O-DUs 1206. It also uses the A1 APIs to communicate with the non-real-time MC platform 1208, and uses the O1 APIs to communicate the SMO 1210.

For each of these E2, A1, and O1 APIs, the MC SDKs 1215 provide high-level counterpart APIs for the control plane applications 1220 that use the MC SDKs and the distributed near RT MC platform to communicate with the E2 nodes 1202-1206, the non-real-time MC platform 1208 and the SMO 1210. FIG. 12 designates these high-level counterpart APIs for the E2, O1, and A1 interfaces with a prime sign as the E2' API calls, O1' API calls and A1' API calls. These high-level counterpart APIs are not specified by a standard body, but are APIs that the MC SDK and/or distributed near RT MC convert into standard specified API calls.

FIG. 12 also shows several internal-RIC APIs for allowing the control plane applications 1220 to communicate with each other through the RIC SDKs and the distributed near RT RIC, and to communicate with one or more elements of the distributed near RT RIC (e.g., shared data layer (SDL) 560, datapath input/output (I/O) elements, and application and management services 552 and 554).

Enablement APIs are the APIs that are used in some embodiments to allow the control plane applications 1220 to communicate with each other. As described above by reference to FIGS. 8-11, these APIs are passed through the distributed near RT RIC in some embodiments. In other embodiments, these APIs allow the RIC SDKs of the control plane applications to directly communicate with each other without traversing through any other components of the distributed near RT RIC. For this reason, FIG. 12 includes a dashed bi-directional arrow between the RIC SDKs 1215 of the two control plane applications 1220 to indicate that in some embodiments the RIC SDKs 1215 of these applications communicate directly with each other.

The enablement APIs in some embodiments include registration APIs, service discovery APIs as well as inter-app communication APIs. Registration APIs are used by the applications 1220 (e.g., xApps) to introduce themselves to other applications 1220 by providing their network identifiers (e.g., their network address and available L4 ports) and providing their functionality (e.g., performing channel prediction). Service discovery APIs allow control plane applications 1220 (e.g., xApps) to query the service directory (e.g., of the distributed near RT RIC) for other control plane applications (e.g., other xApps) that provide a particular service. The inter-app communication APIs allow the control plane applications to communicate with each other to pass along data and/or request certain operations.

Some embodiments deploy an SDL cache on the same host computer as a control plane application, and use this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a MC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

Figure 13:
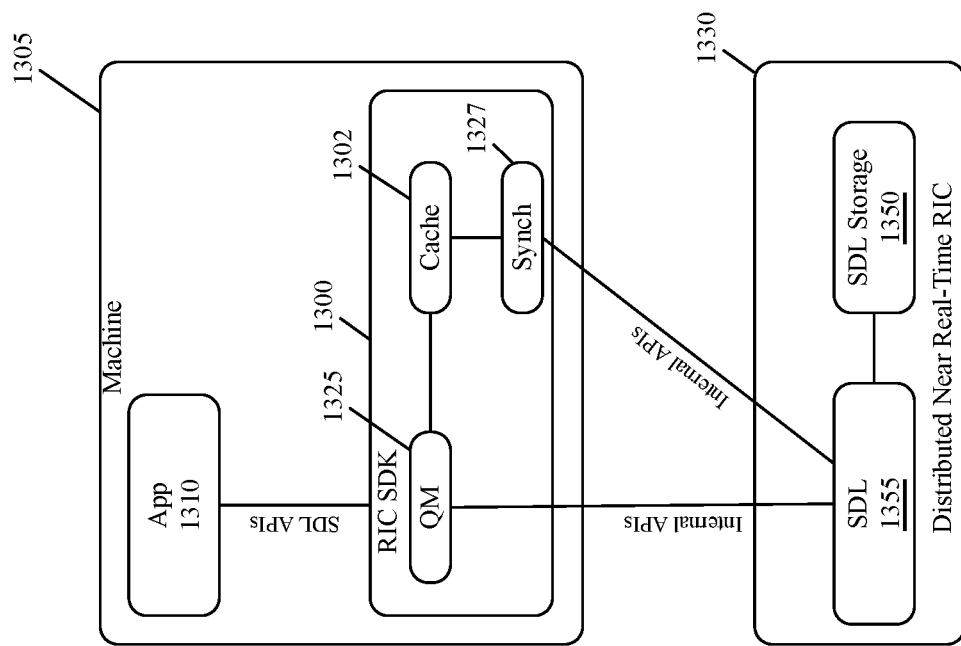
FIG. 13 illustrates embodiments in which the SDL cache is part of each RIC SDK that executes on the same machine as its control plane application.

FIG. 13 illustrates embodiments in which the SDL cache 1302 is part of each RIC SDK 1300 that executes on the same machine 1305 as its control plane application 1310. As shown, the RIC SDK 1300 includes a query manager 132 that processes SDL requests from the CP application 1310 and a synchronizing service 1327 that synchronizes the data stored in the SDL cache with the data stored in an SDL storage 1350 of the SDL 1355 of the distributed near RT RIC 1330. In this example, the SDL storage 1350 operates on a different host computer than the host computer on which the control plane application 1310 executes. However, in other embodiments, at least a portion of the SDL storage 1350 operates on the same host computer on which the control plane application 1310 executes.

When the control plane application 1310 uses a high-level API call to read or write data to the SDL storage, the query manager 1325 of the MC SDK 1300 first determines whether the data record being read or written is stored in the SDL cache 1302. If so, the query manager 1325 reads from or write to this record. When this operation is a write operation, the synchronizing service 1327 writes the new data in real-time or on batch basis to the SDL storage 1350. On the other hand, when query manager 1325 of the MC SDK 1300 determines that the data record being read or written is not stored in the SDL cache 1302, it passes the API call to the SDL layer of the distributed near RT MC to perform the requested read or write operation. When passing this API call, the MC SDK 1300 modifies the format of this call and/or modifies the parameters supplied with this call in some embodiments.

Some embodiments provide various methods for offloading operations in an O-RAN (Open Radio Access Network) onto control plane (CP) or edge applications that execute on host computers with hardware accelerators in software defined datacenters (SDDCs). For instance, at the CP or edge application operating on a machine executing on a host computer with a hardware accelerator, the method of some embodiments receives data, from an O-RAN E2 unit, for which it has to perform an operation. The method uses a driver of the machine to communicate directly with the hardware accelerator to direct the hardware accelerator to perform a set of computations associated with the operation. This driver allows the communication with the hardware accelerator to bypass an intervening set of drivers executing on the host computer between the machine's driver and the hardware accelerator. Through this driver, the application in some embodiments receives the computation results, which it then provides to one or more 0-RAN components (e.g., to the E2 unit that provided the data, to another E2 unit or to another xApp).

FIGS. 14-20 illustrate several different embodiments for offloading O-RAN operations to CP or edge applications that have passthrough access to the hardware accelerators of their host computers. Examples of such a hardware accelerator include a graphical processing unit (GPU), a field-programmable gate array (FPGA), an application-specific integrated circuit (ASIC), and a structured ASIC.

Figure 14:
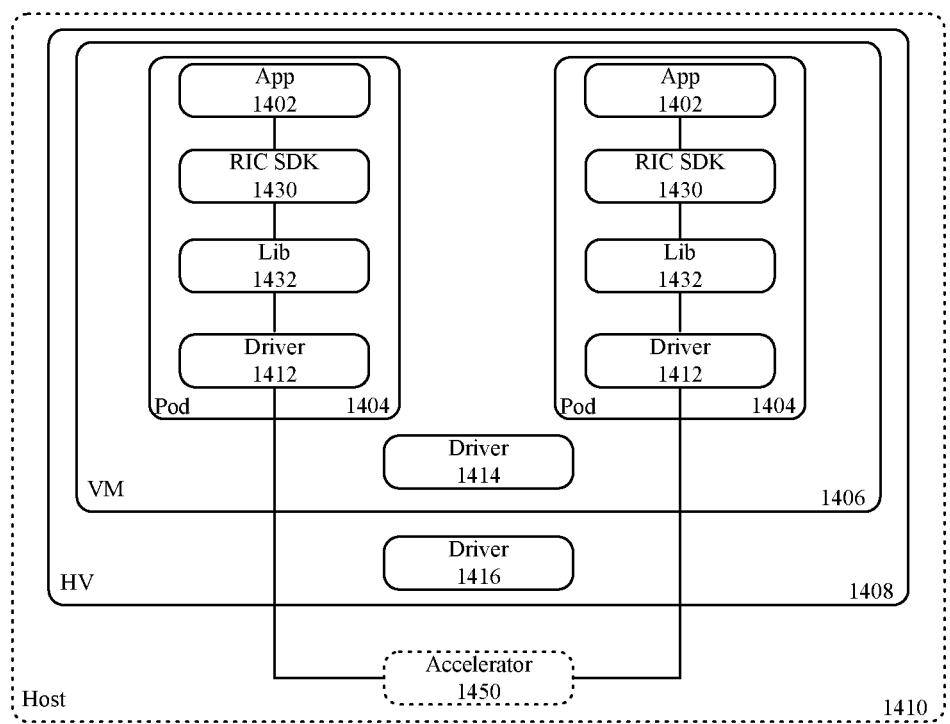
FIG. 14 illustrates an example of control or edge applications that have passthrough access to hardware accelerator of their host computer to perform some or all of their computations.

FIG. 14 illustrates an example of CP or edge applications 1402 that have passthrough access to hardware accelerator 1450 of their host computer 1410 to perform some or all of their computations. As shown, each application 1402 executes on a Pod 1404, which has accelerator drivers 1412 with direct, passthrough access to the accelerator 1450 of their host computer 1410. Each Pod 1404 operates within (i.e., execute on) a VM 1406, which, in turn, executes over a hypervisor 1408 of the host computer.

In some embodiments, a Pod is a small deployable unit of computing that can be created and managed in Kubernetes. A Pod includes a group of one or more containers with shared storage and network resources, and a specification for how to run the containers. In some embodiments, a Pod's contents are always co-located and co-scheduled, and run in a shared context. A Pod models an application-specific logical host computer; it contains one or more application containers that are communicate with each other. In some embodiments, the shared context of a Pod is a set of an operating system namespaces (e.g., Linux cgroups). Within a Pod's context, the individual applications may have further sub-isolations applied.

Each Pod's accelerator driver 1412 has direct accesses to the hardware accelerator 1450, and this access bypasses the hardware accelerator drivers 1414 and 1416 of the VM 1406 and the hypervisor 1408. In some embodiments, the hypervisor 1408 executes over an operating system (not shown) of the host computer 1410. In these embodiments, the direct access of each Pod's accelerator driver 1412 to the hardware accelerator 1450 also bypasses the hardware accelerator driver of the operating system.

To communicate with the hardware accelerator, each application 1402 in some embodiments communicates through the RIC SDK 1430 executing on its Pod. For instance, in some embodiments, each application 1402 uses high-level APIs of the RIC SDK 1430 to communicate with the hardware accelerator 1450. The RIC SDK 1430 then converts the high-level APIs to low-level APIs that are needed to communicate with machine's driver 1412, which, in turn, relays the communication to the hardware accelerator 1450. The low-level APIs are provided by a first company associated with the sale of the hardware accelerator 1450, while the RIC SDK 1430 is provided by a second company associated with the distribution of the RIC SDK 1430. In some embodiments, the low-level APIs used by the RIC SDK 1430 are APIs specified in an API library 1432 associated with the hardware accelerator 1450.

Figure 15:
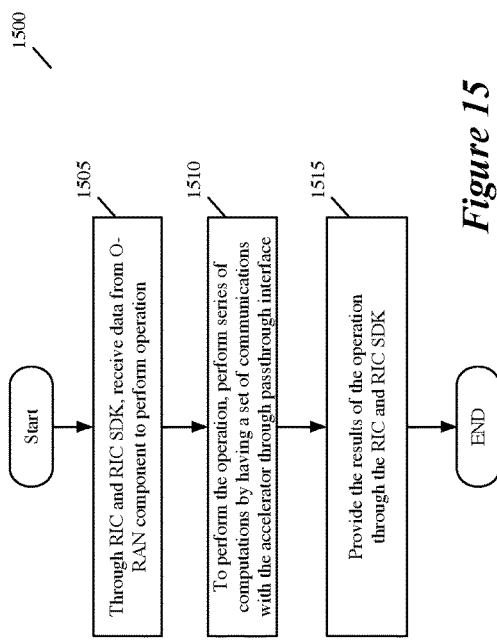
FIG. 15 illustrates a process that is performed in some embodiments in response to an O-RAN component directing a CP or edge application to perform an operation that requires the application to use a hardware accelerator of its host computer.
Figure 16:
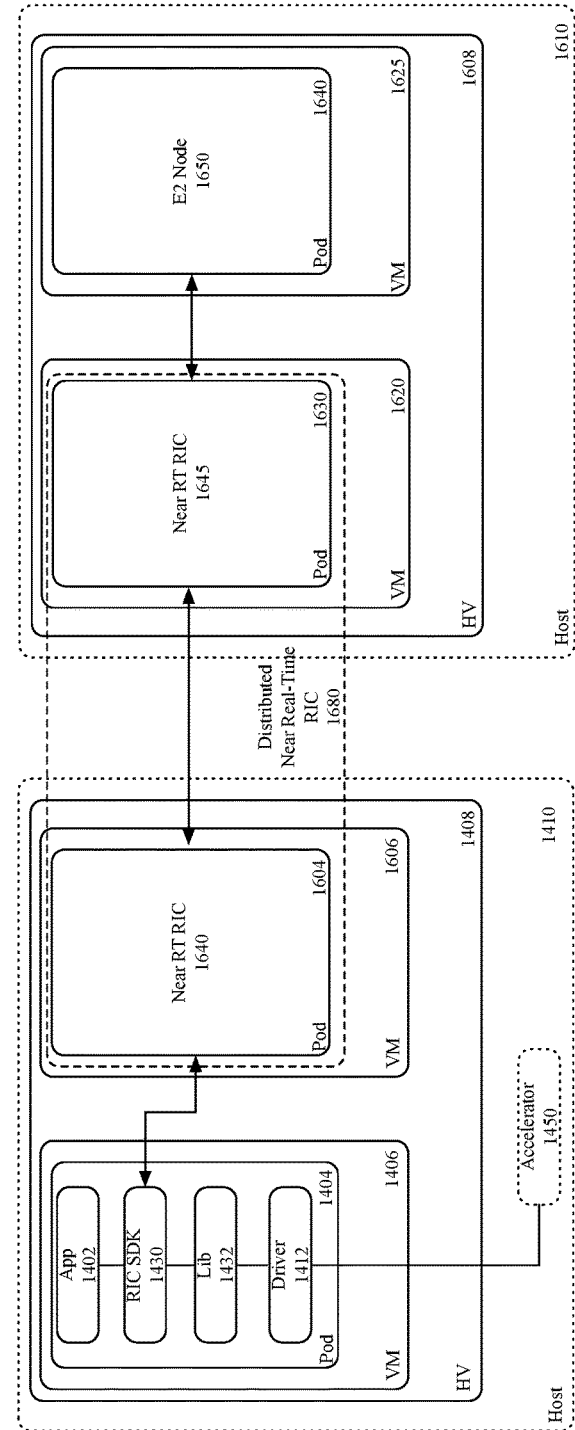
FIG. 16 illustrates an application performing an operation based on data from an E2 node.

FIG. 15 illustrates a process 1500 that implements the method of some embodiments. The process 1500 is performed in response to an O-RAN component directing a CP or edge application to perform an operation that requires the application to use a hardware accelerator of its host computer. This process 1500 will be described below by reference to FIG. 16, which illustrates the application 1402 performing an operation based on data received from an E2 node 1650.

As shown in FIG. 15, the process 1500 starts when the application 1402 (at 1505) receives a data from an O-RAN E2 unit 1650 executing on the host computer 1610. In some embodiments, the application 1402 subscribes for data from the E2 unit 1650, and the data received at 1505 is in response to this subscription. This subscription is made through the distributed near RT MC in some embodiments. The host computers 1410 and 1610 of the application 1402 and the E2 unit 1650 operate in one SDDC in some embodiments. In other embodiments, these two host computers 1410 and 1610 operate in two different physical locations. For example, the host computer 1410 operates in a first location, while the host computer 1610 operates at a second location close to a cell site of the O-RAN. In some embodiments, the second location does not have computers with hardware accelerators that perform complex operations including the received operation.

The application 1402 receives (at 1505) the data from the E2 unit 1650 through (1) the distributed near RT RIC 1680 formed by near RT RICs 1640 and 1645 executing on host computers 1410 and 1610, and (2) the RIC SDK 1430 executing on its Pod 1404. The application 1402 then uses (at 1510) the hardware accelerator 1450 to perform a set of computations associated with the operation.

To communicate with the hardware accelerator 1450, the application 1402 uses high-level APIs provided by the RIC SDK 1430. The RIC SDK 1430 then converts the high-level APIs to low-level APIs specified in the API library 1432 associated with the hardware accelerator 1450. These low-level APIs are then communicated to the hardware accelerator 1450 by the Pod's driver 1412 through its direct, passthrough access to the accelerator 1450, which bypasses the drivers 1414 and 1416 of the VM 1406 and hypervisor 1408. Through this driver 1412, the APIs specified in the API library 1432, and the RIC SDK 1430, the application 1402 also receives the results of the operations (e.g., computations) performed by the hardware accelerator 1450.

The application 1402 provides (at 1515) the result of its operation to one or more O-RAN components, such as the E2 unit 1650 that provided the data that started the process 1500 or the SDL storage. This result is provided through the RIC SDK 1430 and the distributed near RT RIC 1680. In other embodiments, the application 1402 (through the RIC SDK 1430) provides the results of its operation to one or more other applications (applications other than the E2 unit that provided the data for which the application performed its operation) operating on another O-RAN E2 unit or machine executing on the same host computer or on another host computer as the application that uses the hardware accelerator 1450 to perform the operation. The process 1500 ends after 1515.

Figure 17:
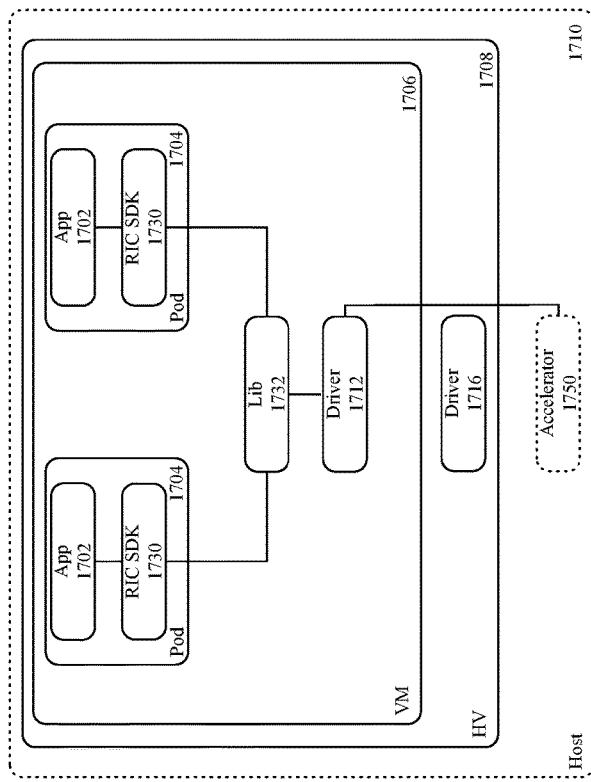
FIG. 17 illustrates another example of a control or edge applications that have passthrough access to a hardware accelerator of their host computer to perform some (or all) of their computations.

Other embodiments use the passthrough access for the O-RAN control or edge application in other deployment settings. For instance, FIG. 17 illustrates another example of CP or edge applications 1702 that have passthrough access to a hardware accelerator 1750 of their host computer 1710 to perform some (or all) of their computations. In this example, each application 1702 (1) executes on a Pod 1704 that executes on a VM 1706, and (2) uses the accelerator driver 1712 of this VM 1706 which has direct, passthrough access to the accelerator 1750 of its host computer 1710. The VM 1706 executes over a hypervisor 1708 operating on the host computer 1710. The VM's accelerator driver 1712 bypasses the hardware accelerator drivers 1716 of the hypervisor 1708. In some embodiments, the hypervisor 1708 executes over an operating system (not shown) of the host computer 1710. In these embodiments, the direct access of the VM's accelerator driver 1712 to the hardware accelerator 1750 bypasses the hardware accelerator driver of the operating system.

To use the hardware accelerator 1750, each application 1702 in some embodiments uses high-level APIs of the RIC SDK 1730 (executing on its Pod 1704) to communicate with the hardware accelerator 1750. The RIC SDK 1730 converts the high-level APIs to low-level APIs that are needed to communicate with VM's driver 1712, which, in turn, relays the communication to the hardware accelerator 1750. In some embodiments, the low-level APIs used by the RIC SDK 1730 are APIs specified in an API library 1732 associated with the hardware accelerator 1750. This API library 1732 is part of the driver interface of the VM 1706.

Figure 18:
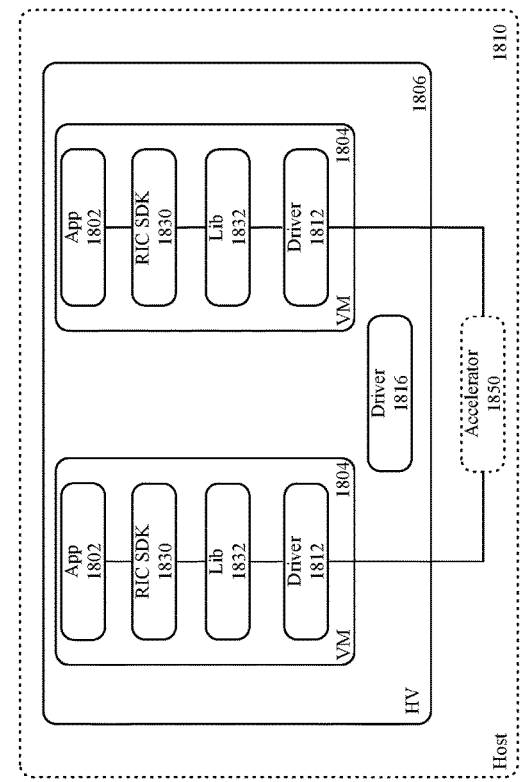
FIG. 18 illustrates yet another example of CP or edge applications that has passthrough access to a hardware accelerator of their host computer to perform some or all of their computations.

FIG. 18 illustrates yet another example of CP or edge applications 1802 that has passthrough access to a hardware accelerator 1850 of their host computer 1810 to perform some or all of their computations. In this example, each application 1802 (1) executes on a VM 1804 that executes on a hypervisor 1806 operating on the host computer 1810, and (2) uses the accelerator driver 1812 of its VM 1804, which has direct, passthrough access to the accelerator 1850 of its host computer 1810.

The VM's accelerator driver 1812 bypasses the hardware accelerator drivers 1816 of the hypervisor 1806. In some embodiments, the hypervisor 1806 executes over an operating system (not shown) of the host computer 1810. In these embodiments, the direct access of the VM's accelerator driver 1812 to the hardware accelerator 1850 bypasses the hardware accelerator driver of the operating system.

To use the hardware accelerator 1850, each application 1802 in some embodiments uses high-level APIs of the RIC SDK 1830 (executing on its Pod 1804) to communicate with the hardware accelerator 1850. The MC SDK 1830 converts the high-level APIs to low-level APIs that are needed to communicate with the VM's driver 1812, which, in turn, relays the communication to the hardware accelerator 1850. In some embodiments, the low-level APIs used by the MC SDK 1830 are APIs specified in an API library 1832 associated with the hardware accelerator 1850. This API library 1832 is part of the driver interface of the VM 1806.

One of ordinary skill will realize that the passthrough access for the O-RAN control or edge application is used in other deployment settings in other embodiments. For instance, instead of operating on Pods, the applications in other embodiments operate on containers. These embodiments then use the hardware accelerator drivers of their Pods or VMs to have passthrough access to the hardware accelerators for the control or edge application. In some of these embodiments, the control or edge application communicates with the hardware accelerator through its associated RIC SDK, and communicates with other O-RAN components (to receive data and to provide results of its processing of the data) through its associated RIC SDK and the distributed near RT RIC connecting the O-RAN components and the application. In some embodiments, the control or edge application in these embodiments performs processes similar to process 1500 of FIG. 15.

The above-described direct, passthrough access to hardware accelerators is quite beneficial for O-RANs. The RIC is all about decoupling the intelligence that used to be embedded within the RAN software (CU and DU) and moving it to the cloud. One benefit of this is to use more advanced computing in the cloud for the xApp and edge operations (e.g., for ML, deep learning, reinforcement learning for control algorithms, etc.). A DU close to a cell site typically cannot run advance computations because it would not be economically feasible to put GPUs at each cell site as network cap X will be very high.

By using the hardware accelerator (GPU, FPGAs, eASICs, ASICs) in the SDDC, some embodiments run complex control algorithms in the cloud. Examples of such xApps include Massive MIMO beam forming and Multi-user (MU) MIMO user pairing, which were described above. Generally, any xApp whose computations can benefit from massive parallelization would gain the benefit of GPU or other accelerators. The use of ASICs is beneficial for channel decoding/encoding (turbo encoding, LDPC encoding, etc.). In some embodiments, the RIC is typically on the same worker VM as xApps. However, in other embodiments, the RICs executes on a different host computer so that more xApps that need GPUs and other hardware accelerators can run on the hosts with the GPUs and/or other hardware accelerators.

Figure 19:
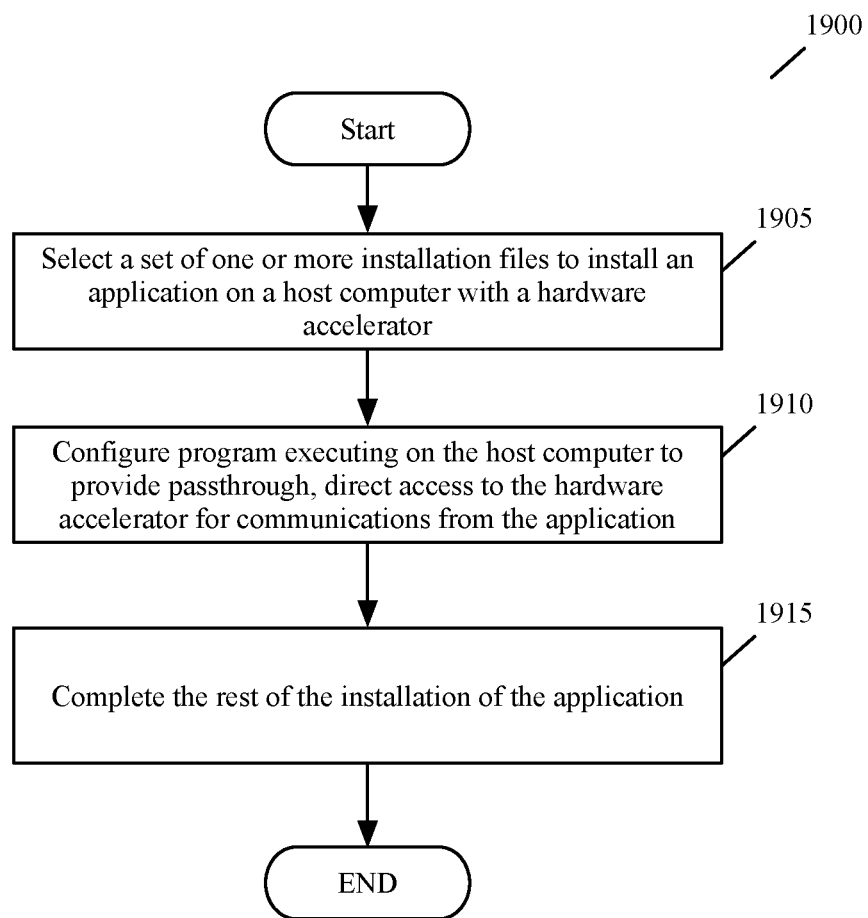
FIG. 19 illustrates a process that some embodiments use to deploy O-RAN applications with direct, passthrough access to the hardware accelerators of their host computers.

FIG. 19 illustrates a process that some embodiments use to deploy O-RAN applications with direct, passthrough access to the hardware accelerators of their host computers. To install an application on a host computer, the process 1900 selects (at 1905) a set of one or more installation files that includes a description for configuring passthrough access for the application to a hardware accelerator of the host computer. In some embodiments, the set of files includes one description file that specifies direct, passthrough access for the application to the hardware accelerator of its computer.

The process 1900 uses (at 1910) the set of installation files to configure, based on the description relating to the passthrough access, a program executing on the host computer to pass calls from a particular hardware accelerator driver associated with the application to the hardware accelerator without going through an intervening set of one or more drivers for the hardware accelerator that executes on the host computer between the particular hardware accelerator driver and the hardware accelerator. This configuration allows the application to bypass the intervening set of drivers when directing the hardware accelerator to perform operations for the application and to receive the results of the operations from the hardware accelerator.

The program that is configured at 1910 in some embodiments is the host's operating system, while in other embodiments it is a hypervisor executing on the host computer. In still other embodiments, the program is a virtual machine (VM) and the application operates on a Pod or container that executes on the VM. The process 1900 completes (at 1915) the installation of the application by processing the remaining set of installation files selected at 1905, and then ends. In other embodiments, the process 1900 performs the configuration of the program as its last operation instead of as its first operation at 1910. In still other embodiments, it performs this configuration as one of its intervening installation operations.

Before performing the selection and configuration, the deployment process of some embodiments identifies the host computer from several host computers as the computer on which the application should be installed. The process in some embodiments identifies the host computer by determining that the application requires a hardware accelerator, identifying a set of host computers that each comprise a hardware accelerator, and selecting the host computer from the set of host computers. The process selects the host computer by (1) determining that the application will need to communicate with a set of one or more other applications that execute on the selected host computer, and (2) selecting the host computer as the set of other applications simultaneously executes on the host computer. This installation of the application with the set of other applications on the selected host computer reduces communication delay between the application and the set of other applications.

Some embodiments have the hardware accelerator drivers of the O-RAN control or edge applications communicate with virtualized hardware accelerators that are offered by an intervening virtualization application (e.g., hypervisor) that executes on the same host computer as the application. For instance, the method of some embodiments deploys a virtualization application on a host computer for sharing resources of the host computer among several machines executing on the host computer. This computer has a first set of one or more physical hardware accelerators.

The method deploys several applications on several machines to perform several O-RAN related operations for a set of O-RAN components. Through the virtualization application, the method defines a second set of two or more virtual hardware accelerators that are mapped to the first set of physical hardware accelerators by the virtualization application. The method assigns different virtual hardware accelerators to different applications. The method also configures the applications to use their assigned virtual hardware accelerators to perform their operations.

In some embodiments, the deployed machines are Pods, and the applications are deployed to execute on the Pods. At least two Pods execute on one VM that executes above the virtualization application. This VM includes a hardware accelerator driver that is configured to communicate with two different virtual hardware accelerators for the two applications executing on the two Pods. In other embodiments, multiple Pods execute on one VM that executes above the virtualization application, and each Pod has a hardware accelerator driver that is configured to communicate with a virtual hardware accelerator that is assigned to that driver.

Figure 20:
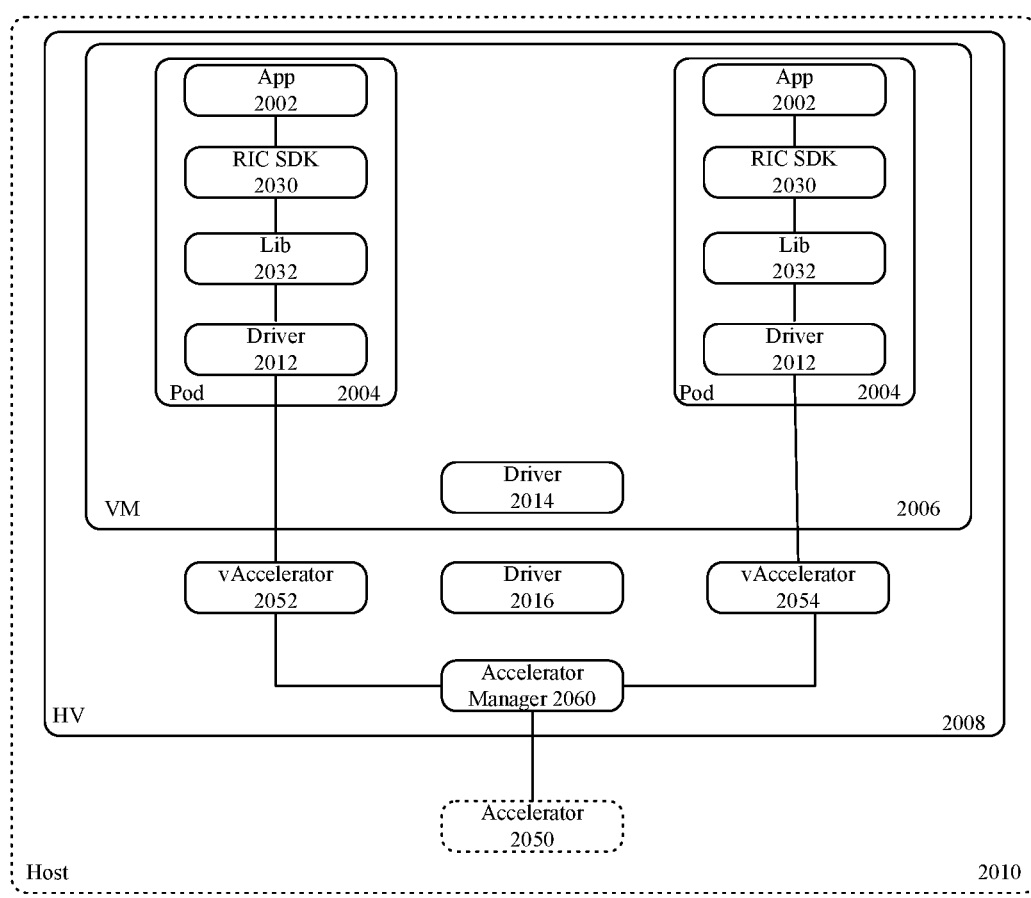
FIG. 20 illustrates an example of CP or edge applications that have passthrough access to virtual hardware accelerator defined by a hypervisor executing on their host computer.

FIG. 20 illustrates an example of CP or edge applications 2002 that have passthrough access to virtual hardware accelerator 2052 and 2054 defined by a hypervisor 2008 executing on their host computer 2010, in order to perform some or all of their computations. As shown, each application 2002 executes on a Pod 2004, which has accelerator drivers 2012 with direct, passthrough access to virtual accelerators 2052 or 2054. Each Pod 2004 operates within (i.e., execute on) a VM 2006, which, in turn, executes over a hypervisor 2008 of the host computer 2010.

Each Pod's accelerator driver 2012 has direct access to the virtual accelerator 2052 or 2054, and this access bypasses the accelerator drivers 2014 and 2016 of the VM 2006 and the hypervisor 2008. In some embodiments, the hypervisor 2008 executes over an operating system (not shown) of the host computer 2010. In these embodiments, the direct access of each Pod's accelerator driver 2012 to the virtual accelerator 2052 or 2054 also bypasses the hardware accelerator driver of the operating system.

As shown, the virtual accelerators 2052 and 2054 communicate to the hardware accelerator 2050 through the accelerator manager 2060 of the hypervisor 2008. The accelerator manager 2060 allows the virtual accelerators 2052 and 2054 (and in turn their associated applications 2002) to share one hardware accelerator 2050, while operating with this accelerator 2050 as if it is dedicated to their respective applications and Pods 2002 and 2004. Examples of such a hardware accelerator 2050 include a graphical processing unit (GPU), a field-programmable gate array (FPGA), an application-specific integrated circuit (ASIC), and a structured ASIC.

To communicate with its virtual accelerator 2052 or 2054, each application 2002 in some embodiments communicates through the RIC SDK 2030 executing on its Pod 2004. For instance, in some embodiments, each application 2002 uses high-level APIs of the RIC SDK 2030 to communicate with its virtual accelerator 2052 or 2054. The MC SDK 2030 then converts the high-level APIs to low-level APIs that are needed to communicate with each machine's driver 2012, which, in turn, relays the communication to the virtual accelerator 2052 or 2054. The virtual accelerator 2052 or 2054 then relays the communications to the hardware accelerator 2050 through the accelerator manager 2060.

As mentioned above by reference to FIG. 14, in some embodiments, the low-level APIs are provided by a first company associated with the sale of the hardware accelerator 2050, while the MC SDK 2030 is provided by a second company associated with the distribution of the MC SDK 2030. In some embodiments, the low-level APIs used by the MC SDK 2030 are APIs specified in an API library 2032 associated with the hardware accelerator 2050. Each application 2002 receives the results of the operations of the hardware accelerator 2050 through the accelerator manager 2060, its virtual accelerator 2052 or 2054, its driver 2012, and its MC SDK 2030.

To provide a low latency near RT MC, some embodiments separate the RIC's functions into several different components that operate on different machines (e.g., execute on VMs or Pods) operating on the same host computer or different host computers. Some embodiments also provide high speed interfaces between these machines. Some or all of these interfaces operate in non-blocking, lockless manner in order to ensure that critical near RT MC operations (e.g., datapath processes) are not delayed due to multiple requests causing one or more components to stall. In addition, each of these RIC components also has an internal architecture that is designed to operate in a non-blocking manner so that no one process of a component can block the operation of another process of the component. All of these low latency features allow the near RT RIC to serve as a high speed IO between the E2 nodes and the xApps.

Figure 21:
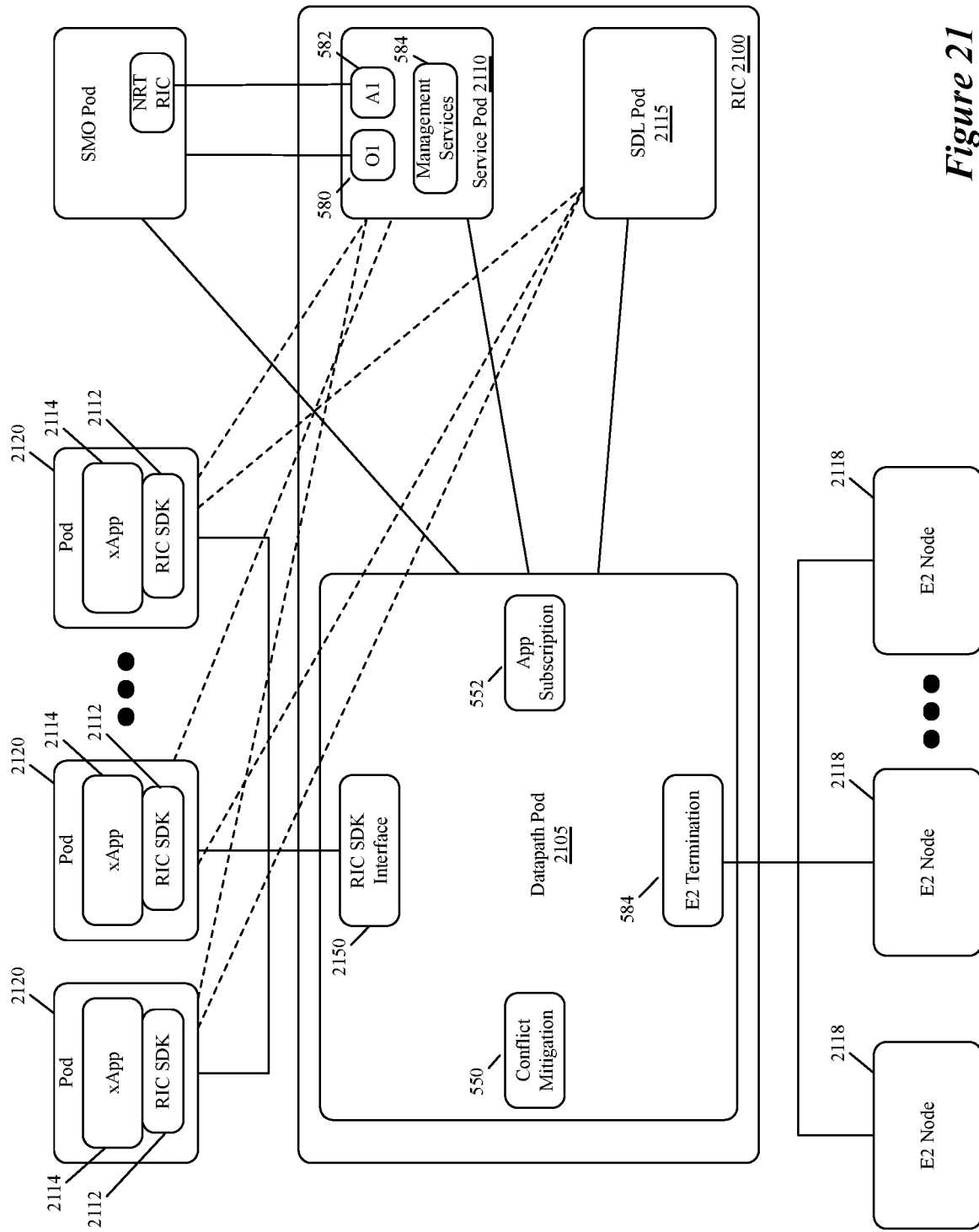
FIG. 21 illustrates an example of a near RT RIC with several components operating on several different machines.

FIG. 21 illustrates an example of a near RT RIC 2100 with several components operating on several different machines. In this example, the near RT RIC is divided into three Pods, which are a datapath Pod 2105, a service Pod 2110, and an SDL Pod 2115. In some embodiments, this RIC (1) handles E2AP messages between the E2 nodes 2118 and the xApps 2120, (2) manages connections with the E2 nodes 2118, (3) processes xApp subscriptions to E2 nodes, and (4) handles xApp liveness operations. The RIC 2100 provides reliable low-latency messaging between its various components, between the E2 nodes and xApps, and between E2 nodes/xApps and the RIC components. Part of the RIC's low latency architecture is attributable to using different Pods to implement the data IO, service and SDL operations, so that different resource allocations and management operations can be provided to each of these Pods based on its respective needs of the operations that they perform in several different Pods.

Each of the three RIC Pods 2105, 2110, and 2115 communicates with one or more xApp Pods 2120. In some embodiments, each Pod (2105, 2110, 2115 or 2120) is allocated hardware resources (e.g., CPUs, memory, disk storage, network IO, etc.) per the Pod's unique needs (i.e., per the datapath, service and storage operations performed by each Pod). Also, in some embodiments, each Pod has its own high availability and lifecycle update configuration that matches the unique needs of each Pod.

The service Pod 2110 performs xApp onboarding, registration, FCAPS (fault, configure, accounting, performance, security), and other services in some embodiments. For instance, in some embodiments, the service Pod 2110 provides the management services 554 of the near RT RIC, and performs the O1 termination 580 and the A1 termination 582 to the SMO and its associated non-RT RIC. In some embodiments, each of these components 554, 580 and 582 operate on a separate container in the service Pod 2110, while in other embodiments two or more of these components operate on one container in the service Pod 2110.

As mentioned above, the A1 Interface is between the near-RT RIC and the non-RT RIC in some embodiments. Through this interface, the near RT RIC relays relevant network information as reported by E2 nodes (e.g., CUs and DUs), and the non-RT RIC provides control commands for the E2 nodes (e.g., for control use-cases operation in non-RT granularities). The O1 Interface is between the near-RT RIC and the SMO, and in some embodiments is used for discovery, configuration, resource management and auto-scaling, life-cycle management, and fault tolerance.

The RIC management services 554 in some embodiments include services that the near RT RIC provides to the xApps and to the other RIC components. Examples of the services provided to the xApps include xApp service registry/directory (which the xApps can use to identify other xApps associated with the distributed near RT RIC and the operations performed by these other xApps), and FCAP operations, such as metric collection, policy provisioning and configuration. In some embodiments, the xApps can query the service registry/directory to identify other xApps or other xApps that perform particular services, and can register to receive notifications regarding xApps and their capabilities when the xApps are added to the directory.

Examples of FCAP operations performed by the service Pod 2110 for the xApp include fault operations involving collecting metrics that monitor CPU and memory utilizations to analyze to raise alerts, configuration operations to configure or re-configure the xApps, accounting operations to collect data needed for accounting and performance operations to collect metrics from xApps to analyze to quantify the xApp performance.

For the other RIC components (e.g., the datapath Pod 2105 and the SDL Pod 2115), the service Pod 2110 performs services as well, such as metric collection, policy provisioning and configuration. The service Pod 2110 can be viewed as a local controller that performs operations at the direction of a central controller, which is the SMO. Through the SMO, the service Pod 2110 would receive configuration and policies to distribute to the xApps and the other RIC components. Also, to the SMO, the service Pod 2110 provides metrics, logs and trace data collected from the xApps and/or RIC components (e.g., the datapath Pod and the SDL Pod).

In some embodiments, the service Pod can be scaled (e.g., replicated) and backed up independently of the other Pods. In some embodiments, the service Pod has a data cache that is a cache for a time series database of the SMO. In this cache, the service Pod stores stats, logs, trace data and other metrics that it collects from the xApps and one or more MC components before uploading this data to the SMO database.

The SDL Pod 2115 implements the SDL 560 and its associated database 570. As further described below, the SDL Pod 2115 in some embodiments also executes one or more service containers to execute one or more preprocessing or post-processing services on the data stored in the SDL. Like the service Pod, the SDL Pod in some embodiments can be scaled (e.g., replicated) and backed up independently of the other Pods.

The datapath Pod 2105 includes several important near RT RIC components. These are the E2 termination 584, the conflict mitigation 550, the application subscription management 552, and the RIC SDK interface 2150. As further described below, some or all of these datapath services in some embodiments are embedded in a datapath thread and a control thread of the datapath Pod. In other embodiments, the datapath services are embedded in a data IO thread, multiple data processing threads and a control thread.

A thread is a component of a process that executes on a computer. The process can be an application or part of a larger application. A thread is a sequence of programmed instructions that can be managed independently of other threads of the process. Multiple threads of a given process can execute concurrently (e.g., by using multithreading capabilities of a multi-core processor) while sharing the memory allocated to the process. Multithreading is a programming and execution model that allows multiple threads to exist within the context of one process. These threads share the process's resources, but are able to execute independently.

The control thread in some embodiments is the interface with the service Pod and SDL Pod for the datapath threads, while in other embodiments it is the interface to just the service Pod for the datapath threads (as the datapath threads can communicate directly with the SDL Pod). The control thread in either of these approaches performs the slower, control related operations of the datapath, while the one or more datapath threads perform the faster IO operations of the datapath. The control thread in some embodiments interfaces with the service Pod to receive configuration data for configuring its own operations as well as the operations of the datapath thread.

The embodiments that separate the datapath thread into a data IO thread and multiple data processing threads further optimize the data IO by pushing the more computationally intensive operations of the datapath thread into multiple datapath processing threads, which then allows the less computationally intensive operations to run in the data IO thread. Both of these optimizations are meant to ensure a fast datapath IO (one that does not experience unwanted latencies) so that the near RT RIC can serve as a high speed interface between E2 nodes 2118 and xApps 2120.

As mentioned above, the Pods 2105, 2110 and 2115 communicate through high speed inter Pod interfaces. In some embodiments, the Pod-to-Pod connections are established through SCTP (streaming control transport protocol) or through even higher speed shared memory (shmem) connections. In some embodiments, the shared memory connections are employed only between a pair of Pods that executes on the same host computer. Examples of such pairs of Pod include (1) a datapath Pod and an SDL Pod, (2) a datapath Pod and a service Pod, (3) a service Pod and an SDL Pod, (4) an xApp Pod and a datapath Pod, (5) an xApp Pod and an SDL Pod, etc. The shared memory is lockless and access to it is non-blocking in some embodiments. Other embodiments use slower interfaces (e.g., gRPC) between the service Pod 2110 and the other Pods 2105, #115, and 2120 as the service Pod is not as critical a Pod as the other Pods.

Figure 22:
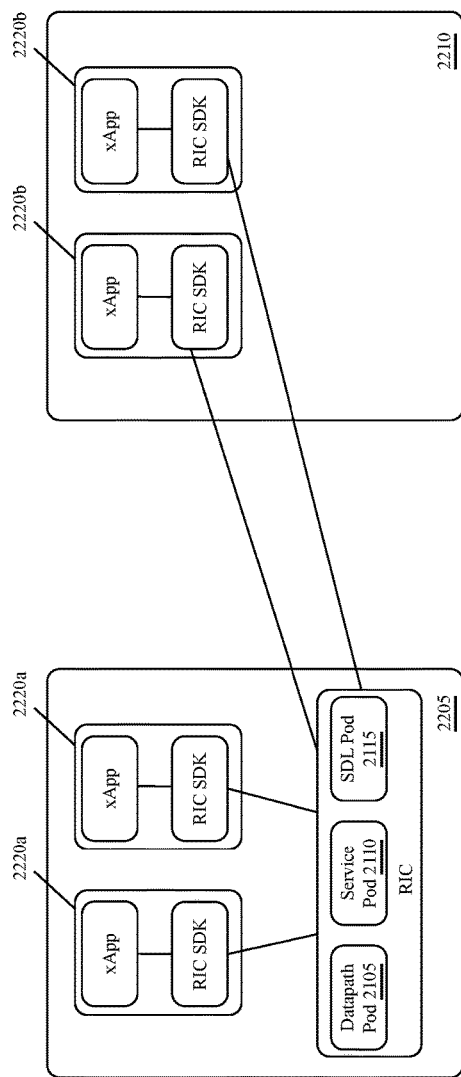
FIGS. 22 and 23 illustrates different examples for deploying the components of the near RT RIC of FIG. 21.

The different Pods (e.g., 2105, 2110 and 2115) of a near RT RIC in some embodiments can execute on the same host computer or can execute on two or more host computers. In other embodiments, one or more of the Pods (e.g., the service Pod 2110) always operates on a separate host computer than the other Pods (e.g., the datapath Pod 2105 and the SDL Pod 2115). Also, in some embodiments, the Pods 2105, 2110 and 2115 operate on one host computer 2205 along with one or more xApp Pods 2220a, while other xApp Pods 2220b operate on other host computers 2210, as shown in FIG. 22. In other embodiments, two of the Pods 2105, 2110 and 2115 operate on one host computer along with one or more xApp Pods, while the other one of the Pods 2105, 2110 and 2115 operates on another host computer along with one or more xApp Pods.

Figure 23:
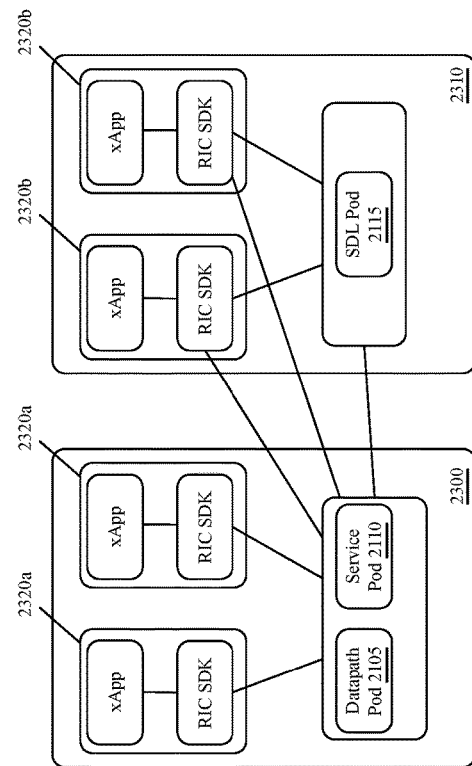

For instance, FIG. 23 illustrates the datapath Pod 2105 and service Pod 2110 executing on a host computer 2300 along with two xApp Pods 2320a, while the SDL Pod 2115 executes on a host computer 2310 along with two xApp Pods 2320b. In some embodiments, Pods that require hardware accelerators are placed on host computers with such hardware resources, while Pods that do not require these accelerators are put on host computers without these accelerators, as mentioned above. In some embodiments, SDL Pods and xApp Pods use hardware accelerators, while the datapath Pod and service Pods do not. Various examples of Pods that can benefit from hardware accelerators and bypass paths to these accelerators are described above and further described below.

Also, although several near RT RICs are described above and below as being implemented with Pods, the near RT RICs in other embodiments employ VMs to implement the RIC components. Moreover, even in the embodiments that implement the different RIC components with Pods, some or all of the Pods operate on VMs, such as lightweight VM (e.g., Photon VMs provided by VMware, Inc.).

In addition to using fast communication interfaces between the Pods, some or all of the Pods use non-blocking, lockless communication protocols and architectures in some embodiments. For instance, the datapath Pod 2105 uses non-blocking, lockless communication between threads and processes that make up this Pod. Datapath Pod 2105 also uses non-blocking, lockless communication when communicating with the service Pod 2110, the SDL Pod 2115 or the xApp Pods 2120. Non-blocking communication ensures that no first component that sends a request to a second component can stall the operations of the second component when the second component is processing too many requests. In such cases, the second component will direct the first component to resend its request at a later time. The datapath Pod employs lockless communication in that it uses single thread processing that does not employ thread handoffs. Hence, no portion of memory has to be locked to ensure that another process thread does not modify it in an interim time period.

The communication interface between the RIC SDK interface 2150 of the datapath Pod 2105 and the RIC SDK 2112 of an xApp Pod 2120 is also novel in some embodiments. In some embodiments, this interface parses the header of E2AP messages received from E2 nodes, stores some or all of the parsed components in a new encapsulating header that encapsulates the E2SM payload of the E2AP message along with some or all of the original E2AP header. In doing this encapsulation, the SDK interface 2150 in some embodiments performs certain optimizations, such as efficiently performing data packing to reduce message size overhead for communications from one Pod to another (e.g., reduces the size of the E2 Global ID value, etc.). These optimizations improve the efficiency of the near RT RIC datapath Pod and xApp Pod communication.

Figure 24:
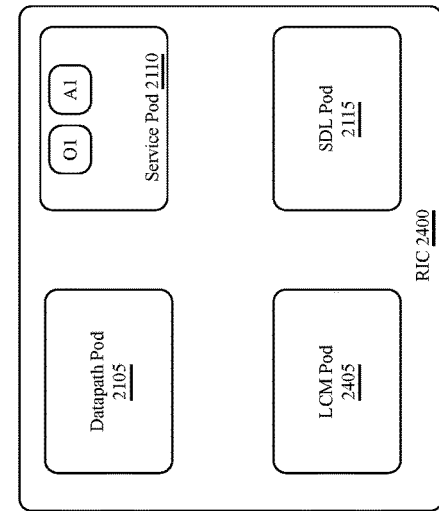
FIGS. 24 and 25 illustrate other examples of a near RT RIC.

The near RT RIC in other embodiments has one or more other Pods. For instance, FIG. 24 illustrates a near RT MC 2400 that in addition to the Pods 2105, 2110, and 2115, also includes a lifecycle management (LCM) Pod 2405. The LCM Pod is a specialized service Pod responsible for upgrading each of the other Pods 2105, 2110 and 2115 of the near RT MC 2400. Separating the lifecyle management from the service Pod 2110 allows the service Pod 2110 to be upgraded more easily.

In some embodiments, the LCM Pod 2405 uses different upgrade methodology to upgrade the different Pods. For instance, the LCM Pod in some embodiments replicates the SDL data store and seamlessly transitions from an active data store to another standby datastore in order to perform a hitless upgrade of the SDL. On the other hand, to upgrade the datapath Pod, the LCM Pod's procedure is more involved, as it configures the active and standby datapath Pods to be dual-homed connections for each E2 node and each xApp, and configures the active datapath Pod to replicate state with the standby datapath.

Figure 25:
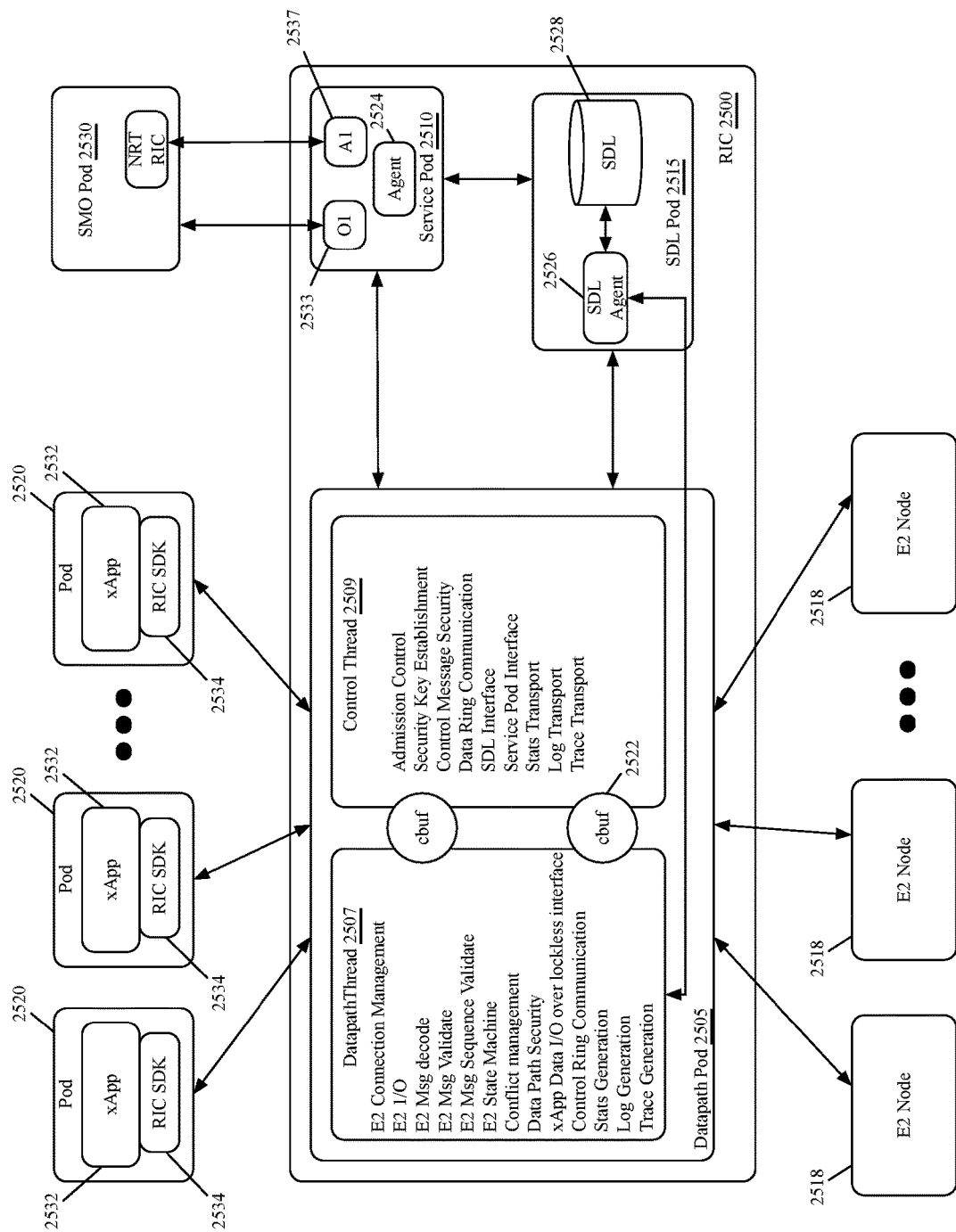

FIG. 25 presents a more detailed view of a near RT RIC 2500 for some embodiments. As shown, the near RT RIC 2500 includes a datapath Pod 2505, a service Pod 2510 and an SDL Pod 2515. The SDL Pod 2515 includes an SDL agent 2526 and the shared SDL storage 2528 of the RIC 2500, while the service Pod 2510 includes a service agent 2524 along with the O1 and A1 termination interfaces 2535 and 2537. The datapath Pod 2505 includes a datapath thread 2507 and a control thread 2509.

The datapath thread 2507 provides a fast datapath IO of the near RT RIC between the E2 nodes 2518 and the xApps 2520. The data plane capabilities of the RIC in some embodiments can be scaled up by implementing the RIC datapath IO with one control thread and multiple datapath threads that share the load for the datapath processing of the datapath Pod. Several such implementations will be further described below. The control thread 2509 performs several control operations associated with the RIC's datapath. The near RT RIC 2500 separates the control and datapath threads because the data IO operations need to be fast and should not be slowed down by control operations that can operate at a slower rate. In some embodiments, the control and datapath threads are two threads in a single process (i.e., run in the same shared memory address space).

In some embodiments, each of these threads uses non-blocking, lockless interfaces to communicate with other components in this architecture (e.g., with the RIC SDK, service Pod agent, SDL agent, and/or E2 nodes) to the extent that they communicate with these other components. Also, in some embodiments, both threads use minimal OS system calls and run as infinite loops. As further described below, the datapath thread and the control thread exchange data over two circular rings 2522 (called cbuf), with one ring handling messages from the datapath thread to the control thread and the other handling messages from the control thread to the datapath thread.

The control thread 2509 serves as the control interface to the E2 nodes 2518, the SMO 2530 (through the service Pod agent 2524), the xApps (e.g., through SCTP), and the SDL Layer (through the SDL agent 2526). In some embodiments, the control thread is the main thread to communicate with these external entities; however, as further described below, the datapath thread in some embodiments also communicates with the SDL 2515 through the SDL agent 2526.

The control thread 2509 in some embodiments handles all control functions. This thread sends various control parameters to other functions, and in some embodiments enforces admission controls. In other embodiments, the datapath thread 2507 enforces admission controls and the SMO through the service Pod specifies the admission controls. The control thread 2509 in some in some embodiments has control channel communications with the RIC SDK of an xApp Pod through SCTP. In other embodiments, the control thread communicates with the RIC SDK of an xApp Pod through gRPC. Also, in some embodiments, the control thread communicates with the RIC SDK through shared memory (shmem) when the xApp Pods and the datapath Pod execute on the same host computer The control thread 2509 also provides the transport mechanism to transport the statistics, logs and trace data generated by the datapath thread 2507. In some embodiments, some or all of this data is transported to the SDL Pod 2515 through the SDL agent 2526 and/or to the SMO 2530 through the service agent 2524. The control thread 2509 in some embodiments negotiates security keys with E2 node peers, and passes these keys to the datapath thread, which uses them to perform its encryption/decryption operations.

The datapath thread 2507 provides the high speed IO between E2 nodes and xApps. This thread handles the RIC SDK interface and the E2 termination operations, as well as the conflict mitigation and xApp subscription operations in some embodiments. This thread performs ASN.1 decoding of E2AP messages to extract the message data. In some embodiments, the datapath thread does not decode the E2SM payload of these messages. The datapath thread 2507 validates E2 and xApp messages and sequences. In some embodiments, the message types include E2 node setup and service update, E2 node indication reports, xApp initiated subscriptions for E2 node data and xApp initiated control requests.

The datapath thread 2507 in some embodiments runs E2 state machines in order to create and maintain state on behalf of xApps (e.g., state of E2 nodes, subscriptions to E2 nodes, etc.). Also, in some embodiments, the datapath thread performs table lookups to send messages to xApps that request data. This thread also handles control requests from xApps towards E2 nodes and forwards back responses to these requests from the E2 node to the xApps.

The datapath thread communicates with the xApps through SCTP when the xApps are on another host computer, or through shared memory when the xApps are on the same host computer. In some embodiments, the xApp messages have CRC bits to detect corruption. These messages also carry timestamps and can be compressed in some embodiment. The datapath thread 2507 performs data replication for multiple subscriptions. The datapath thread 2507 also performs datapath security operations, e.g., by signing, encrypting and decrypting data messages.

As mentioned above and further described below, the datapath thread 2507 communicates with the control thread 2509 in some embodiments via a pair of rings 2522. In some embodiments, the frequency of messages between the two threads can be tuned (e.g., can be configured) to be from sub milliseconds to seconds per ring pair. Through the control thread, the datapath thread 2507 receives configuration data updates and state changes. The datapath thread 2507 generates statistics, logs and traces and provides the generated statistics, logs and trace data to the control thread for storage in the SDL and/or to provide to the SMO.

The datapath thread 2507 also performs conflict management operations in case multiple xApps try to set the same parameters to the same E2 node at the same time. For instance, the conflict management operations ensure that two xApps do not try to change a cellular network setting (e.g., a direction of an antenna) differently within a short time period. In some embodiments, the datapath thread's conflict management employs different methodologies to address different types of conflicts, e.g., (1) for one set of requests, for a duration of time, it rejects a second request to modify a parameter after receiving a conflicting earlier first request, (2) for another set of requests, it rejects a request regarding a parameter from one xApp when another higher priority xApp makes a conflicting request for the same parameter, (3) for another set of requests regarding another set of parameters, it only accepts requests made by xApps that are allowed to make such requests during particular periods of time. The policies for handling these conflicts are provided by the SMO 2530 through the service Pod's agent 2524.

In FIG. 25, each xApp Pod 2520 can execute one or more xApps 2532, and interfaces with the datapath Pod 2505, the SDL Pod 2515 and the service Pod 2510 through the RIC SDK 2534 that executes on the xApp Pod. Each RIC SDK provides high-level interfaces for xApps to communicate with the RIC and the E2 nodes. This high level interface hides details of underlying implementation. The RIC SDK communicate with the RIC instances through fast data IO communication channels (such as shared memory or SCTP).

The RIC SDK also uses control communication channel with the service Pod 2510 and the control thread 2509 for xApp control operations such as xApp onboarding, registration, capabilities, subscription, FCAPS, etc. In some embodiments, the control channel communication between the SDK and the control thread 2509 is through shared memory when the xApp Pod (and its SDK) and the datapath Pod operate on the same host computer, and through SCTP when they operate on different computers. Also, in some embodiments, the control channel communication between the xApp Pod (and its SDK) and the service Pod is through shared memory when the SDK and the service Pod operate on the same host computer, and through gRPC when they operate on different computers. Other embodiments use SCTP for communications between the SDK and the service Pod when the xApp Pod (and its SDK) and the service Pod operate on different host computers.

Some of embodiments use proto bufs when the RIC SDK communicates with the service Pod through gRPC. Also, in some embodiments where the RIC SDK's communication with the datapath Pod is over shared memory, the shared memory communication uses proto bufs. The RIC SDK has APIs for data functions, e.g., E2 messages to and from E2 nodes. These APIs also include control function messaging, such as onboarding xApp (name, version, function), message subscription, keep alive messaging, and A1 and O1 interface communications with the SMO through the service Pod (e.g., communications to store stats, logs, and trace data in a time series database on the SMO or service Pod, such as Prometheus and ELK).

Some embodiments assign the datapath thread and control thread to one processor core, assign the SDL to another processor core (in order to isolate it from data and control threads), and assign the service Pod to yet another processor core. When one or more xApps execute on the same host computer as the RIC, the xApps are assigned to different cores than the RIC Pods, where multiple xApps can be assigned to the same core, or individual cores are assigned to individual xApps, as needed.

To improve the performance of the MC and the xApps further, other embodiments perform other hardware assignment optimizations, such as particular memory allocations (e.g., larger RAM allocations) and particular IO allocations. Examples of special IO allocations for some of the Pods include (1) SRIOV allocations for an xApp Pod on one host computer to communicate with a datapath Pod on another host computer, (2) SRIOV allocations for a datapath Pod to communicate with E2 nodes, (3) SRIOV allocations for an xApp Pod on one host computer to communicate with a service Pod on another host computer, and (4) gRPC or SCTP communication over the SRIOV allocations, with the gRPC communications having lower bandwidth allocations and being lower priority than the SCTP communications.

In some embodiments, one RIC and several xApps are bundled together to operate on different Pods that operate on one VM. Multiple instances of the RIC can also be deployed in some embodiments with different sets of xApps. Also, in some embodiments, xApps that need to talk to each other are bundled on the same VM.

As mentioned above, some embodiments implement the RIC datapath not as one datapath thread but as one data IO thread along with multiple datapath processing threads. In some embodiments, each datapath processing thread (DPT) is responsible for performing the datapath processing for a different set of E2 nodes, with each E2 node assigned to just one datapath processing thread. In some embodiments, the data IO thread identifies the DPT associated with an E2 message or an xApp message by hashing the E2 node identifier contained in the message and using the hashed value (obtained through the hashing) as an index into a lookup table that provides the DPT identifier of the DPT that needs to process the data message.

Figure 26:
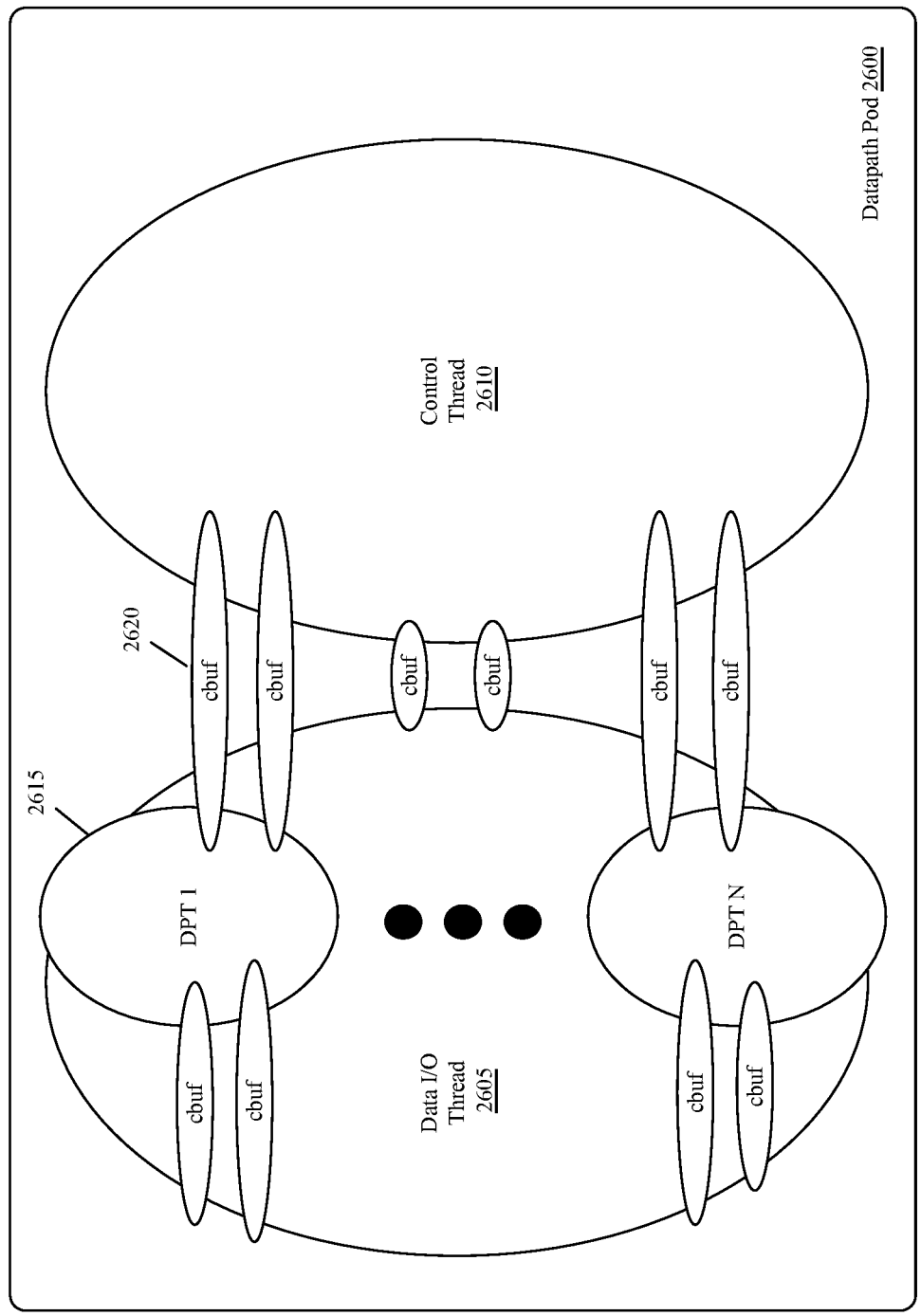
FIG. 26 illustrates an example of a RIC datapath Pod.

FIG. 26 illustrates an example of a RIC datapath Pod 2600 that has one data IO thread 2605, one control thread 2610, and multiple DPTs 2615. The DPTs share the datapath processing load of the datapath Pod 2600. As shown, there is a pair of cbuf rings 2620 between each DPT 2615 and the data IO thread 2605, each DPT 2615 and the control thread 2610, and the data IO thread 2605 and the control thread 2610. Each ring 2620 in a cbuf pair passes data messages in one direction from one of the two threads associated with the ring to the other thread, with one ring handling communication in one direction (e.g., from first thread to second thread) and the other ring handling communication in the other direction (e.g., from second thread to the first thread).

Separating the data IO thread 2605 from multiple DPTs 2615 optimizes the data IO of the datapath Pod 2600 by pushing the more computationally intensive operations into the DPTs, which then allows the less computationally intensive IO operations to run in the data IO thread 2605. This optimization ensures a fast datapath IO (one that does not experience unwanted latencies) so that the RIC can serve as a high speed interface between the E2 nodes and the xApps. Also, each E2 node is the responsibility of just one DPT thread 2615, which typically is responsible for several E2 nodes. Because each E2 node is handled by one particular DPT, no two DPTs will try to change one or more records associated with one E2 node. Hence, the datapath Pod 2600 does not need to lock any E2 node's records as there is clear demarcation of responsibilities vis-a-vis the communications with the E2 nodes.

The data IO thread 2605 performs the following operations (1) managing connections to the E2 nodes and the xApp Pods, (2) transmitting data messages through these connections to and from the E2 nodes and the xApp Pods, (3) performing security operations, (4) control ring communication with control thread 2610 and DPTs 2615, and (5) generating statistics, logs and trace data regarding messages that it processes.

Each DPT thread 2615 performs the following operations (1) message decode and encode operations (e.g., message encrypt and decrypt operations), (2) message validate operations, (3) sequence validate operations, (4) maintain state machine to keep track of state of the E2 node and the xApp requests and subscriptions, (5) perform conflict management, (6) control ring communication with control thread 2610 and DPTs 2615, and (7) generate statistics, logs and trace data regarding messages that it processes.

Figure 27:
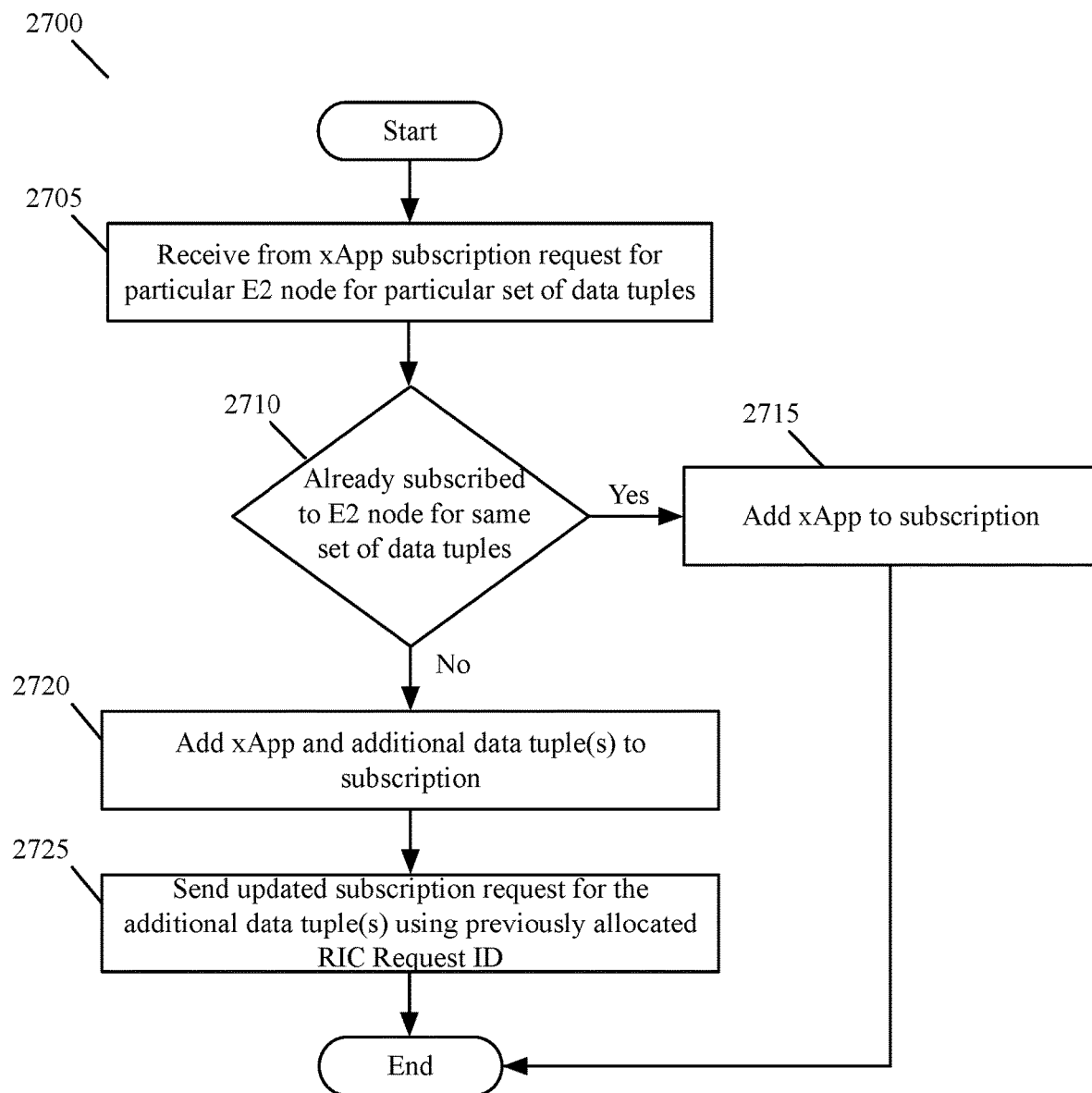
FIG. 27 illustrates a process that the datapath thread performs in some embodiments to process subscription requests from an xApp.

FIG. 27 illustrates a process 2700 that the datapath thread performs in some embodiments to process subscription requests from an xApp. As shown, the process starts when the DPT receives (at 2705) an xApp subscription request from the data IO thread. The subscription request is directed to a particular E2 node for a particular set of data tuples (e.g., a particular set of operational parameters or other parameters) that the particular E2 node maintains.

At 2710, the process 2700 determines whether it has already subscribed to the particular E2 node to receive the particular set of data tuples. This would be the case if the DPT previously sent the particular E2 node one or more subscription requests that individually or collectively requested the particular set of data tuples or a larger set of data tuples that includes the particular set of data tuples.

When the process 27100 determines (at 2710) that it has already subscribed to the particular E2 node to receive the particular set of data tuples, it (at 2715) adds a new record, or updates a record previously specified, for the xApp in this E2 node's subscription list and specifies in this record the particular set of data tuples that the xApp should receive. After 2715, the process ends.

On the other hand, when the process 27100 determines (at 2710) that it has not already subscribed to the particular E2 node to receive the particular set of data tuples, it has to either send a first subscription to the particular E2 node if it does not have an active subscription with this node, or has to send an updated subscription to the node if it has an active subscription but not one that includes all of the data tuples in the particular set of data tuples specified in the request received at 2705.

Hence, in such a case, the process 2700 (at 2720) adds a new record, or updates a record previously specified, for the xApp in this E2 node's subscription list and specifies in this record the particular set of data tuples that the xApp should receive. Next, it sends an updated subscription request to the particular E2 node using a previously allocated RIC Request ID. This updated subscription specifies all of the data tuples in the requested particular set of data tuples when none of these tuples were previously requested by an earlier subscription to the particular E2 node, or specifies some of these data tuples when other data tuples in the particular set were previously requested by one or more earlier subscriptions to the particular E2 node. After 2725, the process 2700 ends.

Figure 28:
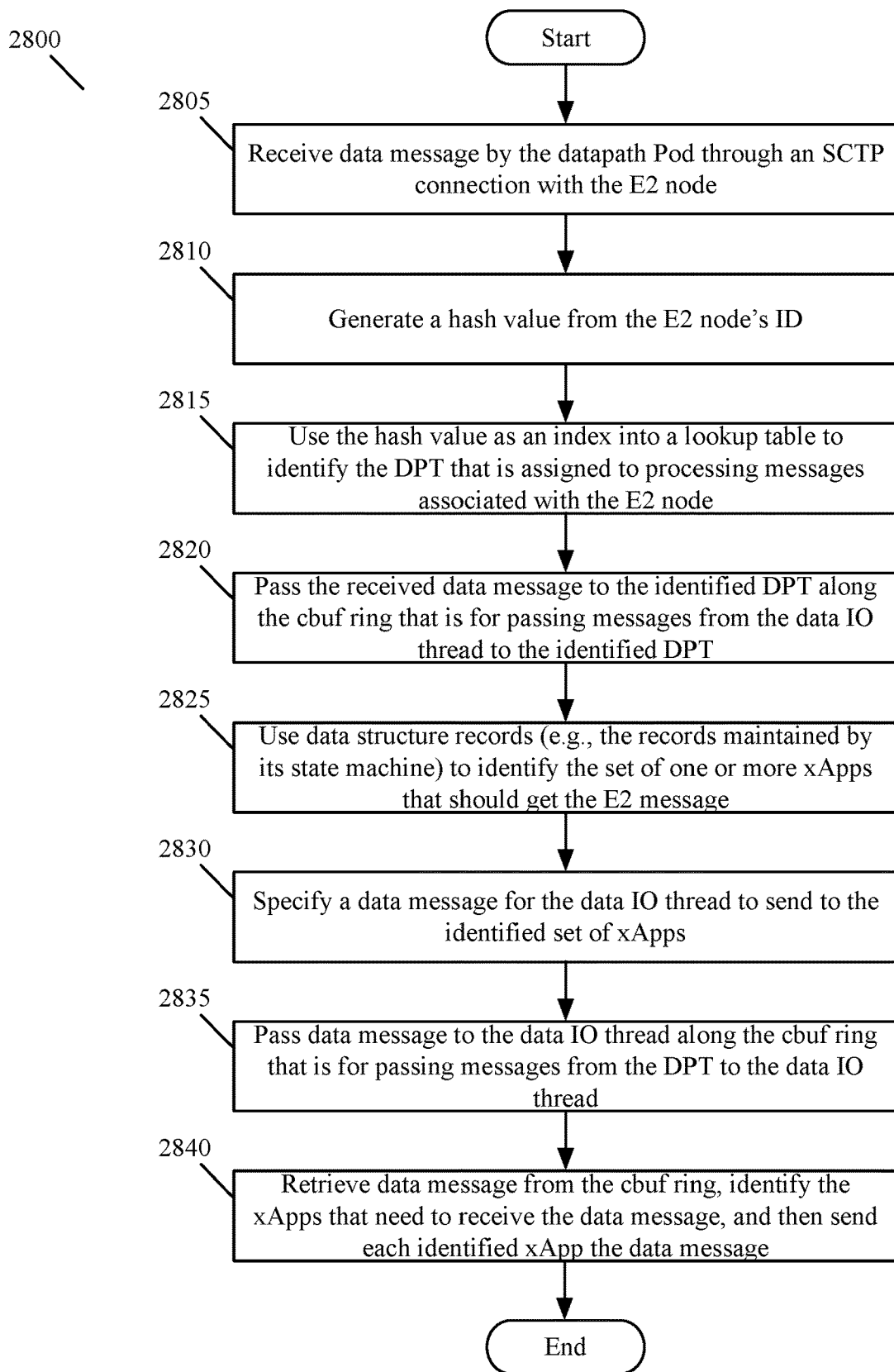
FIG. 28 illustrates a process that the data IO thread and a DPT perform in some embodiments to process a data message from the E2 node that one or more xApps should receive.

FIG. 28 illustrates a process 2800 that the data IO thread 2605 and a DPT 2615 perform in some embodiments to process a data message from the E2 node that one or more xApps should receive. As shown, the process 2800 starts when the data message is received (at 2805) by the datapath Pod through an SCTP connection with the E2 node. At 2810, the data IO thread 2605 generates a hash value from the E2 node's ID. It then uses (at 2815) the hash value as an index into a lookup table to identify the DPT that is assigned to processing messages associated with the E2 node.

At 2820, the data IO thread passes the received data message to the identified DPT (i.e., the DPT identified at 2815) along the cbuf ring 2620 that is for passing messages from the data IO thread to the identified DPT. Next, at 2825, the DPT uses its data structure records (e.g., the records maintained by its state machine) to identify the set of one or more xApps that should get the E2 message. In some embodiments, the identified set of xApps are the xApps that have subscribed to receive data (e.g., all the data or a subset of the data) from the E2 node.

At 2830, the DPT specifies a data message for the data IO thread 2605 to send to the identified set of xApps. This data message is in the encapsulated format described below by reference to Table 1. The DPT then passes (at 2835) the data message to the data IO thread 2605 along the cbuf ring 2620 that is for passing messages from the DPT 2615 to the data IO thread 2605. Next, at 2840, the data IO thread 2605 retrieves the data message from the cbuf ring 2620, identifies the xApps that need to receive the data message, and then sends each identified xApp the data message. After 2840, the process ends.

Figure 29:
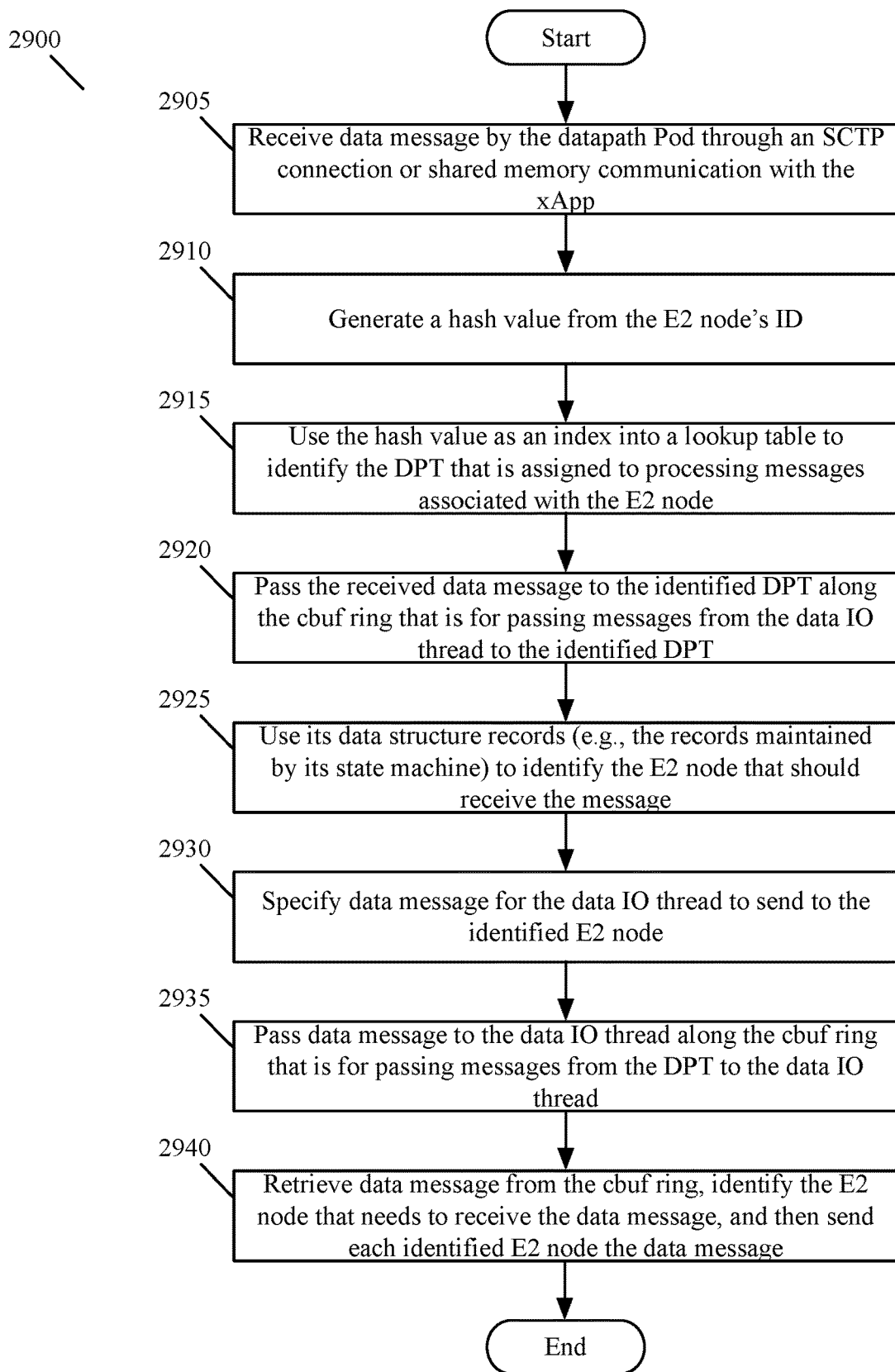
FIG. 29 illustrates a process that the data IO thread and a DPT perform in some embodiments to process a data message from an xApp that should be sent to an E2 node.

FIG. 29 illustrates a process 2900 that the data IO thread 2605 and a DPT 2615 perform in some embodiments to process a data message from an xApp that should be sent to an E2 node. As shown, the process 2900 starts when the data message is received (at 2905) by the datapath Pod through an SCTP connection or shared memory communication with the xApp RIC SDK. This message is in the encapsulated format that is described below by reference to Table 1. This message includes an E2 node identifier that identifies the E2 node that should receive this message.

At 2910, the data IO thread 2605 generates a hash value from the E2 node's ID. It then uses (at 2915) the hash value as an index into a lookup table to identify the DPT that is assigned to processing messages associated with the E2 node. At 2920, the data IO thread passes the received data message to the identified DPT (i.e., the DPT identified at 2915) along the cbuf ring 2620 that is for passing messages from the data IO thread to the identified DPT.

Next, at 2925, the DPT uses its data structure records (e.g., the records maintained by its state machine) to identify the E2 node that should receive the message. In some embodiments, the data message is a subscription request and the identified E2 node is an E2 node to which an xApp wants to subscribe. At 2930, the DPT specifies a data message for the data IO thread 2605 to send to the identified E2 node. This data message is in the E2AP message format required by a standard. The DPT then passes (at 2935) the data message to the data IO thread 2605 along the cbuf ring 2620 that is for passing messages from the DPT 2615 to the data IO thread 2605. Next, at 2940, the data IO thread 2605 retrieves the data message from the cbuf ring 2620, identifies the E2 node that needs to receive the data message, and then sends each identified E2 node the data message. After 2940, the process ends.

In some embodiments, the DPT 2615 might determine that no new subscription message needs to be sent to the E2 node that it identifies at 2925. For instance, before receiving (at 2905) from a first xApp the subscription request for a set of data tuples from an E2 node, the datapath Pod previously sent for a second xApp a subscription request to the same E2 node for the same set of data tuples or for a larger set of data tuples that includes the data tuples requested by the first xApp. In such a case, the DPT 2615 simply adds the first xApp to the subscription list of the E2 node, so that it can provide subsequently received values from the E2 node to the first xApp. In some embodiments, the DPT 2615 also supplies previously received values from the E2 node that are stored in the SDL to the first xApp or directs the xApp to obtain these values from the SDL.

In some cases, the first xApp asks for additional data tuples from the E2 node that the second xApps did not request previously. In such cases, the DPT 2615 would prepare an updated subscription message for the data IO thread to send to the E2 node to request the data tuples that are newly requested by the first xApp. The DPT would also prepare such a message when the second xApp requested additional data tuples from the E2 node after its initial subscription.

In some embodiments, a service Pod 2510 configures the datapath Pod 2600 to instantiate N DPTs when it starts up with N being an integer greater than one. For the datapath Pod 2600 of a near RT RIC, the number N is computed in some embodiments based on the expected number of E2 nodes and xApps that communicate with the E2 nodes through a near RT RIC. The data IO thread 2605 of the datapath Pod 2600 in some embodiments then assigns the E2 nodes to the DPTs based on the order of subscription requests that it receives and the load on the DPTs at the time of these requests.

Figure 30:
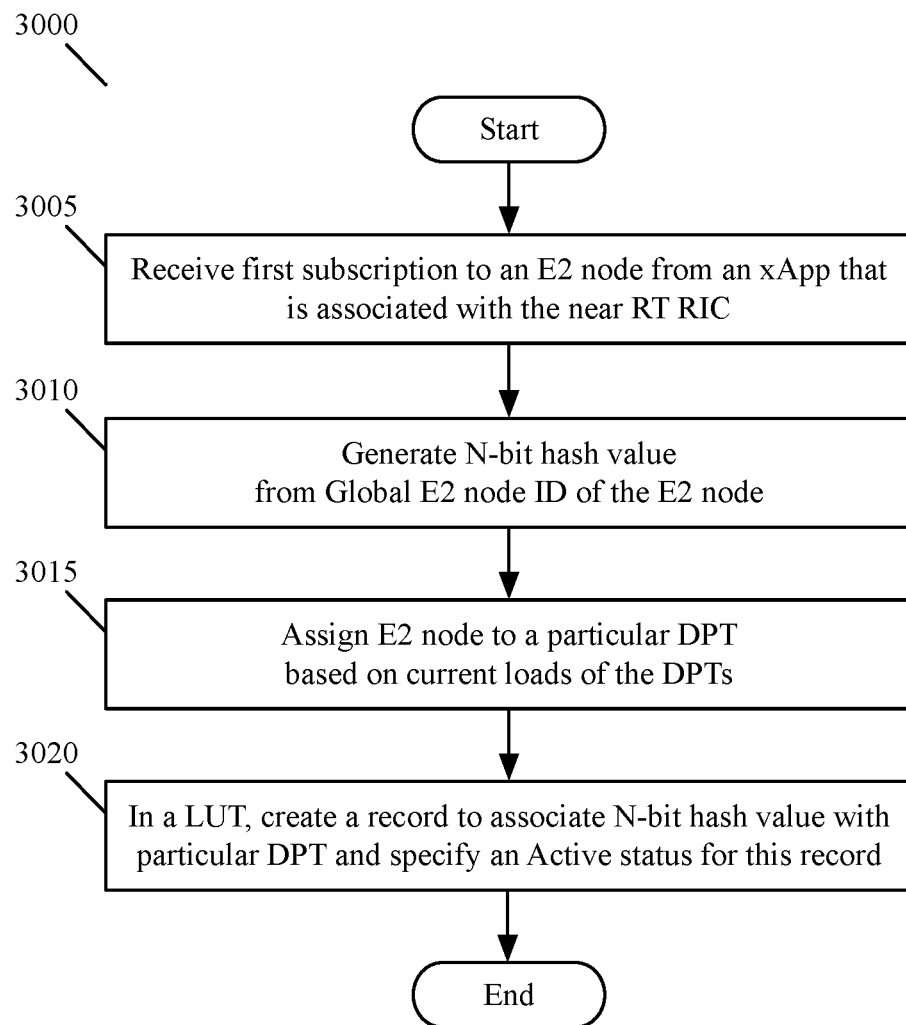
FIG. 30 illustrates an example of a process that the data IO thread uses in some embodiments to assign E2 nodes to DPTs.

FIG. 30 illustrates an example of a process 3000 that the data 10 thread 2605 uses in some embodiments to assign E2 nodes to DPTs. As shown, the process 3000 starts when the data IO thread 2605 receives (3005) a first subscription request for a particular E2 node from an xApp that is associated with the near RT RIC of the data IO thread. A first subscription request for a particular E2 node means that no other subscription requests were previously received for this particular E2 node by the data IO thread.

Next, at 3010, the data IO thread 2605 generates an N-bit hash value from the Global E2 node ID of the particular E2 node, where N is an integer (e.g., is 6 or 8). This N-bit value is used to identify the particular E2 node in a hash LUT (lookup table) as further described below. At 3015, the process 3000 selects a particular DPT for the particular E2 node based on the current load on each of the DPTs of the datapath Pod 2600 (e.g., by selecting the DPT with the least amount of load). In some embodiments, the current load is just based on the number of E2 nodes assigned to each DPT, while in other embodiments the current load is based on the number of E2 nodes and the number of xApp subscriptions to these nodes. In still other embodiments, the current load is computed in other ways.

At 3020, the process 3000 then creates a record in a LUT and in this record associates the N-bit hash value with the identifier of the particular DPT selected at 3015 for the particular E2 node. In some embodiments, the N-bit hash value is an index into the LUT that identifies the record that specifies the particular E2 node's ID. At 3020, the process 3000 also specifies the state of this record as Active.

At a subsequent time, if the data IO thread encounters a situation where all xApps have canceled their subscriptions to the particular E2 node, the process 3000 maintains the LUT record created at 3020 but changes the status of this record to Inactive. The data IO thread maintains this Inactive status until the next time that an xApp submits a subscription request for the particular E2 node, at which time the status of this record is changed to Active again. This status value is used as a mechanism to ensure that the data IO thread does not have to continuously revisit the E2 node assignments to the DPTs.

Figure 31:
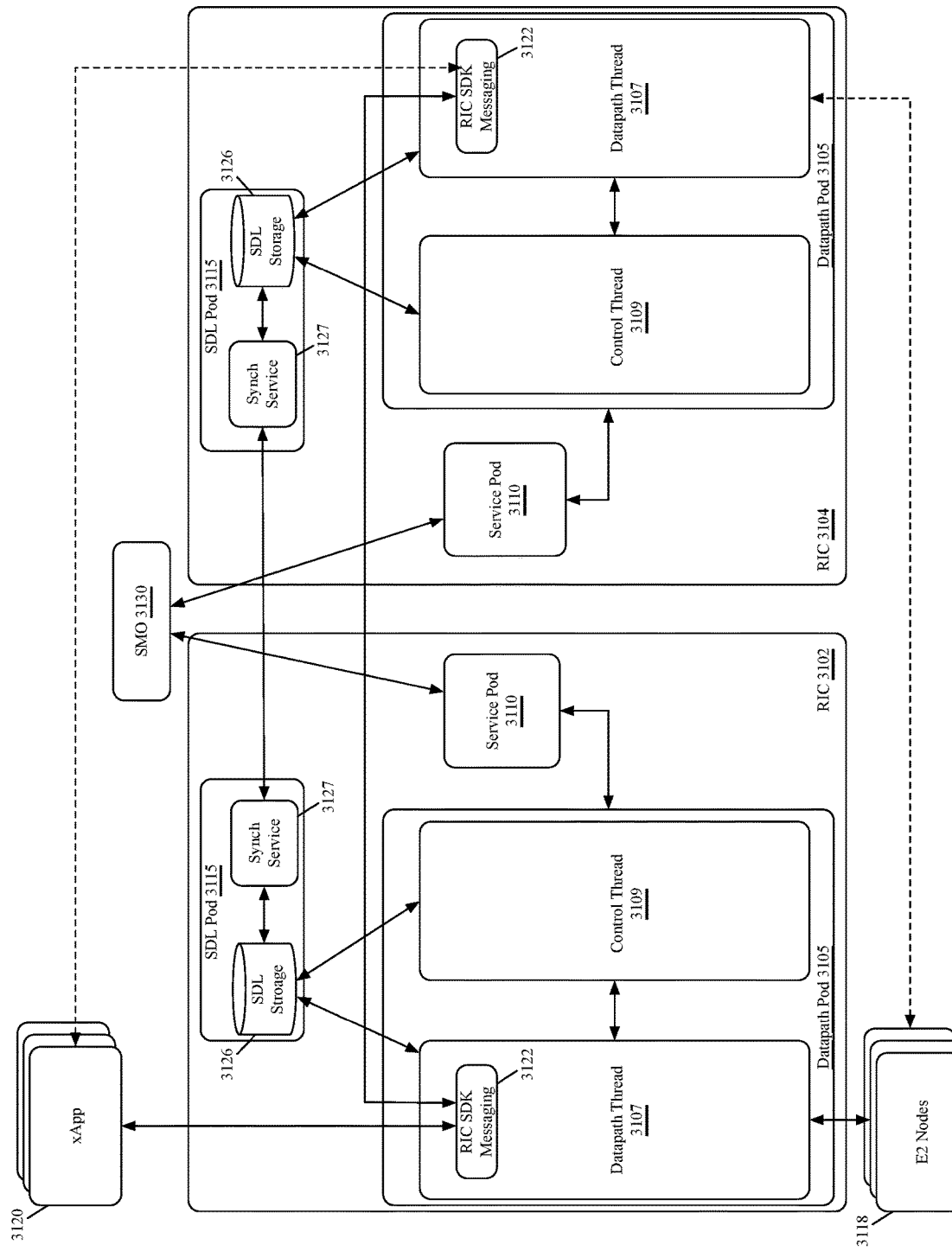
FIG. 31 illustrates a distributed near RT RIC that is implemented by an active RIC and a standby RIC.

FIG. 31 illustrates a distributed near RT RIC that is implemented by an active RIC 3102 and a standby MC 3104. As shown, the E2 nodes 3118 and xApp Pods 3120 communicate with the active MC 3102, until one or more components of this MC fail. When the active MC fails, the standby MC 3104 becomes the active MC, and the E2 nodes and xApp Pods continue their communications through the MC 3104, which is now the active RIC.

Both of these RICs have the same components, which are a datapath Pod 3105, a service Pod 3110, and an SDL Pod 3115. The datapath Pod is shown to include a control thread 3109 and a datapath thread 3107. Instead of one datapath thread 3107, some embodiments employ one data IO thread and multiple DPTs as mentioned above. In some embodiments, the active MC 3102 is implemented by a first set of one or more computers, while the standby MC 3104 is implemented by a different second set of one or more computers.

As shown, each E2 node 3118 has a dual-homed SCTP connection with the datapath threads 3107 of the active and standby RICs 3102 and 3104. Similarly, each xApp Pod 3120 has a dual-homed SCTP connection with the datapath threads 3107 of the active and standby RICs 3102 and 3104. Dual-homing connections is a feature provided by SCTP. When a first component connects to an active/standby pair of components through a dual-home connection, the first component can automatically switch to using the standby component when the active component fails. Thus, using the dual-homed SCTP connections, each E2 node or xApp Pod can switch to the datapath thread 3107 of the standby RIC 3104 when the active RIC 3102 or its datapath Pod fails.

As shown, the RIC SDK interface 3122 of the datapath thread 3107 of the active RIC 3102 forwards messages that it receives from the xApp RIC SDKs, and messages that it sends to the xApp RIC SDKs, to the RIC SDK interface 3122 of the datapath 3107 of the standby RIC 3104. This is done in some embodiments so that the standby RIC's datapath thread 3107 can update its state machine to match the state of the active RIC's datapath thread 3107. Also, as shown, synchronizing agents 3127 of the active and standby RICs 3102 and 3104 synchronize the SDL storage 3126 of the standby RIC 3104 with the SDL storage 3126 of the active RIC 3102. All components of the active and standby RICs 3102 and 3104 are consistently managed by the SMO 3130.

Figure 32:
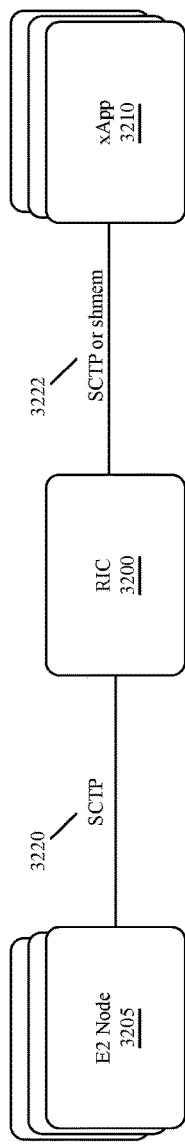
FIG. 32 illustrates the interfaces between a near RT RIC and E2 nodes, and between the near RT RIC and xApp Pods in some embodiments.

FIG. 32 illustrates the interfaces between a near RT RIC 3200 and E2 nodes 3205, and between the near RT RIC 3200 and xApp Pods 3210 in some embodiments. In some embodiments, the near RT RIC is one of the above-described near RT RICs. As mentioned above, and as shown in FIG. 32, the near RT RIC in some embodiments employs SCTP interface 3220 and 3222 with both the E2 nodes 3205 and the xApp Pods 3210. When the xApp Pod and the near RT RIC execute on the same host computer, some embodiments use a shared memory as the interface between the near RT RIC and the xApp Pod, as shown. These interfaces keep the message exchange fast, and minimize encoding and decoding overhead across all paths to minimize latency (e.g., perform one ASN decode and one ASN encode). In some embodiments, the interface 3220 between an E2 node and near RT RIC will follow the E2AP specifications, and all message exchange will conform to E2AP specifications.

Also, in some embodiments, the interface 3222 between the near RT RIC and an xApp Pod uses a novel encapsulating header that will be described below by reference to Table 1. The interface 3222 handles a mix of different types of messages. Examples of such messages in some embodiments include (1) the entire E2AP messages (e.g., E2 Setup Request) from an E2 node, (2) some fields of the E2AP header along with the entire E2SM content (i.e., the entire E2AP message payload), (3) internal messages between the near RT RIC and xApp Pod (e.g., a message from the near RT RIC that an earlier message of an xApp caused an error), and (4) messages from xApp to near RT RIC or E2 Node. In some embodiments, the E2 content might not be ASN1 encoded (e.g., portion of a subscription request might not be encoded).

In some embodiments, the near RT RIC 3200 can be configured on a case by case basis to decode just the E2AP messages before it sends the message to an xApp, or to decode the entire E2AP header along with its E2SM payload. In some cases, the near RT RIC sends the entire E2AP header while in other cases it only sends a part of this header. In the RIC E2AP message handling of some embodiments, all fields are in network byte order, and the near RT RIC 3200 will work with that order as much as possible. For displaying fields, some embodiments can convert the data to host order. In some embodiments, the near RT RIC 3200 will not look into E2SM payload, while in other embodiments it will (e.g., in order to avoid duplicate subscription errors).

In some embodiments, the RAN function ID is E2 node specific. The xApps will not subscribe to RAN functions across E2 nodes, as every subscription will be to an individual E2 node. Also, in some embodiments, the RIC Request ID space is local to an E2 node. In some embodiments, the RIC Request ID number space is ephemeral component as well as a persistent component. For example, the RIC request IDs used for indication reports will persist while RIC request IDs used from subscription may be reused.

Table 1 below displays an exemplary message format used in some embodiments for the communication between the RIC and RIC SDK. This is the format of an encapsulating header that is used to encapsulate all messages from and to the RIC to and from the RIC SDK. In some embodiments, the encapsulating header stores data needed by the RIC SDK and the RIC for efficient processing of the data message. In the example illustrated in Table 1, the first sixteen bytes associated with the msg_type, msg_serial_num, msg_len, msg_flags, and ctrl_len are part of the encapsulating header along with the ctrl_info field. The payload of the encapsulated packet can include any data. In the example shown in Table 1, the payload includes the original E2AP packet along with its E2SM payload.

All messages between MC and MC SDK are encapsulated with the header shown in Table 1. Control information and payload are optional. Some messages may have control information but no payload field, others might have payload without control information and some may have both control and payload fields. In some embodiments, the MC SDK can be configured to trap these messages and reformat them for presentation to xApps. The format of the message is a raw byte stream. In some embodiments, a message CRC field is not used, while it is used in other embodiments.

TABLE 1

| Type | Length (bytes) | Description |
| --- | --- | --- |
| msg_type | 4 | Message type identifying what type of message is being sent |
| msg_serial_num | 4 | Running serial number identifying a particular message |
| msg_len | 4 | Total message length: includes header, control and payload. Msg Len = 16 (header len) + control len + payload len |
| msg_flags | 2 | Message flags |
| ctrl_len | 2 | Control Info Len |
| ctrl_info | variable len | Control Info-Contents depend on message type |
| payload | variable len | Could include any portion of original data message—any portion of E2AP header or E2SM payload-ASN1 encoded or decoded |

The near RT RIC 3200 handles E2 node and xApp connect, disconnect, reset, and crashes as follows. For E2 nodes, the RIC in some embodiments handles a connect, disconnect, and crash similarly. Specifically, when the connection to the E2 node drops and comes back for any of these reasons, the E2 node will send a connection setup all over again as though it started for the first time, and the near RT RIC will clean all its state related to the E2 node and start over. In some embodiments, the near RT RIC informs all xApps when an E2 node connection drops and comes back up whether they had previously subscribed to the particular E2 node or not, as the E2 node might advertise new functionality in which a previously unsubscribed xApp may be interested. When an xApp connects, disconnects, or crashes, the near RT RIC again performs the same operations, in that it resets all the state of the xApp in the near RT RIC and deletes its subscriptions from all E2 nodes.

Figure 33:
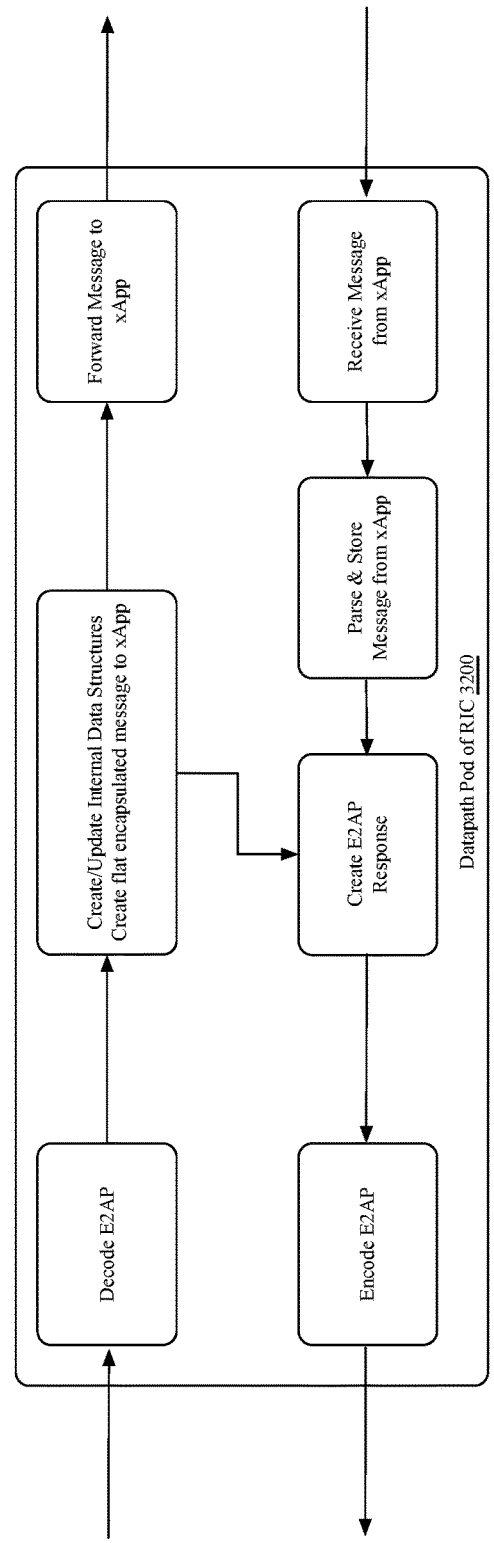
FIG. 33 illustrates the E2AP message handling of the datapath Pod of the near RT RIC.

FIG. 33 illustrates the E2AP message handling of the datapath Pod of the near RT MC 3200. In the discussion below regarding the E2AP message handling and other message handling, this datapath Pod is simply referred to as the near RT MC 3200 or the MC 3200 for purposes of brevity. As shown, the near RT MC 3200 initially decodes an E2AP message received from an E2 node. In some embodiments, this decoding involves the decoding of only the E2AP header, while in other embodiments, this decoding involves the decoding of the E2AP header and the E2SM payload. For some or all of this decoding (e.g., E2SM), the near RT RIC in some embodiments uses a hardware accelerator (e.g., a GPU accelerator) that it accesses through a bypass path, which is described above.

After decoding the E2AP message, the near RT RIC creates or updates its internal data structures to account for the received data message, and then creates a flat encapsulated message to the xApp in the format described above by reference to Table 1. As the near RT RIC and RIC SDK operate on different containers and reside on different Pods in some embodiments, they do not pass arbitrary data structures to each other but format their data exchange into an encapsulated message with a specific sequence of bytes in some embodiments. After encapsulating the data message, the near RT RIC forwards the data message to the xApp Pod for the RIC SDK on this Pod to forward to the appropriate xApp.

The internal data structure that the near RT RIC creates or updates while processing the E2AP message is used for processing of responsive messages from the xApp to the E2AP message and for processing of subsequent E2AP messages. Examples of data stored in the near RT RIC's internal data structure in some embodiments include (1) a subscription list of xApps that are interested in data from a particular E2 node, (2) particular data tuples that each xApp is interested from each E2 node, (3) records identifying network addresses and other location data relating to E2 nodes and xApps, (4) identifiers that are allocated and assigned (e.g., RIC Request IDs).

When the xApp sends a message, its RIC SDK processes the message and forwards it to the RIC along a shared memory or SCTP interface as described above. The near RT RIC then parses the message and stores the parsed components. Based on these components, and on one or more data tuples that it stored in its internal data structure for the associated E2 node message(s), the RIC creates an E2AP response, and then encodes and forwards this response to the E2 node to which it is directed.

For instance, after a first xApp sends a subscription request to receive M data tuples from an E2 node, the near RT RIC's datapath Pod creates a state to record the first xApp's desired subscription, requests a subscription with the E2 node for the M data tuples, and forwards these M data tuples to the xApp when it initially receives them and each subsequent time that it receives them. In some embodiments, the near RT RIC's datapath Pod can be configured to forward the M data tuples to its associated SDL each time that it receives them from the E2 node.

After the first xApp subscribes to receive the M data tuples from the E2 node, a second xApp can subscribe to receive N different data tuples from the E2 node, where N is larger than M. The near RT RIC then sends an updated subscription request to the E2 node. This update now requests the N data tuples. Each time that the near RT RIC receives the N data tuples, it sends M data tuples to the first xApp and all N data tuples to the second xApp.

Another example involves the near RT RIC removing and caching an RIC request ID from an E2AP message from an E2 node in response to a subscription request. After this ID is removed, the RIC provides a portion of the E2AP message and its E2SM payload (if applicable) to the xApp. Subsequently, when the xApp wants to delete the subscription, the RIC retrieves RIC request ID from its state, and inserts it into its E2AP message to the E2 node to request the deletion of the subscription.

In some embodiments, the near RT RIC's E2 Setup, Response Message, and Failure Message handling is as follows. The near RT RIC initially receives the setup request message from the E2 node. In response, the near RT RIC will decode the message and build internal data structures. The RIC will also cache the raw ASN1 payload. In some embodiments, the near RT RIC accepts all added RAN function identifiers. In some embodiments, the near RT RIC sends the setup message to xApps after decoding the E2AP header but nothing else (i.e., as a message with an ASN1 encoded E2SM payload). In some embodiments, a setup message that the near RT RIC sends to an xApp has a control length (ctrl_len) of 0 with its ASN1 encoded payload.

When an xApp connects later, the near RT RIC will send all setup requests from E2 nodes to the xApp so it has an inventory of connected E2 nodes. In some embodiments, the near RT RIC sends these messages one at a time. Also, as mentioned above, the near RT RIC in some embodiments constructs E2Setup response and send it to the E2 node. In some embodiments, the near RT RIC sends a failure message when a setup request is malformed (e.g., it is a duplicate of the RAN function list, or removes a record not added to a list).

After receiving a reset from E2 node, the near RT MC performs the following actions after decoding the message. It sends a message regarding this reset to all xApps that have a subscription to this E2 node. In some embodiments, this is an internal message without any ASN1 content. The near RT MC ends subscription deletion messages to the E2 node for all previous subscriptions that it sent to it. It also sends control, insert and policy deletions to this E2 node. It cleans up any outstanding requests, and sends reset response to the E2 node.

The near RT RIC also employs a Service Update, Acknowledge, and Failure message in some embodiments. This message updates the supported RAN function list, with additions, modifications and deletions. The near RT RIC inform all xApps about the new service configuration of an E2 node. In some embodiments, the near RT RIC sends the message to xApps after application of the configuration so it will reflect the final state of the configuration. In other embodiments, the near RT RIC sends the message as is for xApps to compute the delta between the previous and new state of supported RAN functions. In this latter approach, the near RT RIC does not need to ASN1 encode the resulting delta.

The handling of the E2AP subscription is as follows in some embodiments. An xApp formats the E2SM portion of the subscription and ASN1 encode it. Table 2 below details the control portion of the subscription message (i.e., the portion that is stored in the control field of a message from the xApp to the near RT RIC). The payload will be the ASN1 encoded E2SM content. Multiple subscription message types are defined in some embodiments to disambiguate optional information. Also, in some embodiments, message flags are used to specify the exact format. In some embodiments, each subscription message specifies one E2 node Global ID and one RAN Function ID.

In some embodiments, the E2 node sends an identifier that is 113 bytes and the RIC compresses that to a 40 byte ID. When sending the subscription message to the E2 node, the RIC converts the 40 byte to 113 byte ID. The subscription message control fields will be of fixed formats as far as possible. In some embodiments, the RIC caches all subscription requests and compares requests from multiple xApps in order to avoid sending out duplicate subscription messages. However, when a second subsequent xApp requests additional information from the same E2 node after a first initial xApp requests some information from the E2 node, the MC resends the subscription (with the same MC Request ID in some embodiments) but this time asks for the additional information. When sending out the subscription request to the E2 node, the MC sends out as the E2AP message payload the entire payload received from xApp in some embodiments.

TABLE 2

| Field Name | Field Len |
| --- | --- |
| E2 Node Global Id | 40 bytes |
| RAN Function Id | 2 bytes |
| RIC Event Trigger Len | 2 bytes |
| RIC Action Admit Cnt | 2 bytes |
| RIC Action Not Admit Cnt | 2 bytes |
| RIC Subsequent Action Cnt | 2 bytes |
| RIC Action Type | 16 bytes-Only RIC Action Cnt Fields are valid |
| RIC Action Definition Length | 32 bytes-2 bytes per-Only RIC Action Cnt Fields are valid |
| RIC Subsequent Action Type | 16 bytes-Only RIC Subsequent Action Cnt Fields are valid |
| RIC Subsequent Action Time to Wait | 16 bytes-Only RIC Subsequent Action Cnt Fields are valid |
| RIC Action Definition | x bytes each * Action Cnt |
| RIC Event Trigger Definition | x bytes |

The near RT RIC handles an E2AP RIC subscription response by storing the E2 node Global ID and RIC Request ID (generated by RIC) as control information and sending the exact ASN1 encoded message from E2 node back to xApps.

The E2AP RIC subscription delete request, response or failure message are sent from an xApp to the near RT RIC with message fields sent as control information (i.e., as part of the ctrl_info). The near RT RIC creates the encoded ASN1 message and sends it to the E2 node. The deletion request does not specify the E2 Node Global ID. Hence, this information is provided by the RIC for the xApp. The response message is sent as packed bytes (not ASN1 encoded) from near RT RIC to xApp in some embodiments.

An E2 node's E2AP indication report is handled as follows. The message is decoded by near RT RIC to determine the RIC Request ID field. This helps determine which xApp(s) subscribed to the indication. The near RT MC in some embodiments sends the message as an ASN1 encoded to xApp(s). In some embodiments, the near RT MC also sends the reduced E2 Global ID as control information along with the message.

The near RT MC's processing of the E2AP control request is as follows in some embodiments. The xApp sends this request as packed byte information. The near RT MC does not specify the E2 Global ID in the message, as this information is specified by the xApp. The near RT RIC's formatting of this message is illustrated in Table 3.

TABLE 3

| Field Name | Field Len |
| --- | --- |
| E2 Node Global Id | 40 bytes-fixed |
| RAN Function Id | 2 bytes-fixed |
| RIC Call Process Id len | 2 bytes |
| RIC Control Header len | 2 bytes |
| RIC Control Message len | 2 bytes |
| RIC Control Ack Request | 1 byte |
| RIC Call Process | byte string |
| RIC Header len | byte string |
| RIC Control Message | byte string |

The near RT RIC handles E2AP control response or failure message is as follows. The near RT RIC decodes the message to obtain the RIC Request ID. It then sends the ASN1 encoded message to xApp prepended with the Global E2 Node ID as control information In some embodiments, the SDL data store is an in memory database that runs in its own set of one or more Pods. It has its own compute and memory resources assigned. As mentioned above, multiple near RT RIC instances define a distributed near RT RIC. In some embodiments, each near RT RIC instance has its own instance of an SDL, which stores system wide information for the RIC instance. Examples of such information include a list of connected E2 nodes (i.e., base station nodes), xApps, subscriptions from each xApp and critical cell data returned by E2 nodes. Further, each SDL instance in some embodiments provides services to preprocess incoming data by running custom algorithms internally as the data arrives and by interfacing to hardware accelerators (e.g., GPUs), or post-process data retrieved from its storage.

The data IO Pod and xApp Pods of the MC instance are connected to the SDL Pod of the MC instance. In some embodiments, each SDL instance just operates with the data IO Pod and service Pod of its own MC instance. Also, in some embodiments, the SDL Pod is managed by the SMO and configured via the service Pod. The dataflows to and from the SDL include (1) data IO to SDL data store, (2) xApps from SDL data store, (3) xApps to SDL data store, (4) data IO from SDL data access (e.g., retrieval of E2 node info, subscription info, etc.), and (5) service Pod to and from SDL communication to provide and retrieve configuration information.

Figure 34:
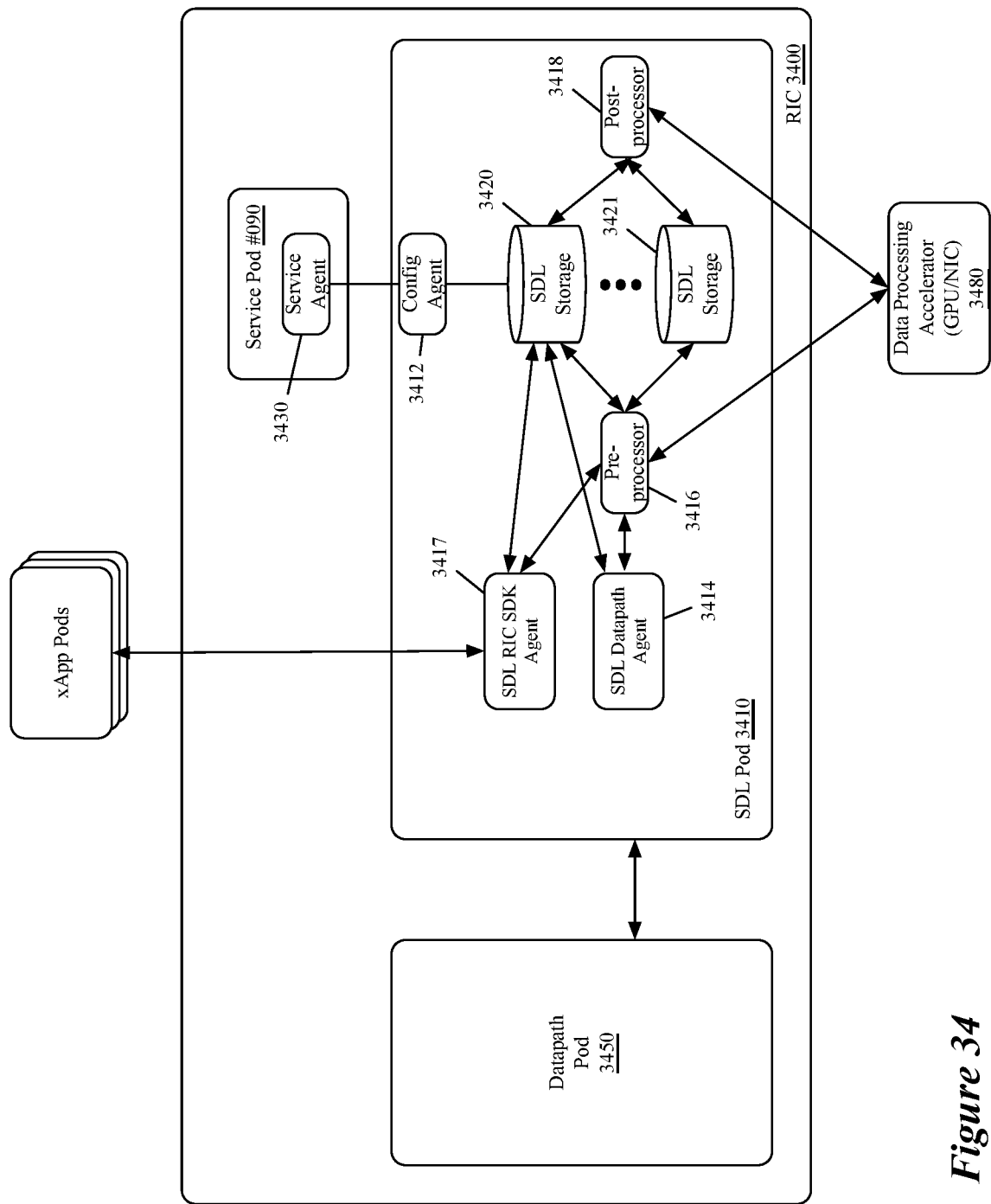
FIG. 34 illustrates the RIC instance of some embodiments with an SDL Pod.

FIG. 34 illustrates the RIC instance 3400 of some embodiments with an SDL Pod 3410. As shown, the SDL 3410 includes a configuration agent 3412, an SDL datapath agent 3414, an RIC SDK agent 3417, SDL pre and post processors 3416 and 3418 and one or more SDL data stores 3420. The SDL configuration agent 3412 interfaces with the service Pod agent 3430. This agent 3412 configures and manages other components of the SDL Pod. The SDL Pod is managed by the SMO and configured via the service agent 3430 of the service Pod #090.

The SDL datapath agent 3414 is the datapath interface that the SDL Pod exposes to the control thread and datapath thread of the datapath Pod 3450. The SDL datapath agent 3414 handles communication from these entities for the SDL, and performs reads and writes to the SDL data store 3420 for these datapath entities. In some embodiments, the SDL datapath agent can be configured to use either SCTP or shared memory libraries to communicate with the datapath Pod 3450.

In some embodiments, the RIC SDK agent 3417 is the agent that the SDL Pod exposes to the RIC SDK of the xApp Pods. The RIC SDK agent 3417 handles communication from the RIC SDKs to the SDL, and performs reads and writes to the SDL data store 3420 for the RIC SDKs. In some embodiments, the RIC SDK agent 3417 can be configured to use either SCTP or shared memory libraries to communicate with the RIC SDKs. This agent 3417 also performs the cache synchronization operation to synchronize the SDL cache of the RIC SDKs with the SDL data store(s) 3420. Also, in cases where it will need to scale to tens of connections from xApps, the connection manager in some embodiments leverages epoll connection handling of the RIC instance (e.g., the epoll connection handling used by the data IO Pod in some embodiments).

The SDL agents 3414 and 3417 handle event subscription and notifications from the MC SDKs and the datapath Pod. This is separate from E2AP subscription management, but conceptually it is similar. For instance, through this subscription service of the SDL, an xApp specifies its interest in some data via a key and/or frequency of reports. The MC SDK agent 3417 then provides periodic updates to this xApp based on its subscription. It also provides security services in some embodiments by encrypting and decrypting data.

The data preprocessor and post processors 3416 and 3418 are part of the SDL 3410 in some embodiments in order to flexibly run certain value added algorithms on data. In some embodiments, both of these processors 3416 and 3418 operate in one container, while in other embodiments each of them operates on a separate container in the SDL Pod 3410. Each of these processors also interfaces with external accelerators (e.g., GPUs 3480) to perform their operations in some embodiments. The data preprocessor 3416 runs inline as data is stored in SDL data store 3420.

In some embodiments, the data post processor 3418 runs inline as data is read from the SDL data store 3420. Alternatively, or conjunctively, the post processor 3418 in some embodiments can be configured to run in the background on data stored in the SDL data store 3420 (e.g., to retrieve data from this data store, perform some operations on this data, and store back the results in the data store). The data processors in some embodiments encodes and/or decodes the E2SM payloads of the E2AP messages. This is advantageous as it allows datapath Pod to pass the ASN1 string to SDL to decode and store. As mentioned above, the RIC SDK in some embodiments can also be configured to provide the E2SM encode/decode services.

Another example of a post processor operation that the data processor 3418 performs in some embodiments is a machine trained operation. In some embodiments, the post processor 3418 collects various data tuples stored by various xApps and/or various Pods (e.g., datapath Pod), and passes these data tuples through a machine-trained network (e.g., a neural network trained through machine learning). In some embodiments, to execute its machine-trained network, the post processor 3418 uses one or more hardware accelerators (e.g., one or more GPUs) of the SDL's host computer to perform its operations. The post processor 3418 access a hardware accelerator through the bypass approach described above by reference to FIGS. 14-20.

The post processor 3418 passes the results of its operations to one or more xApps, or it can store the results in the SDL data store 3420 for one or more xApps to retrieve. An example of a result obtained by post-processing SDL data with machine-trained networks includes anomaly detection (e.g., identifying E2 nodes that are behaving anomalously, e.g., cell sites that receive too many connections suddenly).

It is advantageous to use a machine-trained network in the SDL Pod 3410 to process different xApp outputs that are stored in the SDL data store 3420 because this data store 3420 stores the outputs of several xApps as well as numerous data tuples that the E2 nodes provide based on the xApp subscriptions. Often, individual xApps have insight only to the data tuples to which they subscribe and to the results of their own computations and the outputs of a few other xApps. The SDL Pod 3410, on the other hand, has access to a much larger set of E2 node input data and xApp output data. Instead of using machine-trained networks to perform such post-processing, the post processor 3418 uses algorithms (e.g., constrained optimization solvers) to post-process the data stored in the SDL data stores 3420. In other words, the post processor 3418 in some embodiments does not use machine-trained networks but still uses its host computer's hardware accelerator(s) (e.g., through a bypass path) to perform its operations.

Some embodiments also use post processor 3418 to provide the current state of an E2 node when a first xApp starts to subscribe to the E2 node's state. After a second xApp subscribed earlier to receive the E2 node's state, the near RT RIC stores multiple data tuples relating to this node's state over a duration of time. When the first xApp subsequently subscribes to the E2 node's state, and either this xApp or the datapath Pod tries to access this state for the first xApp, the post processor 3418 retrieves all the data tuples previously stored for this E2 node in the SDL storage, and uses these data tuples to compute the current state of the E2 node, which it then provides to the first xApp directly or through the datapath Pod.

The SDL data store 3420 is an in-memory database. In some embodiments, an in-memory database is a database that loads into and runs out of the computer system memory (e.g., the host computer volatile memory, including its RAM). One example of such a database is Redis. The data store's size is selected in some embodiments to minimize search and store latency. Once the existing data store reaches its maximum desirable size, some embodiments create additional instances of this data store in the same or different instances of the SDL.

Also, as shown in FIG. 34, the SDL 3410 in some embodiments has an active data store 3420 and a standby data store 3421 for HA reasons. In addition, some embodiments allow the data stores 3420 of different SDL instances of different RIC instances to synchronize in the background of some or all of their data for HA and/or data availability reasons. In some embodiments, the xApps and MC components read and write data to the active SDL storage, which is synchronized with the standby SDL storage in the background. When the active SDL storage fails, the MC in these embodiments can seamlessly switch to the standby SDL storage. Also, the MC can switch to the standby SDL storage when the active SDL storage is being upgrades. This allows the SDL storage to be hitless.

As mentioned above by reference to FIG. 13, the RIC SDK includes an SDL cache that provides local SDL storage for an xApp, and this cache synchronizes its data with the data store of the SDL. In some embodiments, this RIC SDK cache pulls data from the main SDL data store in bulk and periodically. It helps reduce the number of requests made to the main SDL Pod. The RIC SDK cache also reduce latency for reading the SDL data by providing a portion of this data locally. The RIC SDK cache also speeds the time for writing data to the SDL by allowing the data to be written locally on the xApp Pod, and synchronized in the background. The size of the SDK cache in some embodiments is smaller than the SDL's data store 3420. Also, in some embodiments, this size is based on the requirements of the set of one or more xApps that execute on the Pod along with the RIC SDK.

In some embodiments, the sources of data to the SDL 3410 include (1) the control thread and datapath thread of the datapath Pod 3450, (2) the xApps through the RIC SDKs, (3) ML model and policy storage and server of the non-RT RIC accessed through the A1 interface, (4) xApp Pod configuration storage, and (5) configuration server of the SMO. In some embodiments, examples of system data (e.g., written by the control thread) in the SDL include (1) E2 node information, (2) cell information, (3) UE information, (4) E2 node reports, (5) KPM (key performance metric) reports, and (6) topology information (from EMS adapters).

Examples of SDL transaction in some embodiments include (1) data IO Pod (control or data IO thread) writing data to SDL, which is then read by an xApp, (2) an xApp reading data from another xApp that is written to the SDL, or the xApp writing data to the SDL for another xApp, (3) xApp writing to SDL so that a service container (e.g., a post processor) operating in the SDL Pod performs an operation (e.g., by using the GPU services or just using the general CPU) on the written data before the same xApp or another xApp retrieves the result of this operation from the SDL, (4) the non-RT RIC reading data from and writing data to the SDL as part of an A1 subscription, (5) SMO storing O1 configuration data in the SDL, and (6) non-RT RIC storing ML data in the SDL.

Figure 35:
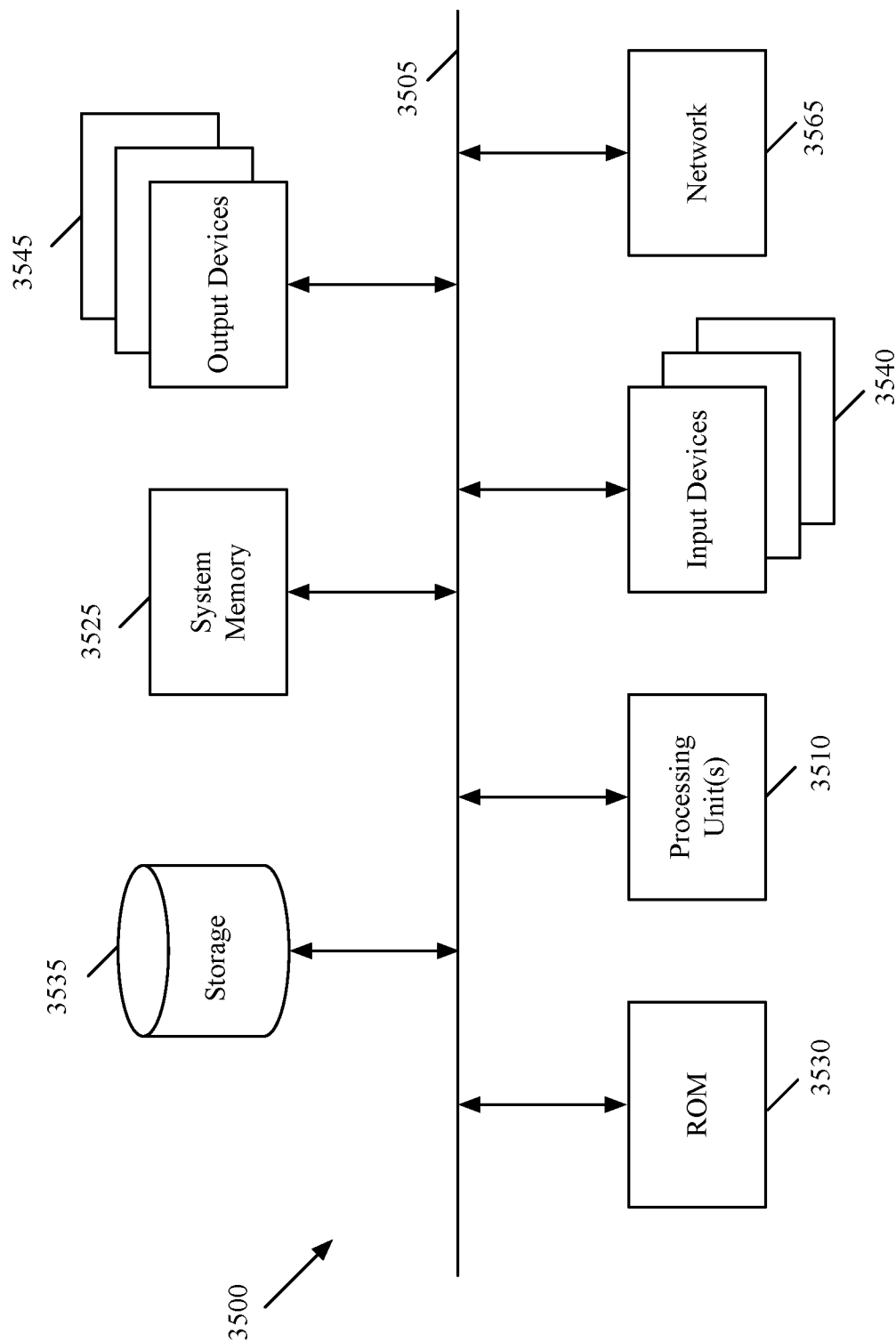
FIG. 35 conceptually illustrates an electronic system with which some embodiments of the invention are implemented.

FIG. 35 conceptually illustrates an electronic system 3500 with which some embodiments of the invention are implemented. The electronic system 3500 may be a computer (e.g., a desktop computer, personal computer, tablet computer, server computer, mainframe, a blade computer etc.), or any other sort of electronic device. Such an electronic system 3500 includes various types of computer-readable media and interfaces for various other types of computer-readable media. Electronic system 3500 includes a bus 3505, processing unit(s) 3510, a system memory 3525, a read-only memory 3530, a permanent storage device 3535, input devices 3540, and output devices 3545.

The bus 3505 collectively represents all system, peripheral, and chipset buses that communicatively connect the numerous internal devices of the electronic system 3500. For instance, the bus 3505 communicatively connects the processing unit(s) 3510 with the read-only memory 3530, the system memory 3525, and the permanent storage device 3535.

From these various memory units, the processing unit(s) 3510 retrieve instructions to execute and data to process in order to execute the processes of the invention. The processing unit(s) 3510 may be a single processor or a multi-core processor in different embodiments.

The read-only-memory (ROM) 3530 stores static data and instructions that are needed by the processing unit(s) 3510 and other modules of the electronic system 3500. The permanent storage device 3535, on the other hand, is a read-and-write memory device. This device 3535 is a non-volatile memory unit that stores instructions and data even when the electronic system 3500 is off. Some embodiments of the invention use a mass-storage device (such as a magnetic or optical disk and its corresponding disk drive) as the permanent storage device 3535.

Other embodiments use a removable storage device (such as a floppy disk, flash drive, etc.) as the permanent storage device 3535. Like the permanent storage device 3535, the system memory 3525 is a read-and-write memory device. However, unlike storage device 3535, the system memory 3525 is a volatile read-and-write memory, such as random-access memory. The system memory 3525 stores some of the instructions and data that the processor needs at runtime. In some embodiments, the invention's processes are stored in the system memory 3525, the permanent storage device 3535, and/or the read-only memory 3530. From these various memory units, the processing unit(s) 3510 retrieve instructions to execute and data to process in order to execute the processes of some embodiments.

The bus 3505 also connects to the input and output devices 3540 and 3545. The input devices 3540 enable the user to communicate information and select commands to the electronic system 3500. The input devices 3540 include alphanumeric keyboards and pointing devices (also called "cursor control devices"). The output devices 3545 display images generated by the electronic system 3500. The output devices 3545 include printers and display devices, such as cathode ray tubes (CRT) or liquid crystal displays (LCD). Some embodiments include devices such as a touchscreen that function as both input and output devices.

Finally, as shown in FIG. 35, bus 3505 also couples electronic system 3500 to a network 3565 through a network adapter (not shown). In this manner, the computer can be a part of a network of computers (such as a local area network ("LAN"), a wide area network ("WAN"), or an Intranet, or a network of networks, such as the Internet. Any or all components of electronic system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs), or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments described above only show one hardware accelerator per host computer. However, one of ordinary skill will realize that the methodology and architecture of some embodiments can be used to provide direct, passthrough access to multiple hardware accelerators on one host computer. In addition, several embodiments described above pertain to xApp operations and the near RT MC communications with xApps. One of ordinary skill will realize that these embodiments are equally applicable to edge applications in a telecommunication network and the near RT MC communications with the edge applications. Thus, one of ordinary skill in the art would understand that the invention is not to be limited by the foregoing illustrative details, but rather is to be defined by the appended claims.

The invention claimed is:

1. A method of communicating between a RAN (Radio Access Network) Intelligent Controller (RIC) and a RIC Software Development Kit (SDK) serving as an interface between an application and the RIC, the method comprising:
receiving a data message to forward to the RIC SDK;
encapsulating the data message with an encapsulating header storing data needed by the RIC SDK for efficient processing of the data message, said encapsulating comprising reducing a size of at least one data tuple stored in the data message before sending the data message to the RIC SDK; and
forwarding the encapsulated data message to the RIC SDK for processing.

2. The method of claim 1, wherein the received data message is associated with a base station component, and the data tuple that is reduced in size is an identifier identifying the base station component.

3. The method of claim 1, wherein the received data message has an encrypted header and payload, the method further comprising decrypting the data message header but not the data message payload before encapsulating the data message with the encapsulating header and forwarding the encapsulating data message to the MC SDK with the decrypted message header and the encrypted message payload.

4. The method of claim 1, wherein the received data message has an encrypted header and payload, the method further comprising decrypting both the data message header and the data message payload before encapsulating the data message with the encapsulating header and forwarding the encapsulating data message to the MC SDK with the decrypted message header and message payload.

5. The method of claim 1, wherein the RIC SDK and the application execute on one machine that executes on one host computer, wherein the MC SDK decapsulates the data message, processes the data stored in the encapsulating header, and forwards the decapsulated data message to the application.

6. The method of claim 1, wherein the encapsulating header has an optional control information field with a variable length size.

7. The method of claim 6, wherein (i) the encapsulating header has a payload field with a variable length size and (ii) the encapsulating header has a message length field that specifies a message length equal to a fixed sized encapsulating header value plus the variable length size of the optional control information field plus the variable length size of the payload field of the encapsulating data message.

8. The method of claim 7, wherein the payload field is for storing any combination of the received data message header and payload in an encoded or decoded format.

9. The method of claim 1, wherein the RIC SDK comprises a set of network connectivity processes that establish network connections to the RIC for the application, allowing the application to forego having the set of network connectivity processes.

10. The method of claim 9, wherein the set of network connectivity processes of the RIC SDK establishes and maintains network connections between the RIC SDK and the RIC and handles data packet transport to and from the RIC for the application.

11. The method of claim 1, wherein the application communicates with the RIC through high-level API (application program interface) calls that the RIC SDK converts into low-level API calls.

12. The method of claim 11, wherein at least a subset of the low-level API calls are specified by a standard specifying body.

13. A non-transitory machine readable medium storing a program for facilitating communications between a RAN (Radio Access Network) Intelligent Controller (RIC) and a RIC Software Development Kit (SDK) serving as an interface between an application and the RIC, the program comprising sets of instructions for:

receiving a data message to forward to the RIC SDK;

encapsulating the data message with an encapsulating header storing data needed by the RIC SDK for efficient processing of the data message, said encapsulating comprising reducing a size of at least one data tuple stored in the data message before sending the data message to the RIC SDK; and forwarding the encapsulated data message to the RIC SDK for processing.

14. The non-transitory machine readable medium of claim 13, wherein the received data message is associated with a base station component, and the data tuple that is reduced in size is an identifier identifying the base station component.

15. The non-transitory machine readable medium of claim 13, wherein the received data message has an encrypted header and payload, the program further comprising a set of instructions for decrypting the data message header but not the data message payload before encapsulating the data message with the encapsulating header and forwarding the encapsulating data message to the RIC SDK with the decrypted message header and the encrypted message payload.

16. The non-transitory machine readable medium of claim 13, wherein the received data message has an encrypted header and payload, the program further comprising a set of instructions for decrypting both the data message header and the data message payload before encapsulating the data message with the encapsulating header and forwarding the encapsulating data message to the RIC SDK with the decrypted message header and message payload.

17. The non-transitory machine readable medium of claim 13, wherein the RIC SDK and the application execute on one machine that executes on one host computer, the RIC SDK decapsulates the data message, processes the data stored in the encapsulating header, and forwards the decapsulated data message to the application.

18. The non-transitory machine readable medium of claim 13, wherein the encapsulating header has an optional control information field with a variable length size.

19. The non-transitory machine readable medium of claim 18, wherein (i) the encapsulating header has a payload field with a variable length size and (ii) the encapsulating header has a message length field that specifies a message length equal to a fixed sized encapsulating header value plus the variable length size of the optional control information field plus the variable length size of the payload field of the encapsulating data message.

20. The non-transitory machine readable medium of claim 19, wherein the payload field is for storing any combination of the received data message header and payload in an encoded or decoded format.

* * * * *